US011884083B2

(12) United States Patent
Furuhata et al.

(10) Patent No.: US 11,884,083 B2
(45) Date of Patent: Jan. 30, 2024

(54) LIQUID DISCHARGE APPARATUS

(71) Applicant: BROTHER KOGYO KABUSHIKI KAISHA, Nagoya (JP)

(72) Inventors: Yoshiharu Furuhata, Nagoya (JP); Shin Hasegawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 39 days.

(21) Appl. No.: 17/230,045

(22) Filed: Apr. 14, 2021

(65) Prior Publication Data

US 2021/0229475 A1 Jul. 29, 2021

Related U.S. Application Data

(63) Continuation of application No. 16/598,118, filed on Oct. 10, 2019, now Pat. No. 11,014,385, which is a (Continued)

(30) Foreign Application Priority Data

Apr. 16, 2018 (JP) ................................. 2018-078373
Jan. 30, 2019 (JP) ................................. 2019-014488
(Continued)

(51) Int. Cl.
*B41J 25/00* (2006.01)

(52) U.S. Cl.
CPC .................................. *B41J 25/006* (2013.01)

(58) Field of Classification Search
CPC ...... B41J 25/006; B41J 19/142; B41J 19/145; B41J 19/202; B41J 2/2132
See application file for complete search history.

(56) References Cited

U.S. PATENT DOCUMENTS 6,331,038 B1 12/2001 Boleda et al.
6,665,091 B1 12/2003 Saruta
(Continued)

FOREIGN PATENT DOCUMENTS

JP H04-59359 A 2/1992
JP H06-31921 A 2/1994
(Continued)

OTHER PUBLICATIONS

Japanese Notice of Reasons for Refusal dated Feb. 22, 2022 received in Japanese Patent Application No. 2018-078373, together with an English-language translation.
(Continued)

*Primary Examiner* — Justin Seo
*Assistant Examiner* — Tracey M McMillion
(74) *Attorney, Agent, or Firm* — Scully, Scott, Murphy & Presser, PC

(57) ABSTRACT

A liquid discharge apparatus includes: a discharge head including nozzles; a head scanning mechanism that reciprocatingly moves the discharge head in a main scanning direction; a conveyer that conveys a recording medium in a sub-scanning direction; and a controller. In one pass, the controller executes: recording processing in which an image is formed on the recording medium by moving the discharge head in the main scanning direction and discharging liquid from the discharge head; setting processing in which the discharge head moves to a starting position of the recording processing for a subsequent pass following the one pass by changing a moving direction of the discharge head at a standstill position; and conveyance processing in which the recording medium is conveyed in the sub-scanning direction.

17 Claims, 27 Drawing Sheets

Related U.S. Application Data continuation-in-part of application No. 16/385,014, filed on Apr. 16, 2019, now abandoned.

(30) Foreign Application Priority Data

Apr. 1, 2019 (JP) ................................ 2019-070071
Apr. 1, 2019 (JP) ................................ 2019-070072

(56) References Cited

U.S. PATENT DOCUMENTS

| | | | | |
|---|---|---|---|---|
| 9,415,586 | B1 | 8/2016 | Hayashi | |
| 2002/0048029 | A1 | 4/2002 | Yamada et al. | |
| 2004/0227781 | A1 | 11/2004 | Kaburagi | |
| 2005/0168507 | A1 | 8/2005 | Ide et al. | |
| 2005/0195232 | A1 | 9/2005 | Wu | |
| 2006/0031862 | A1 | 2/2006 | Naito | |
| 2006/0209111 | A1 | 9/2006 | Usui | |
| 2007/0052996 | A1* | 3/2007 | Ota | H04N 1/2307 358/1.15 |
| 2007/0188789 | A1* | 8/2007 | Hyogo | G06K 15/102 358/1.12 |
| 2012/0147077 | A1 | 6/2012 | Usuda | |
| 2015/0145912 | A1 | 5/2015 | Fukuda | |
| 2016/0121625 | A1 | 5/2016 | Kodama | |
| 2016/0303848 | A1* | 10/2016 | Miwa | H04N 1/034 |
| 2017/0282538 | A1 | 10/2017 | Saito | |
| 2018/0134036 | A1 | 5/2018 | Furuta | |

FOREIGN PATENT DOCUMENTS

| | | | |
|---|---|---|---|
| JP | H07-323556 | A | 12/1995 |
| JP | H11-208029 | A | 8/1999 |
| JP | H11-342651 | A | 12/1999 |
| JP | 2002-103595 | A | 4/2002 |
| JP | 2002-307677 | A | 10/2002 |
| JP | 2003-341034 | | 12/2003 |
| JP | 2004-181938 | A | 7/2004 |
| JP | 2005-212410 | A | 8/2005 |
| JP | 2006-27181 | A | 2/2006 |
| JP | 2006-51610 | A | 2/2006 |
| JP | 2006-327028 | A | 12/2006 |
| JP | 2006-334810 | A | 12/2006 |
| JP | 2010-240952 | A | 10/2010 |
| JP | 2012-131156 | A | 7/2012 |
| JP | 2013-56455 | A | 3/2013 |
| JP | 2013-107320 | A | 6/2013 |
| JP | 2014-8709 | A | 1/2014 |
| JP | 2014-97602 | A | 5/2014 |
| JP | 2015-101071 | A | 6/2015 |
| JP | 2016-87901 | A | 5/2016 |
| JP | 2016-155322 | A | 9/2016 |
| JP | 2016-172357 | A | 9/2016 |
| JP | 2017-154443 | A | 9/2017 |
| JP | 2017-177547 | A | 10/2017 |
| JP | 2018-79614 | A | 5/2018 |
| JP | 2018-192644 | A | 12/2018 |
| JP | 2021-511993 | A | 5/2021 |
| WO | 2019/164527 | A1 | 8/2019 |

OTHER PUBLICATIONS

Office Action dated Aug. 20, 2020 received in related application, namely, U.S. Appl. No. 16/598,118.

Office Action dated Mar. 30, 2020 received in related application, namely, U.S. Appl. No. 16/385,014.

Notice of Reasons for Refusal dated Dec. 6, 2022 from related JP 2019-070072 together with English language translation.

Notice of Reasons of Refusal of Japanese Patent Application No. 2019-070071 dated Jan. 17, 2023 together with English language translation.

* cited by examiner

Fig. 16A

VELOCITY/AIR CURRENT

SMALL ⇔ LARGE

MOVING AMOUNT/AIR CURRENT: SMALL ⇕ LARGE

FIRST AREA: NARROW ⇕ WIDE

| | V1 | V2 | V3 |
|---|---|---|---|
| D1 | Rd1v1 | Rd1v2 | Rd1v3 |
| D2 | Rd2v1 | Rd2v2 | Rd2v3 |
| D3 | Rd3v1 | Rd3v2 | Rd3v3 |

NARROW ⟷ WIDE

FIRST AREA

Fig. 16B

| | K | C | Y | M |
|---|---|---|---|---|
| LARGE DROPLET | dKL | dCL | dYL | dML |
| MEDIUM DROPLET | dKM | dCM | dYM | dMM |
| SMALL DROPLET | dKS | dCS | dYS | dMS |

Fig. 16C

| | K | C | Y (INCONSPICUOUS) | M |
|---|---|---|---|---|
| LARGE DROPLET (EFFECT OF AIR CURRENT IS SMALL) | wKL (<wKM) | wCL | wYL (<wKL,wCL,wML) | wML |
| MEDIUM DROPLET (EFFECT OF AIR CURRENT IS MEDIUM) | wKM (<wKS) | wCM | wYM (<wKM,wCM,wMM) | wMM |
| SMALL DROPLET (EFFECT OF AIR CURRENT IS LARGE) | wKS | wCS | wYS (<wKS,wCS,wMS) | wMS |

SMALL

WEIGHT

LARGE

Fig. 21A
Fig. 21B
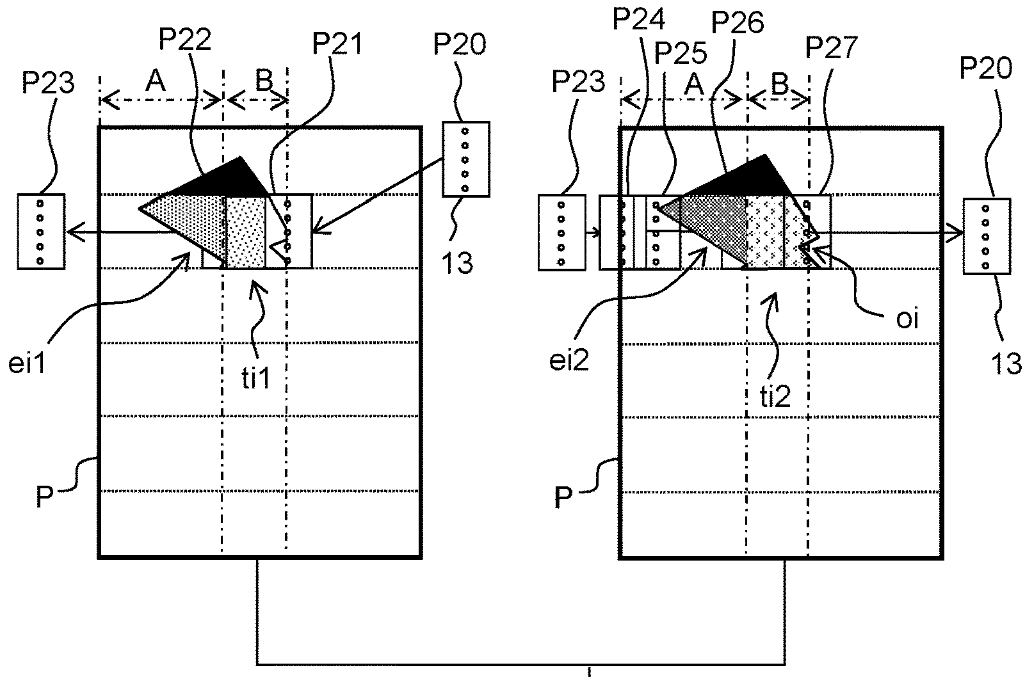
Fig. 21C
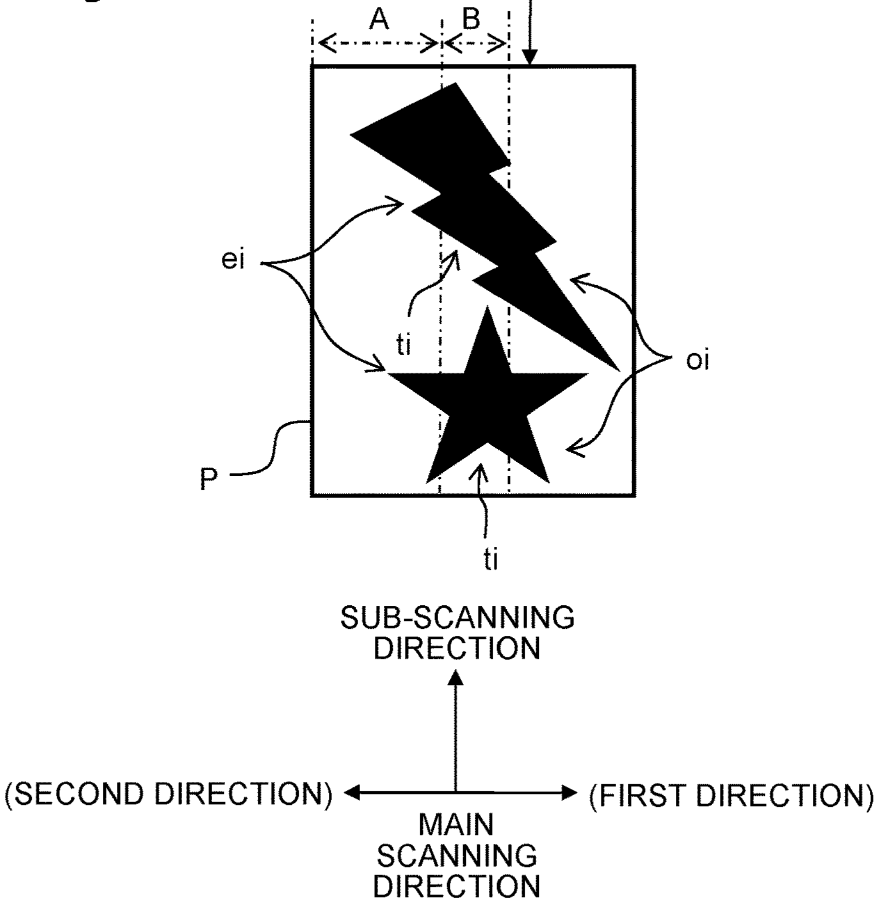

LIQUID DISCHARGE APPARATUS

CROSS REFERENCE TO RELATED APPLICATION

The present application is a Continuation of U.S. patent application Ser. No. 16/598,118 filed on Oct. 10, 2019, which is a Continuation-in-part Application of U.S. patent application Ser. No. 16/385,014 filed on Apr. 16, 2019, now abandoned, which claims priority from Japanese Patent Application No. 2018-078373 filed on Apr. 16, 2018, while claiming priority of Japanese Patent Application No. 2019-014488 filed on Jan. 30, 2019, Japanese Patent Application No. 2019-070071 filed on Apr. 1, 2019, and Japanese Patent Application No. 2019-070072 filed on Apr. 1, 2019, the disclosures of which are incorporated herein by reference in their entirety.

BACKGROUND

Field of the Invention

The present invention relates to a liquid discharge apparatus configured to discharge a liquid such as ink.

Description of the Related Art

There is conventionally known a liquid discharge apparatus that discharges a liquid such as ink and has a configuration as described in Japanese Patent Application Laid-open No. 2002-103595. In the liquid discharge apparatus, ink droplets are discharged from a recording head on a recording sheet while a carriage carrying the recording head moves in a main scanning direction. Then, the recording sheet is conveyed in a sub-scanning direction. Printing is performed on the entire surface of the recording sheet by repeating the movement including the discharge operation (printing operation) and the conveyance of the recording sheet (conveyance operation) multiple times.

SUMMARY

In a case of image formation, the carriage reciprocates in the main scanning direction. The movement of the carriage generates airflow in the vicinity of the carriage. When the carriage moves in a first direction along the main scanning direction, the airflow generated by the previous movement in a second direction opposite to the first direction of the carriage remains. This airflow may shift a landing position of each liquid droplet discharged at the time of start of the operation in which the carriage moves in the first direction. Further, printing with higher resolution is required in recent years. In order to meet this demand, liquid droplets having a small size (diameter) are often used, and thus a measure to solve the landing failure of liquid droplets due to the airflow is needed.

In view of the above, an object of the present teaching is to provide a liquid discharge apparatus that is capable of inhibiting an effect of airflow caused by movement of a discharge head on a landing position of each liquid droplet discharged from the discharge head.

According to an aspect of the present teaching, there is provided a liquid discharge apparatus, including:

a discharge head including a plurality of nozzles;

a head scanning mechanism configured to reciprocatingly move the discharge head in a main scanning direction;

a conveyer configured to convey a recording medium in a sub-scanning direction orthogonal to the main scanning direction; and a controller configured to control the discharge head, the head scanning mechanism, and the conveyer;

wherein the controller is configured to execute, in one pass, recording processing in which an image is formed on the recording medium by moving the discharge head in the main scanning direction and discharging liquid from the discharge head, setting processing, executed after completion of the recording processing, in which the discharge head is moved from an ending position of the recording processing for the one pass to a starting position of the recording processing for a subsequent pass following the one pass by changing a moving direction of the discharge head at a standstill position, and conveyance processing in which the recording medium is conveyed in the sub-scanning direction, wherein the controller is further configured to:

i) control the discharge head to form a first partial image on the recording medium during the setting processing for the one pass and form a second partial image on the recording medium during the recording processing for the subsequent pass;

ii) set setting processing time required for the setting processing for the one pass as a first setting time in a case that the subsequent pass is a first state pass, and set the setting processing time required for the setting processing for the one pass as a second setting time longer than the first setting time in a case that the subsequent pass is a second state pass which is different from the first state pass; or iii) set a control distance, of the discharge head, during the setting processing for the one pass as a first distance in the case that the subsequent pass is the first state pass, and set the control distance during the setting processing for the one pass as a second distance longer than the first distance in the case that the subsequent pass is the second state pass.

According to the aspect of the present teaching, when the landing failure of liquid droplets due to residual airflow is highly likely to be caused at the time of start of the recording processing for the subsequent pass following the one pass, the setting processing time is set as the second setting time longer than normal (the first setting time), the control distance is set as the second distance longer than normal (the first distance), or the first partial image is formed during the setting processing for the one pass and the second partial image is formed during the recording processing for the subsequent pass. This weakens the airflow, which is generated when the discharge head moves to the standstill position for changing the moving direction in order to execute the recording processing for the pass following the one pass, to an extent that the airflow has no effect on the landing of liquid droplets at the time of start of the recording processing for the pass following the one pass. Alternatively, the second partial image is formed during the recording processing for the subsequent pass by using liquid droplets each having larger volume. The deterioration in image due to the airflow can thus be inhibited.

The present teaching provides the liquid discharge apparatus that is capable of inhibiting an effect of airflow generated by movement of the discharge head on a landing position of each liquid droplet discharged from the discharge head.

BRIEF DESCRIPTION OF THE DRAWINGS

FIG. 16A is a look-up table for determining a size of a first area, FIG. 16B is an illustrative view of the number of dots counted, and FIG. 16C is a look-up table indicating weighing coefficients depending on hues (colors) and liquid droplet sizes.

FIGS. 21A to 21C schematically illustrate an operation of the liquid discharge head in the print processing according to an eighth embodiment.

DESCRIPTION OF THE EMBODIMENTS

First Embodiment

Figure 3:
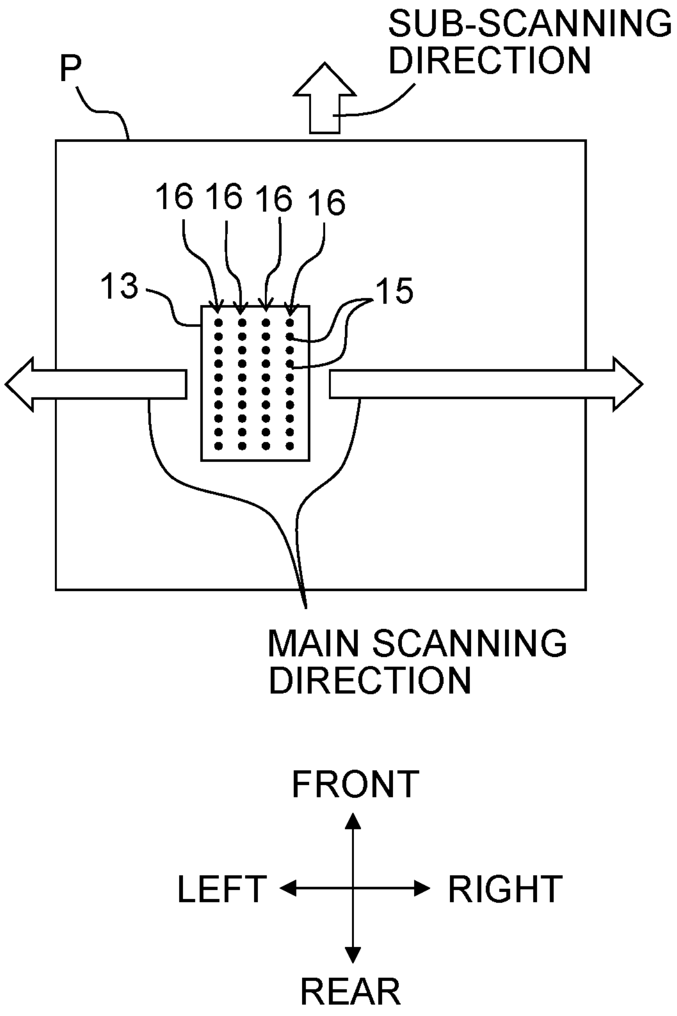
FIG. 3 depicts a recording sheet and a liquid discharge head when the liquid discharge apparatus is seen from above.

Referring to drawings, a liquid discharge apparatus according to an embodiment of the present teaching is explained below. In the following explanation, an ink discharge apparatus configured to discharge ink on a recording sheet is an exemplary liquid discharge apparatus. In the present specification, front, rear, right, left, up, and down are defined as depicted in FIGS. 1 and 3.

<Configuration of Liquid Discharge Apparatus>

Figure 1:
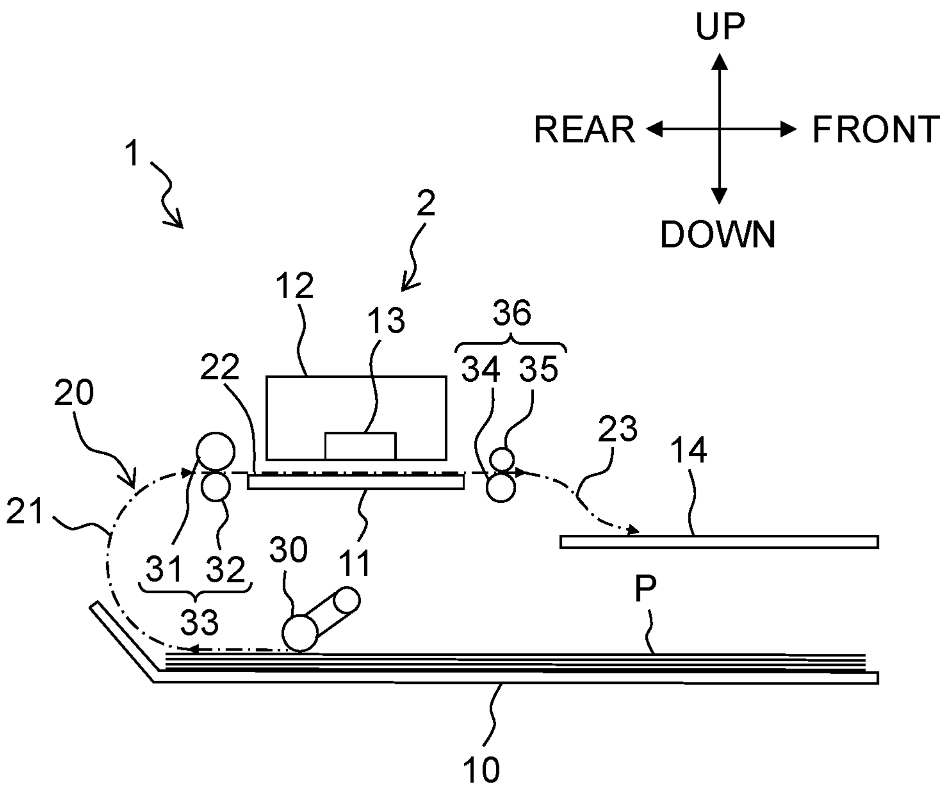
FIG. 1 schematically depicts a configuration of a liquid discharge apparatus according to a first embodiment of the present teaching.

As depicted in FIG. 1, a liquid discharge apparatus 1 includes a feed tray 10, a platen 11, a carriage 12, and the like. The feed tray 10 accommodates multiple recording sheets P. The platen 11 is long in the left-right direction and is provided above the feed tray 10. The platen 11 is a flat plate member and supports, from below, the recording sheet P being conveyed. The carriage 12 is disposed above the platen 11. The carriage 12 carries a liquid discharge head 13 and the like and reciprocates in the left-right direction. A discharge tray 14 is provided in front of the platen 11 to receive the recording sheet P for which recording has been performed.

A sheet conveyance path 20 extends from the rear side of the feed tray 10. The sheet conveyance path 20 connects the feed tray 10 and the discharge tray 14. The sheet conveyance path 20 can be divided into three paths, which are a curved path 21, a straight path 22, and an end pass 23. The curved path 21 curves upward from the feed tray 10 to reach the vicinity of a rear portion of the platen 11. The straight path 22 extends from an end or terminal of the curved path 21 to reach the vicinity of a front portion of the platen 11. The end path 23 extends from an end or terminal of the straight path 22 to the discharge tray 14.

The liquid discharge apparatus 1 includes, as a sheet conveyer configured to convey the recording sheet P, a feed roller 30, a conveyance roller 31, and a discharge roller 34. The sheet conveyer conveys each recording sheet P accommodated in the feed tray 10 to the discharge tray 14 along the sheet conveyance path 20.

Specifically, the feed roller 30 is disposed immediately above the feed tray 10 and makes contact with the uppermost recording sheet P from above. The conveyance roller 31 and a pinch roller 32 form a conveyance roller unit 33, which is disposed in the vicinity of a downstream end of the curved path 21. The conveyance roller unit 33 connects the curved path 21 and the straight path 22. The discharge roller 34 and a spur roller 35 form a discharge roller unit 36, which is disposed in the vicinity of a downstream end of the straight path 22. The discharge roller unit 36 connects the straight path 22 and the end path 23.

Each recording sheet P is supplied to the conveyance roller unit 33 via the curved path 21 by use of the feed roller 30. Then, the recording sheet P is sent through the straight path 22 to the discharge roller unit 36 by use of the conveyance roller unit 33. In the straight path 22, ink is discharged from the liquid discharge head 13 to the recording sheet P on the platen 11, thus recording an image on the recording sheet P. The recording sheet P for which recording has been performed is conveyed to the discharge tray 14 by use of the discharge roller unit 36.

The liquid discharge apparatus 1 includes, as a head scanning mechanism that causes the liquid discharge head 13 to reciprocate, the carriage 12, a guide member (not depicted), and an endless belt (not depicted). The head scanning mechanism causes the liquid discharge head 13 to reciprocate in the left-right direction across the straight pass 22 of the sheet conveyance path 20.

Specifically, the guide member of the head scanning mechanism is two support bars parallel to each other. The support bars are arranged orthogonal to the front-rear direction. The carriage 12 is slidably attached to the support bars.

The endless belt is disposed parallel to the support bars. The carriage 12 is fixed to the endless belt. Rotation of a carriage motor 51 (described below) causes the endless belt to run, thus moving the carriage 12 along the support bars.

Figure 2:
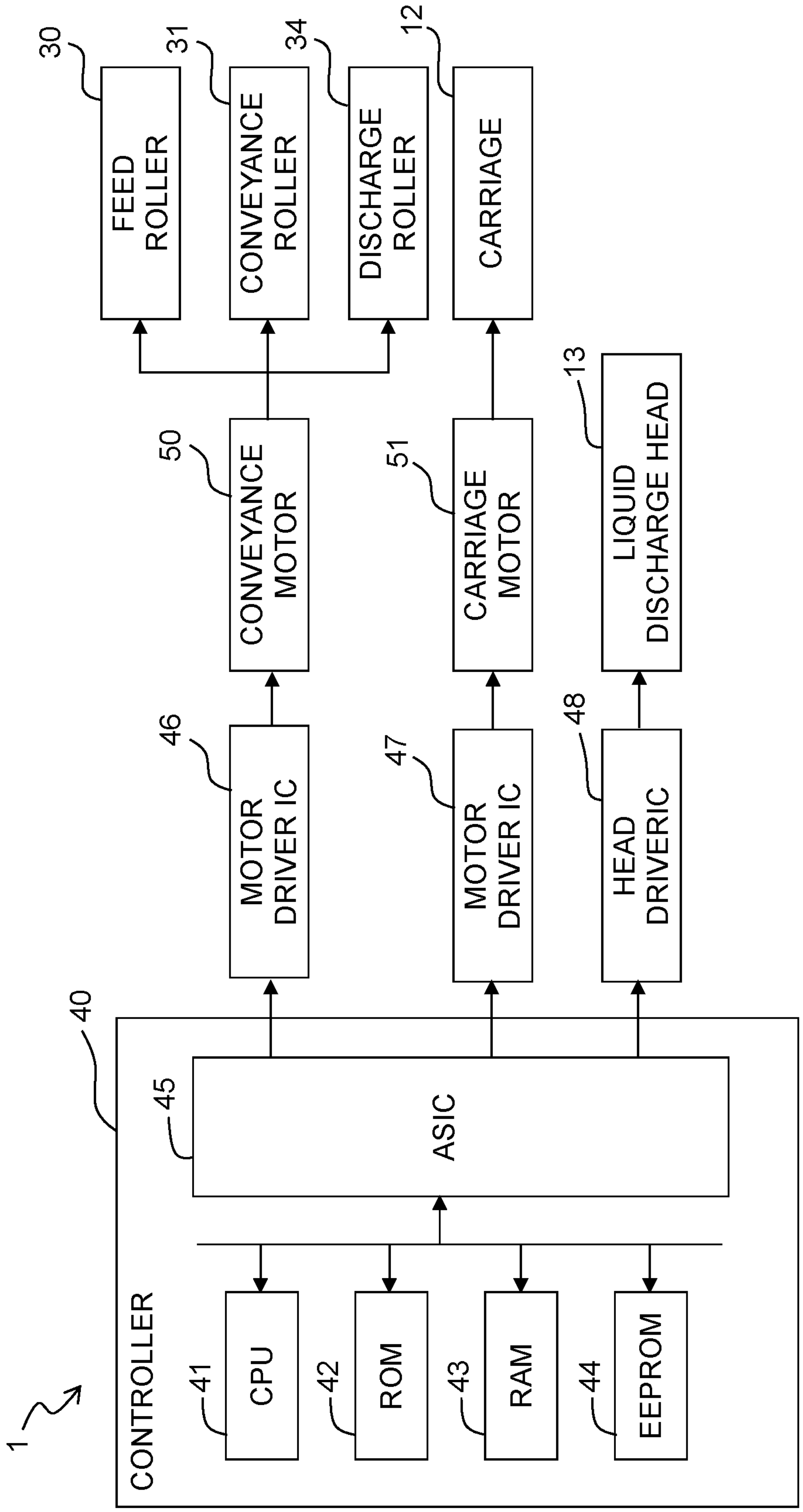
FIG. 2 is a block diagram depicting a functional configuration of the liquid discharge apparatus.

Referring to FIG. 2, a functional configuration of the liquid discharge apparatus 1 is explained below. A controller 40 of the liquid discharge apparatus 1 includes a first substrate and a second substrate. The first substrate mounts a CPU 41, a ROM 42, a RAM 43 (an exemplary memory), and an EEPROM 44. The second substrate mounts an ASIC 45. The ASIC 45 is connected to a motor driver IC 46, a motor driver IC 47, and a head driver IC 48. The motor driver IC 46 drives a conveyance motor 50, and the motor driver IC 47 drives the carriage motor 51. The head driver IC 48 drives an actuator of the liquid discharge head 13.

When the controller 40 of the liquid discharge apparatus 1 receives input of a printing job from a user or another communication apparatus, the CPU 41 causes the RAM 43 to memory image data related to the printing job and the CPU 41 outputs a command for executing the printing job to the ASIC 45 in accordance with a program stored in the ROM 42. The ASIC 45 controls each of the driver ICs 46 to 48 based on this command to execute print processing based on the image data memorized in the RAM 43.

In the print processing, the motor driver IC 46 drives the conveyance motor 50 to rotate the feed roller 30, the conveyance roller 31, and the discharge roller 34. The motor driver IC 47 drives the carriage motor 51 to cause the carriage 12 to reciprocate in the left-right direction (a main scanning direction). The head driver IC 48 drives the actuator to generate meniscus vibration or oscillation, to discharge ink, and the like.

The liquid discharge apparatus 1 includes a variety of sensors (e.g., a front-end detection sensor for detecting a position of the recording sheet and an encoder for detecting a position of the carriage). The controller 40 controls the driver ICs 46 to 48 based on signals from the above sensors so that the driver ICs 46 to 48 are synchronized to each other, thus forming an image on the recording sheet P.

The carriage motor 51, the carriage 12, the guide member, and the endless belt form the head scanning mechanism of the present teaching. The head scanning mechanism causes the liquid discharge head 13 to reciprocate in the main scanning direction. The conveyance motor 50, the feed roller 30, the conveyance roller 31, and the discharge roller 34 form the conveyer of the present teaching. The sheet conveyer conveys the recording sheet P on the platen 11 in a sub-scanning direction.

As depicted in FIG. 3, a lower surface of the liquid discharge head 13 faces the recording sheet P. The lower surface is a nozzle surface in which nozzles 15 are open. The nozzles 15 are aligned in the sub-scanning direction (front-rear direction) to form each nozzle row 16. The nozzle rows 16 are arranged in the main scanning direction at intervals. In the first embodiment, the respective nozzle rows 16 correspond to different kinds of liquids, which are, for example, black, yellow, cyan, and magenta inks.

The liquid discharge apparatus 1 alternately repeats scanning of the carriage 12 and conveyance of the recording sheet P, thus recording (forming) an image on the entire surface of the recording sheet P.

The moving path of the carriage 12 extends from one side in the main scanning direction of a conveyance area of the recording sheet P to the other with the recording area interposed therebetween. The liquid discharge apparatus 1 includes a storing position of the liquid discharge head 13 on one side in the main scanning direction. When the liquid discharge apparatus 1 is turned off, the liquid discharge head 13 is stored in the storing position and the nozzle surface is covered with a cap. A maintenance position of the liquid discharge head 13 is provided on the other side in the main scanning direction where maintenance (flushing or purge) is executed on the liquid discharge head 13.

<Operation Flow in Printing>

Figure 4:
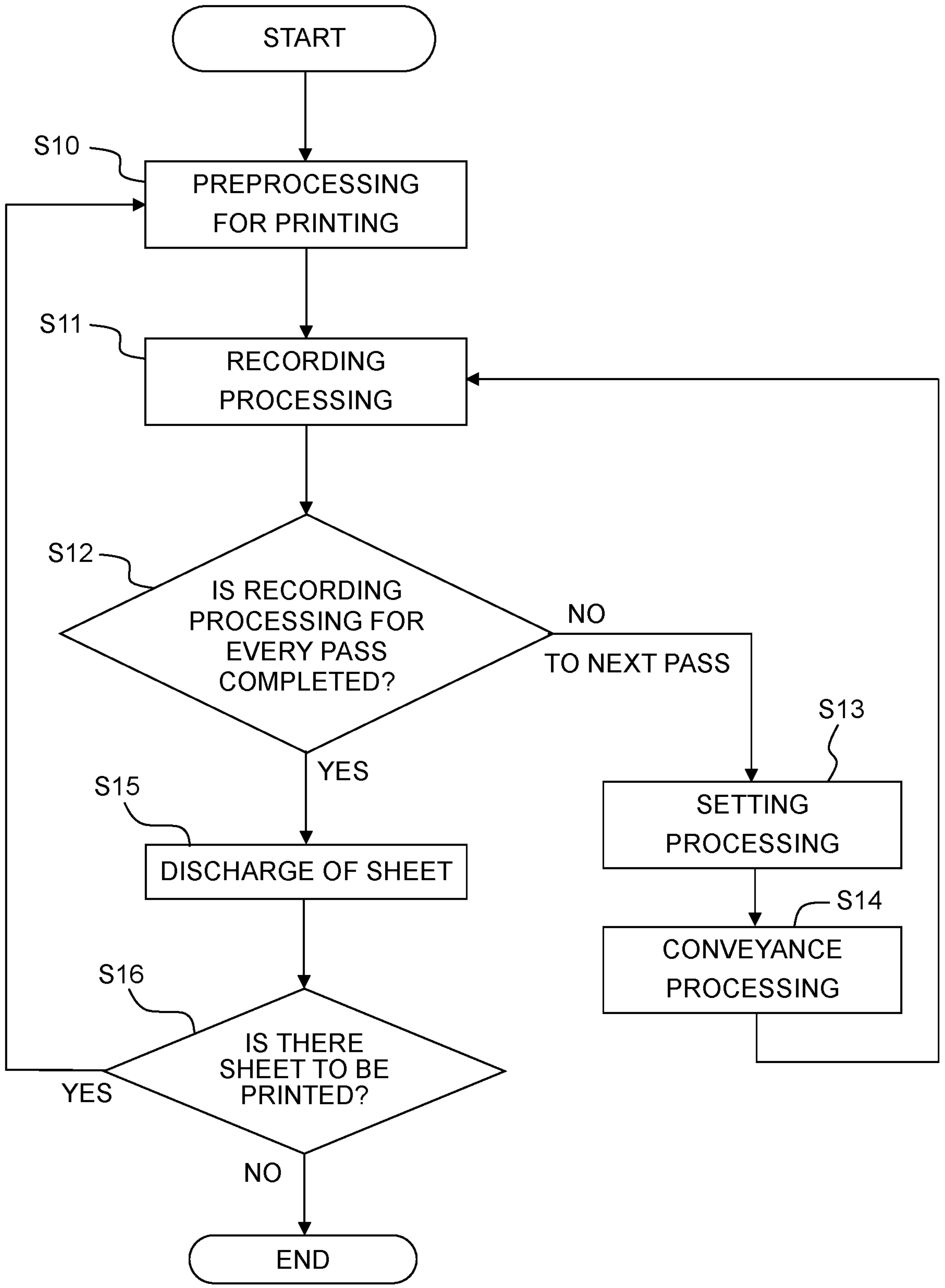
FIG. 4 is a flowchart indicating basic operations of print processing.

Subsequently, the print processing executed by the liquid discharge apparatus 1 is explained. Referring to FIG. 4, a flow of the print processing executed on one recording sheet P is explained below.

As depicted in FIG. 4, when receiving a printing job, the controller 40 executes preprocessing for printing (step S10). In the step S10, the controller 40 adjusts meniscuses and generates recording data.

The controller 40 removes the cap from the nozzle surface and moves the liquid discharge head 13 from the storing position to the maintenance position. In the maintenance position, the liquid discharge head 13 is driven to execute the flushing (recovery operation of discharge performance) predetermined number of times. This results in newly-made meniscuses in the nozzles 15.

Then, the controller 40 drives the carriage motor 51 to move the liquid discharge head 13 in a direction toward the storing position (referred to as a first direction). In that situation, the liquid discharge head 13 accelerates to a predefined velocity before arriving at the first discharge position (a starting point of the first pass).

In the movement of the liquid discharge head 13 toward the storing position, the controller 40 memorizes image data in the RAM 43. The controller 40 generates the recording data for the first pass based on the image data, and memorizes it in the RAM 43. The controller 40 generates recording data for each pass until the image formation on the entire surface of one recording sheet P is completed.

Then, the controller 40 feeds the first recording sheet P from the feed tray 10 and supplies it to the straight pass 22. The timing at which the feed processing is executed is matched with the timing at which meniscus adjustment and/or the generation of recording data is/are executed.

When the liquid discharge head 13 has arrived at the starting point of the first pass, the controller 40 starts processing related to the first pass. In the first pass, the controller 40 discharges the liquid from each nozzle 15 while moving the liquid discharge head 13 in the first direction. A strip-like or belt-like image is formed on the recording sheet P (step S11).

One pass in the print processing is a series of processing including one recording processing and one setting processing (described below).

In one recording processing, the controller 40 moves the liquid discharge head 13 toward any one direction (the first direction in this example) included in the main scanning direction. The controller 40 discharges the liquid from each nozzle 15 in synchronization with this movement. Synchronizing the movement of the liquid discharge head 13 with the discharge of liquid is executed based on the signal from the encoder. As described above, one recording processing is a discharge operation executed during the movement of the liquid discharge head 13 in the first direction, and it is continuously executed from the first discharge position to the last discharge position.

When completing the first recording processing (S11), the controller 40 determines whether the recording processing for every pass to be executed in the printing job is completed (step S12). If the recording processing is not completed (S12: NO), the controller 40 executes the setting processing (step S13) and conveyance processing (step S14) to execute the recording processing for the succeeding pass.

The setting processing (S13) is processing in which the liquid discharge head 13 moves to a starting position of the recording processing for the succeeding pass after completion of the recording processing for the pass executed immediately before the succeeding pass. In the setting processing, the liquid discharge head 13 moves in a state where no liquid is discharged (referred to as a non-discharge state). This movement includes one reverse movement of the liquid discharge head 13 from the first direction to a second direction. The conveyance processing (S14) is processing in which the recording sheet P is conveyed in the sub-scanning direction. When the liquid discharge head 13 moves in the first direction after the conveyance processing, the liquid discharge head 13 is capable of passing the starting position of the recording processing for the succeeding pass.

For the purpose of convenience, FIG. 4 serially indicates the setting processing and the conveyance processing in that order. The conveyance processing, however, may be started and completed while the setting processing is being executed. Then, the controller 40 executes again the recording processing (S11) from the starting point for the succeeding pass.

The controller 40 repeatedly executes the series of processing in steps S11 to S14. When the recording processing for every pass is completed (S12: YES), the controller 40 controls the sheet conveyer to discharge the recording sheet P on the discharge tray 14 (step S15). Accordingly, the print processing for one recording sheet P is completed.

When printing is needed to be continuously executed on another recording sheet P (S16: NO), the controller 40 returns to the step S10. Then, the controller 40 executes the preprocessing for printing as the step S10 to generate new recording data and supply the recording sheet P. The meniscus adjustment is executed as needed. Then, the controller 40 proceeds to the step S11.

When no printing is needed to be executed on another recording sheet P (S16: YES), the controller 40 ends the print processing. For example, the liquid discharge head 13 returns to the storing position and the nozzle surface is covered with the cap. The nozzle surface may be cleaned to remove dirt or meniscus adjustment may be executed before the liquid discharge head 13 is stored in the storing position.

Figure 5:
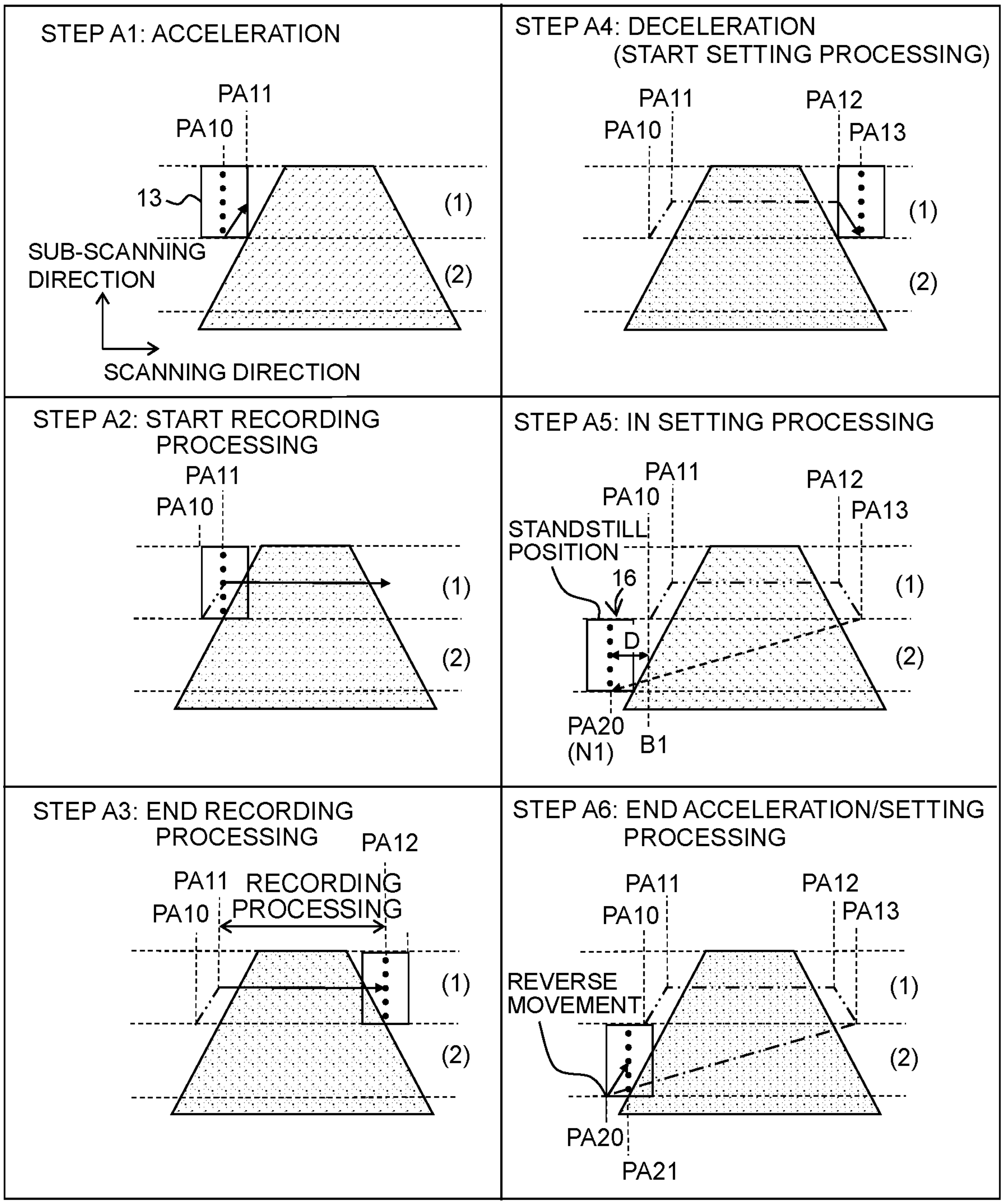
FIG. 5 schematically illustrates operations of the liquid discharge head during the print processing.

Referring to FIG. 5, operations of the liquid discharge head 13 during image formation is explained below. The explanation begins with one recording processing in the middle of the image formation. As depicted in FIG. 5, an image subjected to the image formation is a trapezoid filled with dots. The image is formed by unidirectional printing. In the unidirectional printing, the recording processing is executed only when the liquid discharge head 13 moves in the first direction.

In FIG. 5, obliquely upward arrows mean that the carriage 12 accelerates, obliquely downward arrows mean that the carriage 12 decelerates, and horizontal arrows mean that the carriage 12 moves at constant velocity. FIG. 5 includes six steps A1 to A6 in chronological order, and each of the steps A1 to A6 illustrates the operation of printing of the trapezoid.

In the step A1, the liquid discharge head 13 is in a standstill or stop position PA10. The position PA10 is a direction change position where the moving direction of the liquid discharge head 13 is changed. Although not depicted in FIG. 5, the moving direction of the liquid discharge head 13 has changed from the second direction to the first direction at the position PA10. In the setting processing, the position PA10 is a position through which the liquid discharge head 13 passes.

The position PA10 is separated in the second direction from a starting position PA11 of the recording processing by a predefined distance (a distance required for acceleration of the liquid discharge head 13). The liquid discharge head 13 accelerates and moves from the position PA10 to the position PA11. The acceleration rate of the liquid discharge head 13 is fixed.

In the step A2, the liquid discharge head 13 is in the position PA11. The position PA11 is not only an ending point of the preceding pass but also a starting point of the succeeding pass (pass (1)). The liquid discharge head 13 starts the recording processing at the position PA11. The liquid discharge head 13 moves in the first direction at constant velocity and the liquid is discharged from each nozzle 15. Accordingly, a partial image of the trapezoid is printed on the recording sheet P (not depicted).

In the step A3, the liquid discharge head 13 is in a position PA12. The position PA12 is not only an ending point of the recording processing for the pass (1) but also a starting point of the setting processing for the pass (1). The partial image of the trapezoid is completed when the liquid discharge head 13 has arrived at the position PA12, and the discharge of liquid from each nozzle 15 is stopped.

Regarding the partial image formed in the pass (1) in which the liquid discharge head 13 moves in the first direction, the position PA11 is a position where a pixel corresponding to a first end of the partial image is formed and the position PA12 is a position where a pixel corresponding to a second end of the partial image is formed.

In the step A4, the liquid discharge head 13 decelerates from the position PA12 to a position PA13. The deceleration rate of the liquid discharge head 13 is fixed. The liquid discharge head 13 stops at the position PA13. The position PA13 is the first direction change position in the unidirectional printing. As depicted in the step A5, the liquid discharge head 13 passes across the formed partial image and moves to the opposite side at once.

In the step A5, the liquid discharge head 13 is in a position PA20 after moving to the opposite side at once. The position PA20 is the second direction change position in the unidirectional printing where the liquid discharge head 13 temporarily stops. The position PA20, which is a position corresponding to the position PA10, is separated in the second direction from a position PA21 by a predefined distance (a distance required for acceleration of the liquid discharge head 13).

In the step A6, the liquid discharge head 13 is in the position PA21. The position PA21 is not only an ending point of the pass (1) but also a starting point of a pass (2) subsequent to the pass (1). The liquid discharge head 13 reverses the moving direction at the position PA20, and accelerates and moves in the first direction to the position PA21. The acceleration rate of the liquid discharge head 13 is fixed.

When the liquid discharge head 13 has arrived at the position PA21, the liquid discharge head 13 starts the recording processing for the pass (2) similarly to the case in which the liquid discharge head 13 has arrived at the position PA11 in the pass (1) (see the steps A2 and A3). As described above, the liquid discharge apparatus 1 executes, for example, acceleration, movement at constant velocity, liquid discharge, deceleration, and two reverse movements of the liquid discharge head 13 during one pass. One image is recorded by repeating them.

The operations depicted in the steps A2 and A3 of FIG. 5 correspond to the recording processing (S11) in FIG. 4. The recording processing is an operation executed in one pass from the discharge of the first liquid droplet through the discharge of the last liquid droplet. The liquid discharge head 13 moves at fixed velocity and discharges the liquid in synchronization with this movement to form the partial image.

The operations depicted in the steps A4 to A6 of FIG. 5 correspond to the setting processing (S13) in FIG. 4. The setting processing is an operation after the recording processing for one pass is completed until the recording processing for the next pass is started. The liquid discharge apparatus 1 executes, for example, deceleration, two changes in the moving direction, and acceleration of the liquid discharge head 13 to continuously execute two recording processings.

<Setting of Setting Processing Time>

As described above, the liquid discharge apparatus 1 executes one setting processing before one recording processing is started to move the liquid discharge head 13 to the starting position of said one recording processing. The liquid discharge head 13 moves in the first direction in the recording processing, and then moves in the opposite direction in the setting processing. Thus, airflow caused in the setting processing may affect each liquid droplet discharged in the recording processing immediately after the setting processing, which may shift the landing position of each liquid droplet.

In the first embodiment, in order to inhibit the landing failure of each liquid droplet due to the airflow, the time spent on the setting processing (hereinafter referred to as setting processing time) is appropriately adjusted based on image data.

Figure 6:
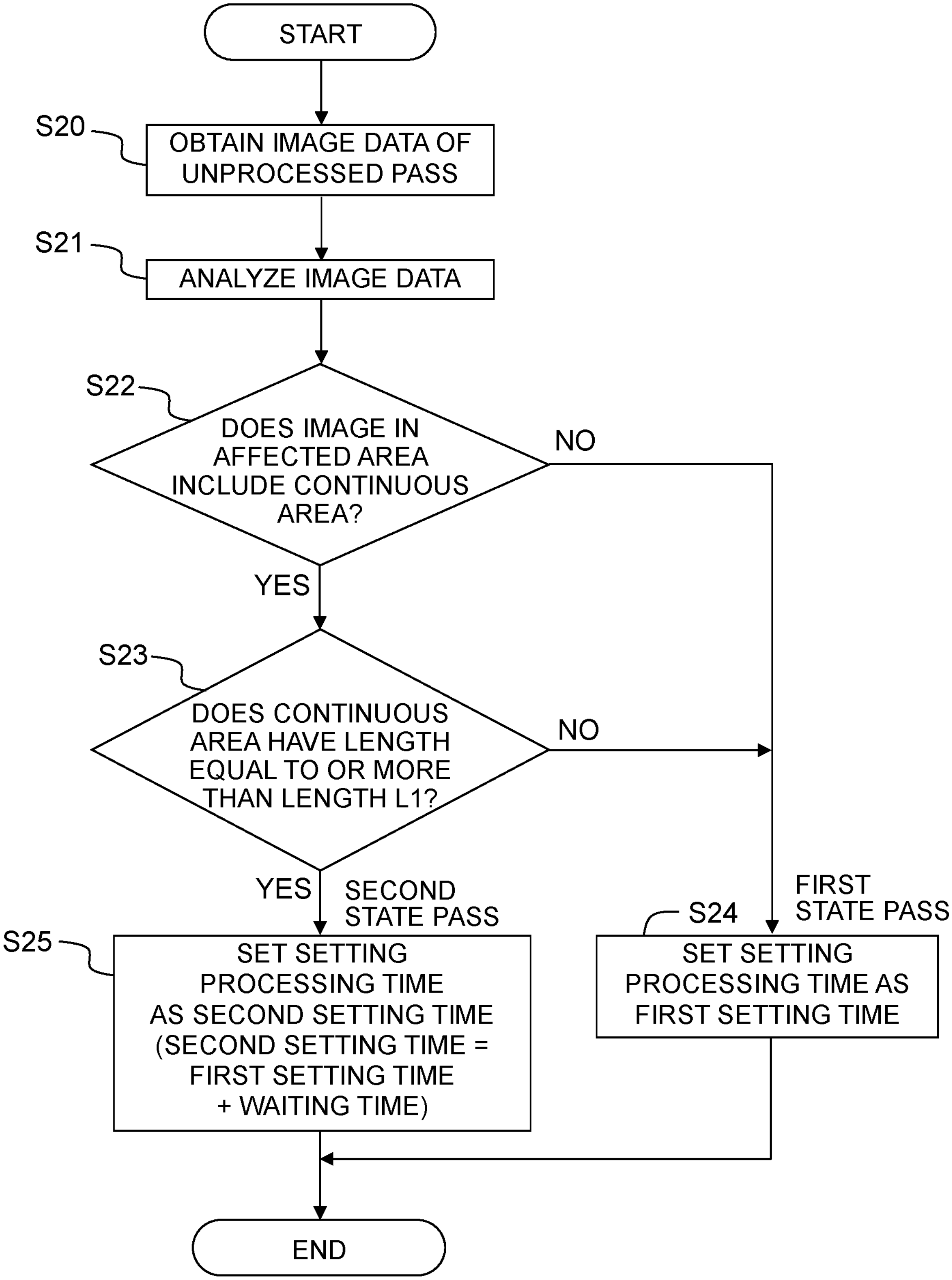
FIG. 6 is a flowchart indicating a procedure for setting a setting processing time.

Referring to FIG. 6, a procedure for setting the setting processing time is explained. The controller 40 first (step S20) obtains image data of an unprocessed pass. The image data of the unprocessed pass typically corresponds to image data for the next recording processing. In the step S21, the controller 40 analyzes the image data to extract a continuous area. In a step S22, the controller 40 determines whether an image in an affected area includes the continuous area.

In order to perform printing with high throughput, the setting processing time is preferably short. Thus, in the setting processing, the liquid discharge head 13 has great acceleration and deceleration rates before and after the standstill position and moves at high velocity when no liquid is discharged. When the recording processing is executed, however, the airflow caused in the setting processing immediately before the recording processing remains. The airflow would affect the liquid(s) discharged in the recording processing, thereby leading to the landing failure.

The affected area is an area in which the airflow causing a recognizable landing shift remains when the recording processing is executed without adjusting the setting processing time. The affected area is an area from a nozzle position to a boundary position. Here, the nozzle position is a position in the main scanning direction of each nozzle row 16 when the liquid discharge head 13 is in the standstill position. The boundary position is a position separated, by a predefined distance D, from the nozzle position in a moving direction (e.g., the first direction) of the liquid discharge head 13 after the change in the moving direction.

Referring to the step A5 of FIG. 5, the affected area is further explained below. In the pass (2), a nozzle position N1 is a position of the nozzle row 16 when the liquid discharge head 13 is in the standstill position PA20. A boundary position B1 is a position separated from the nozzle position N1 in the first direction (the direction directed from the standstill position PA20 to the starting position PA21) by the predefined distance D. If the starting position PA21 is in the predefined distance D, the landing failure may occur in an area where printing is started.

In the first embodiment, the affected area is determined in advance. The affected area is determined as follows.

The liquid discharge apparatus 1 records a test pattern in the first direction. For example, the test pattern includes multiple line segments (the length in the sub-scanning direction: 35 mm, the length in the main scanning direction: 1 mm). Each line segment is formed using a liquid droplet size of 2 pl. The residual airflow shifts the liquid droplet toward the second direction with respect to the line segment, forming a dot affected by the landing failure. In the first embodiment, a sampling field is set in the second direction with respect to the line segment, and the number of failure dots in the field is counted. Each sampling field is a rectangular area having a length in the sub-scanning direction of 10 mm and a length in the main scanning direction of 5 mm Each sampling field is separated from the corresponding line segment at an interval of 0.5 mm.

The number of dots in the sampling field decreases with distance from the standstill position PA20 (the position having a distance of 10 mm from the nearest line segment). In the first embodiment, a position of the line segment having a dot count value of less than 15 in the corresponding sampling field is set as the boundary position B1.

The continuous area of the image is an area formed by multiple pixels, which correspond to resolution in the sub-scanning direction of the image and are arranged at unit intervals. The continuous area of the image is a partial image in which multiple pixels are continuously arranged in the sub-scanning direction.

When the continuous area is not included in the affected area (S22: NO), the controller 40 sets the setting processing time as a first setting time (step S24). When the continuous area is in the affected area (S22: YES), the controller 40 proceeds to a step S23.

In the step S23, the controller 40 determines whether the continuous area has a length equal to or more than a length L1 in the sub-scanning direction. When the length in the sub-scanning direction of the continuous area is less than the length L1 (S23: NO), the controller 40 sets the setting processing time as the first setting time (S24). When the length in the sub-scanning direction of the continuous area is equal to or more than the length L1 (S23: YES), the controller 40 proceeds to a step S25.

In the step S25, the controller 40 sets the setting processing time as a second setting time (=the first setting time+waiting time), which is longer than the first setting time.

In the following, for the purpose of convenience, the pass may be referred to as a first state pass or a second state pass.

The first state pass is a processing pair continuing from the recording processing to the setting processing. The setting processing time in the setting processing immediately before the first state pass is the first setting time. The residual airflow caused by the setting processing immediately before the first state pass would have a relatively small effect on the landing position of the liquid droplet in the first state pass. The setting processing time is thus not required to be adjusted in the setting processing immediately before the first state pass.

The second state pass is a processing pair continuing from the recording processing to the setting processing. The setting processing time in the setting processing immediately before the second state pass is the second setting time. If the setting processing time in the setting processing immediately before the second state pass is the first setting time, the residual airflow caused by the setting processing immediately before the second state pass would have a relatively large effect on the landing position of the liquid droplet in the second state pass. The setting processing time is thus required to be adjusted in the setting processing immediately before the second state pass.

As described above, when the continuous area of which length in the sub-scanning direction is equal to or more than the length L1 is included in the affected area for the next pass (i.e., when the next pass is the second state pass), the setting processing immediately before the recording processing is executed using the second setting time. Accordingly, the recording processing is executed in a state where the residual airflow caused by the setting processing is weak. This hardly causes the landing failure due to the airflow.

When the continuous area of which length in the sub-scanning direction is less than the length L1 is included in the affected area for the next pass (i.e., when the next pass is the first state pass), the landing failure to be caused would be inconspicuous. The setting processing time is thus set to the first setting time, speeding up the print processing.

When the continuous area is present, the setting processing time is set to the second setting time. When multiple pixels are not continuously arranged in the sub-scanning direction, the landing failure to be caused would be inconspicuous. The setting processing time is thus set to the first setting time. Accordingly, the setting processing time is not unnecessarily lengthened, speeding up the print processing.

In the first embodiment, the length L1 may be set to, for example, 1.0 mm. In that case, if the continuous area included in the affected area has a length of less than the length L1, the landing failure to be caused would be inconspicuous. This allows the setting processing time to be set to the first setting time, speeding up the print processing.

<Exemplary Operation in Setting Processing>

Figure 7A:
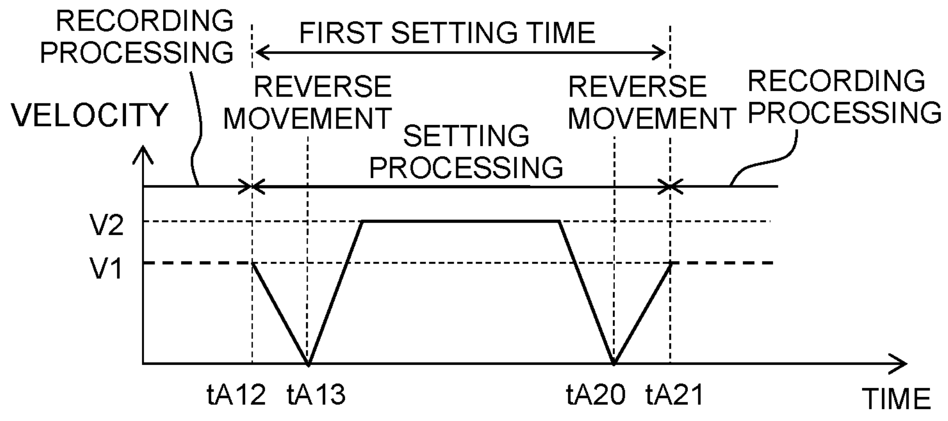
FIGS. 7A to 7C each depict an exemplary operation of the liquid discharge head during the setting processing.
Figure 7B:
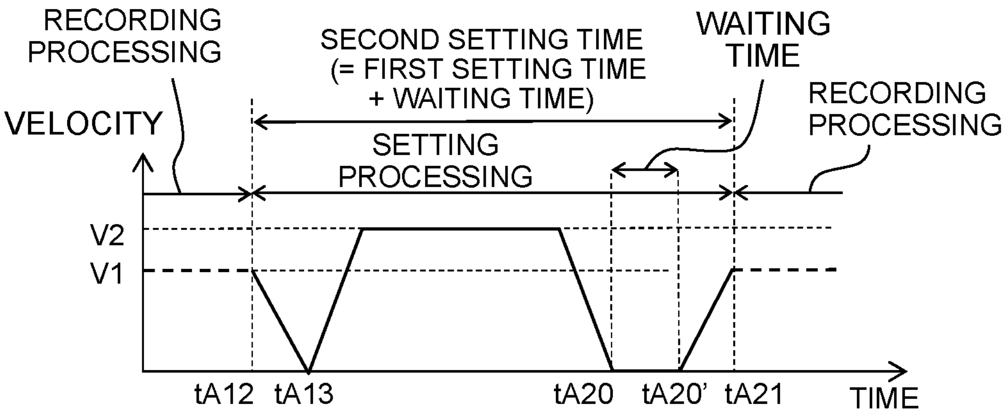
Figure 7C:
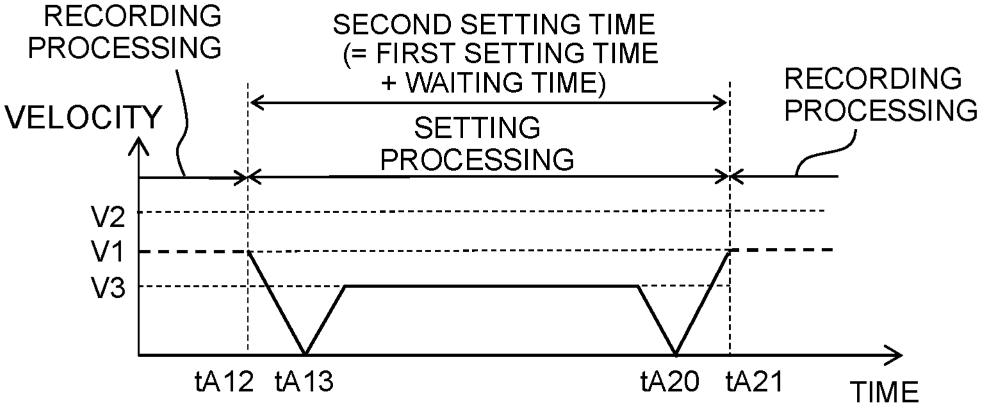

Referring to FIGS. 7A to 7C, exemplary operations of the liquid discharge head 13 in the setting processing are explained below. In FIGS. 7A to 7C, the time, which is indicated by the horizontal axis, also indicates the position of the liquid discharge head 13 at the time. For example, the number included in a time tA12 (12 in the time tA12) corresponds to the position PA12 in FIG. 5 having the identical number. Namely, each of the times tA12, tA13, tA20, and tA21 in FIGS. 7A to 7C indicates the time at which the liquid discharge head 13 has arrived at the corresponding one of the positions PA12, PA13, PA20, and PA 21 in FIG. 5.

FIG. 7A is an exemplary operation when the setting processing time is set to the first setting time. Namely, a pass executed immediately after this setting processing is the first state pass. Even when the first setting time is set as the setting processing time, the recording processing immediately after this setting processing does not have a conspicuous landing failure due to the airflow. This operation is explained below referring to FIG. 5 and FIG. 7A.

In the recording processing, the liquid discharge head 13 moves in the first direction at a velocity V1, reaches the position PA12 at the time tA12, and the recording is completed. In the setting processing immediately after the recording processing, the liquid discharge head 13 decelerates, reaches the position PA13 at the time tA13, and stops. The position PA13 is the first direction change position.

The liquid discharge head 13 reverses the moving direction immediately after the liquid discharge head 13 stops at the position PA13, and accelerates to a velocity V2 (V2>V1) and moves in the second direction. The liquid discharge head 13 decelerates during movement at the velocity V2, reaches the position PA20 at the time tA20, and stops. The position PA20 is the second direction change position.

The liquid discharge head 13 reverses the moving direction immediately after the liquid discharge head 13 stops at the position PA20, and accelerates to the velocity V1 and moves in the first direction. The liquid discharge head 13 has the velocity A1 at the time tA21 and at the same time, the liquid discharge head 13 arrives at the position PA 21 where the setting processing is completed. The position PA21 is also a starting position of the recording processing for the next pass. In that case, the time from the starting time tA12 to the ending time tA21 of the setting processing is the first setting time.

FIG. 7B is an exemplary operation when the setting processing time is set to the second setting time. In this exemplary operation, the setting processing includes waiting processing. Namely, the pass executed immediately after this setting processing is the second state pass. If the first setting time is set as the setting processing time, the recording processing immediately after this setting processing has a conspicuous landing failure due to the airflow.

The operation executed at the second direction change position (position PA20) of the example depicted in FIG. 7B is different from that of the example depicted in FIG. 7A in which the setting processing time is set to the first setting time. In the operation depicted in FIG. 7B, the liquid discharge head 13 stops at the time tA20 (position PA20) and then executes the waiting processing. In the waiting processing, the liquid discharge head 13 stops at the standstill position PA20 during a waiting time tA20 to tA20'.

Namely, the liquid discharge head 13 does not move and waits at the position PA20 until the residual airflow weakens. Subsequent operations are the same as those of the case in which the setting processing time is set to the first setting time. In the example depicted in FIG. 7B, the time from the starting time tA12 to the ending time tA21 of the setting processing is the second setting time (=the first setting time+waiting time).

As described above, in the exemplary operation depicted in FIG. 7B, the liquid discharge head 13 waits at the second direction change position (standstill position PA20) in the unidirectional printing. The waiting processing weakens the residual airflow caused by the setting processing. The landing failure of liquid droplets is thus inhibited in the recording processing immediately after the waiting processing.

The waiting time is preferably in a range of equal to or more than 0.1 second and equal to or less than 1.0 seconds to sufficiently weakens the airflow and not to lengthen the print processing.

In the waiting processing, the liquid discharge head 13 may not completely stop at the standstill position PA20. For example, the liquid discharge head 13 may move in the vicinity of the standstill position PA20 during the waiting processing to such an extent that the landing failure is not caused in the recording processing immediately after the waiting processing. This movement in the vicinity of the standstill position PA20 during the waiting processing includes, for example, microvibration and slow reciprocating movement in the main scanning direction.

FIG. 7C is another exemplary operation when the setting processing time is set to the second setting time. In the example depicted in FIG. 7C, the setting processing is executed at low velocity overall and the waiting processing is not included in the setting processing. The waiting processing, however, may be included in the setting processing, and in that case, the airflow is further securely weakened.

The pass executed immediately after this setting processing is the second state pass. When the setting processing time of this setting processing is set to the first setting time, the recording processing immediately after this setting processing has a conspicuous landing failure due to the airflow.

The operation executed between the direction change positions (between the position PA13 and the position PA20) of the example depicted in FIG. 7C is different from that of the example in which the setting processing time is set to the first setting time. In the example depicted in FIG. 7C, the average movement velocity of the liquid discharge head 13 is low and the movement time during which the liquid discharge head 13 moves between the direction change positions is long.

The setting processing of the example depicted in FIG. 7C is executed similarly to the example depicted in FIG. 7A from the time tA12 to the time tA13. Then, the liquid discharge head 13 reverses the moving direction at the position PA13 corresponding to the time tA13 and accelerates to a velocity V3 (V2>V3). The liquid discharge head 13 decelerates during the movement at the velocity V3 and reaches the PA20 at the time tA20.

Namely, the liquid discharge head 13 moves slowly between the direction change positions, thus making the airflow weak. Subsequent operations are the same as those of the case in which the setting processing time is set to the first setting time. In the example depicted in FIG. 7C, the time from the starting time tA12 to the ending time tA21 of the setting processing is the second setting time (=the first setting time+waiting time).

As described above, when the next pass is the second state pass, the liquid discharge head 13 may move at lower velocity in the setting processing without involving the waiting processing. Since the airflow caused in the setting processing is weak, the landing failure of liquid droplets is not likely to occur in the next recording processing. The section in which the liquid discharge head 13 is moved at lower velocity is not limited to the section between the position PA13 and the position PA20. For example, the liquid discharge head 13 may be moved at lower velocity in the section between the position PA12 and the position PA13 or the section between the position PA20 and the position PA21, as compared with the case in which the setting processing time is set to the first setting time. In other words, the movement time during which the liquid discharge head 13 moves between the position PA12 and the position PA13 may be long, or the movement time during which the liquid discharge head 13 moves between the position PA20 and the position PA21 may be long, as compared with the case in which the setting processing time is set to the first setting time.

The exemplary operations of the liquid discharge head 13 in the setting processing are not limited to the above. For example, the moving velocity of the liquid discharge head 13 in the second direction may not be fixed, and the liquid discharge head 13 may move at lower velocity as time passes (as the liquid discharge head 13 approaches the standstill position PA20).

<Measure to Solve Thickening of Liquid>

When the setting processing time is set to be long (the second setting time in the first embodiment), a time during which the liquid in the vicinity of each nozzle 15 is exposed to air is long. The viscosity of liquid thus increases, deteriorating the discharge performance.

In order to solve that problem, in the first embodiment, when the setting processing time is set to the second setting time, non-discharge flushing (an operation for making the liquid in each nozzle 15 vibrate without discharging the liquid) is executed in the setting processing. The non-discharge flushing is executed during the movement from the standstill position PA20 to the position PA21 to obtain a good recovery effect of the discharge performance.

Accordingly, even when the setting processing time is long, the liquid in each nozzle 15 is stirred or agitated effectively and fresh liquid is discharged. The liquid discharge apparatus 1 may include a sensor configured to measure an ambient condition, such as a temperature sensor and a humidity sensor. For example, the viscosity of liquid easily increases as the temperature is higher. In that case, the controller 40 may increase the frequency of the non-discharge flushing. Similarly, the viscosity of liquid easily increases as the humidity is lower. In that case, the controller 40 may increase the frequency of the non-discharge flushing.

<Improvement in Accuracy of Sheet Conveyance>

In the first embodiment, when the setting processing time is set to the second setting time, the conveyance velocity of the recording sheet P may be lower than that of when the setting processing time is set to the first setting time. This enhances the conveyance precision of the recording sheet P, thus improving quality of an image obtained by the recording processing immediately after the setting processing.

<Use of Liquid Droplet Having Large Diameter>

In the recording processing of the first embodiment, the liquid droplet size to be discharged is determined for each pixel based on image data memorized in the RAM 43. In that configuration, when the next pass is the second state pass, the controller 40 may change at least image data for the starting position in the recording processing for the next pass. Specifically, the liquid droplet to be discharged in that position may be allowed to have a size larger than a value indicated by the image data.

Since the liquid droplet discharged at the starting position of the recording processing has a large size, the liquid droplet is not susceptible to the airflow. The setting processing time is thus set to be shorter by shortening the waiting time, etc. This inhibits the thickening of liquid, thus inhibiting unnecessary extension of the printing time.

<Size of Affected Area>

In the first embodiment, the size of the affected area (the length in the main scanning direction) may be set to be short as appropriate based on various viewpoints described below.

(1. Nozzle Rows)

As depicted in FIG. 3, multiple nozzle rows 16 are arranged on the nozzle surface of the liquid discharge head 13 with intervals in the main scanning direction. Here, the size of the affected area may be set for each nozzle row. Specifically, the nozzle row 16 positioned more upstream in the moving direction of the carriage 12 in the recording processing may have a smaller affected area.

For example, when the liquid droplets land on the same position, the liquid droplets discharged from mutually different nozzle rows 16 have mutually different effects from the airflow. Since the different nozzle rows 16 face different partial airflows of the airflow at the above same position, the effects from the airflow vary. A certain partial airflow faces the nozzle row 16 positioned at a downstream side in the moving direction of the carriage 12 (a direction along the main scanning direction), and then faces the nozzle row 16 positioned at an upstream side in the moving direction of the carriage 12.

The upstream-side nozzle row 16 and the downstream-side nozzle row 16 reach the above same position at different points in time during movement of the carriage 12. The time difference weakens the airflow, and thus the upstream-side nozzle row 16 faces weakened airflow (a partial airflow following the certain partial airflow). The airflow is brought into contact with the nozzle surface for a long time until each nozzle row 16 reaches the above same position. The airflow is further weakened by being brought into contact with the nozzle surface, and thus the upstream-side nozzle row 16 faces airflow further weakened.

Accordingly, the effect of the airflow on the liquid droplets from the upstream-side nozzle row 16 is smaller than that on the liquid droplets from the downstream-side nozzle row 16. The affected area corresponding to the upstream-side nozzle row 16 may have a size in the main scanning direction smaller than that of the affected area corresponding to the downstream-side nozzle row 16. Making the size of the affected area small reduces the frequency of adjustment of the setting processing time. This results in speedy image formation without deteriorating the image quality.

(2. Printing Mode)

The liquid discharge apparatus 1 includes multiple kinds of recording modes. The moving velocity of the liquid discharge had 13 depends on each of the recording modes. For example, although an image having a high image quality is formed using a fine mode, the liquid discharge head 13 moves at low velocity. Although an image having a low image quality is formed using a draft mode, the liquid discharge head 13 moves at high velocity. An image having a normal image quality is formed using a normal mode, and the liquid discharge head 13 moves at normal velocity.

The liquid discharge apparatus 1 moves the liquid discharge head 13 in the second direction at velocity depending on the recording mode. Namely, regarding the moving velocity of the liquid discharge head 13 in the setting processing when the liquid discharge head 13 moves to the standstill position immediately before the recording processing is executed, the draft mode has the fastest velocity, the normal mode has the second fastest velocity, and the fine mode has the lowest velocity. Corresponding to this, the draft mode has the strongest residual airflow, the normal mode has the second strongest airflow, and the fine mode has the weakest residual airflow.

In view of the above, the liquid discharge apparatus 1 includes affected areas having different sizes depending on the respective recording modes. The size of the affected area is smaller as the moving velocity when the liquid discharge head 13 moves to the standstill position immediately before the recording processing is executed is lower. For example, the size of the affected area when using the fine mode may be smaller than that when using the normal mode or the draft mode. This allows the affected area to have an appropriate size depending on the recording mode. Namely, the affected area having a small size is used in the case of the recording mode having low velocity. This reduces the frequency of adjustment of the setting processing time, resulting in speedy image formation without deteriorating the image quality.

(3. Width of Recording Sheet)

The liquid discharge apparatus 1 can perform printing on multiple kinds of recording sheets P having different sizes (width dimensions) in the main scanning direction. The liquid discharge head 13 moves to the standstill position over a longer distance immediately before the recording processing is executed as the width dimension of the recording sheet P is larger. The residual airflow has a greater effect on the following recording processing as the distance over which the liquid discharge head 13 moves is longer.

In view of the above, the liquid discharge apparatus 1 includes affected areas having different sizes depending on the width directions of the recording sheets P. The size of the affected area to be set is smaller as the width dimension of the recording sheet P is smaller. This allows the setting processing time to be set depending on the width dimension of the recording sheet P, making it possible to perform printing in time corresponding to the width dimension of the recording sheet P. Namely, when the width dimension of the recording sheet P is small, the size of the affected area is small. This reduces the frequency of adjustment of the setting processing time, resulting in speedy image formation without deteriorating the image quality.

(4 Image Size)

When the preceding recording processing is completed, the liquid discharge apparatus 1 reverses the moving direction of the liquid discharge head 13 and the liquid discharge head 13 moves to a starting position for the succeeding recording processing. For example, in FIG. 5, the liquid discharge head 13 moves in the main scanning direction from the position PA13 to the position PA20 where the liquid discharge head 13 stops. The residual airflow has a greater effect on the succeeding recording processing as the distance over which the liquid discharge head 13 moves is longer. This movement distance depends on the size of the image formed in the preceding recording processing.

In view of the above, the liquid discharge apparatus 1 changes the size of the affected area depending on the moving distance between the two standstill positions in the setting processing. In that case, the setting processing time is set depending on the size of the image formed in the preceding recording processing. Namely, when the size of the formed image is small, the size of the affected area is small. This reduces the frequency of adjustment of the setting processing time, resulting in speedy image formation without deteriorating the image quality.

(5. Borderless Printing)

The liquid discharge apparatus 1 can execute the recording processing using a borderless mode. In the borderless mode, a range where an image can be formed extends beyond the outsides of the recording sheet P in the main scanning direction.

Namely, in the borderless mode, each liquid droplet lands on the outside of the recording sheet P in the vicinity of the starting position of the recording processing. Thus, when the continuous area is included in the area positioned outside the recording sheet P, the image quality is hardly affected thereby. The areas positioned outside the recording sheet P in the main scanning direction may thus be removed from the affected area when using the borderless mode. This makes the affected area of the borderless mode smaller than that of the normal mode, avoiding unnecessary waiting time. Further, speedy image formation is achieved without deteriorating the image quality.

<Arrangement of Nozzle Rows>

In the first embodiment, the liquid discharge apparatus 1 executes the unidirectional printing. In that case, the liquid discharge head 13 is preferably configured as follows. The nozzle row 16 from which an achromatic liquid (e.g., black ink) is discharged or the nozzle row 16 from which a liquid having high luminosity (e.g., yellow ink) is discharged is disposed at a downstream side in the first direction of the main scanning direction from the nozzle row 16 from which any other color of liquid (e.g., cyan or magenta ink) is discharged.

Namely, when an image having a high image quality (e.g., a photo) is printed, the frequency of use of the achromatic liquid is lower than the frequency of use of the remaining other liquids. Therefore, with respect to the achromatic liquid, the affected area is not likely to include the continuous area. This reduces the frequency of adjustment of the setting processing time, resulting in speedy image formation without deteriorating the image quality.

A user has difficulty in visually observing the liquid having high luminosity compared to a liquid having low luminosity. Thus, even when the nozzle row 16 from which the liquid having high luminosity is discharged is disposed at the downstream side in the first direction, the landing failure of liquid droplets is inconspicuous and substantial image deterioration is hardly caused.

Second Embodiment

When the residual airflow passes under the nozzle surface, it mostly flows in the main scanning direction in the vicinity of a center portion in the sub-scanning direction of the nozzle surface. The vicinities of ends in the sub-scanning direction of the nozzle surface include not only a component of the main scanning direction but also a component of the sub-scanning direction. Thus, liquid droplets discharged from the ends in the sub-scanning direction of each nozzle row 16 may deviate in the sub-scanning direction from a strip-like or belt-like recording area that is long in the main scanning direction. One image is completed by connecting or seaming, in the sub-scanning direction, the belt-like recording areas that is long in the main scanning direction. The seamed or connected portion formed by the belt-like recording areas may thus suffer from the landing failure multiple times, making the deterioration in image quality conspicuous. In view of the above, in the second embodiment, the deterioration in image quality is avoided by setting the setting processing time as described below.

Figure 8A:
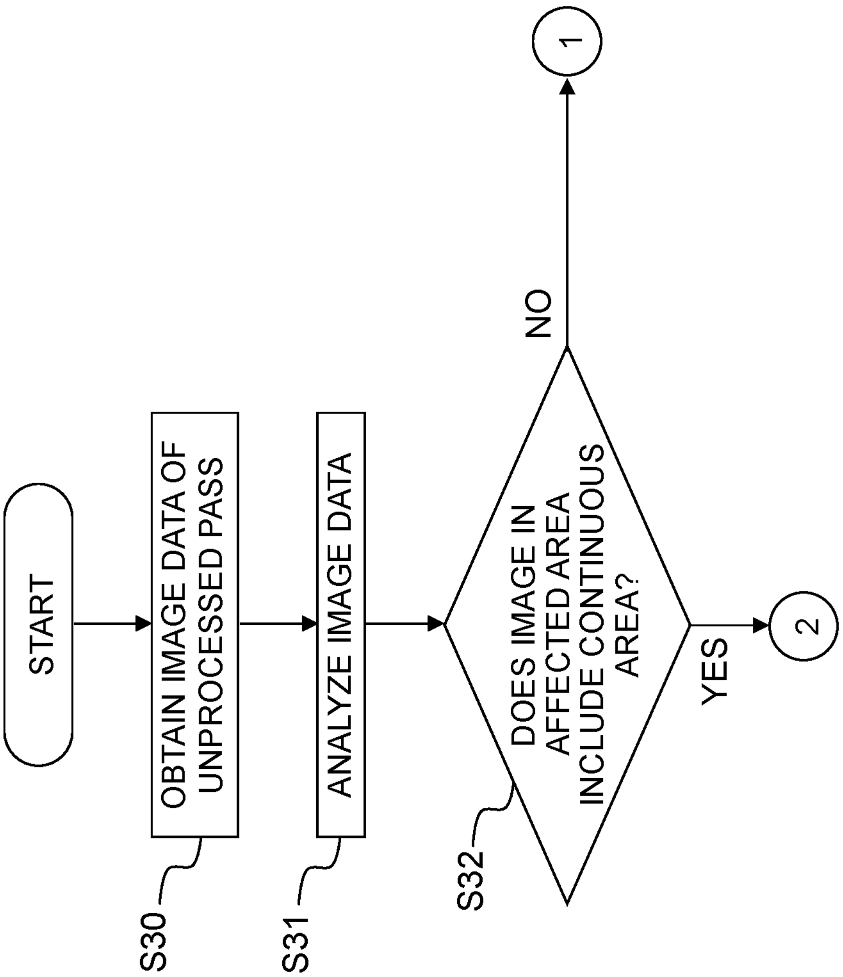
FIGS. 8A and 8B are a flowchart indicating another procedure for setting the setting processing time.
Figure 8B:
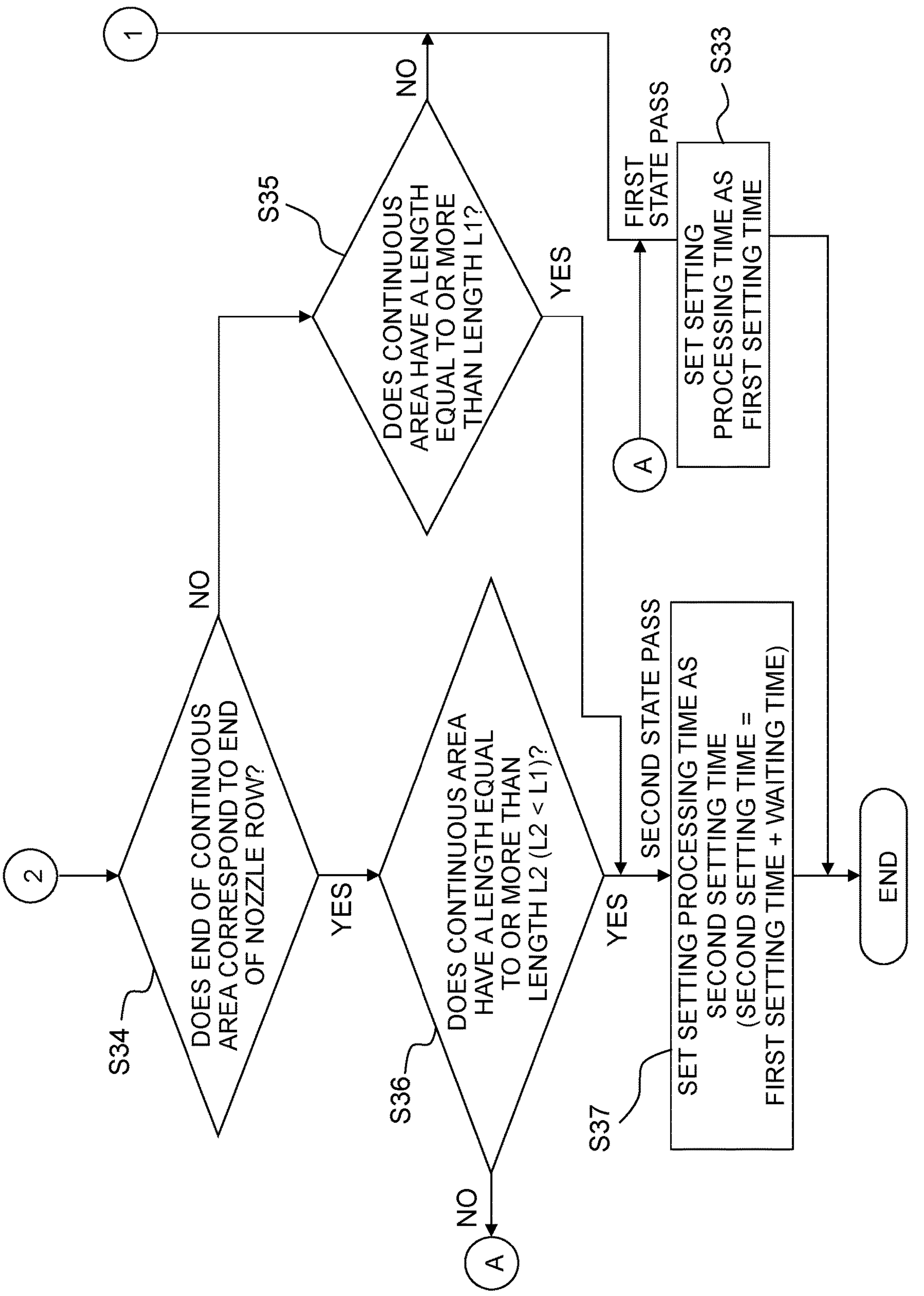

Referring to FIGS. 8A and 8B, an exemplary procedure for setting the setting processing time according to the second embodiment is explained. The controller 40 obtains image data of an unprocessed pass (step S30). The image data of the unprocessed pass typically corresponds to image data for the next recording processing. In a step S31, the controller 40 analyzes the image data to extract a continuous area. In a step S32, the controller 40 determines whether an image in an affected area includes the continuous area.

When the continuous area is not included in the affected area (S32: NO), the controller 40 sets the setting processing time as the first setting time (step S33). When the continuous area is included in the affected area (S32: YES), the controller 40 proceeds to a step S34.

In the step S34, the controller 40 determines whether an end or both ends of the continuous area correspond(s) to an end or both ends of the nozzle row 16. When the end or both ends of the continuous area does/do not correspond to the end or both ends of the nozzle row 16 (S34: NO), the controller 40 proceeds to a step S35. Similar to the step S24 of FIG. 6, the controller 40 determines in the step S35 whether the continuous area has a length equal to or more than the length L1 in the sub-scanning direction. When the length in the sub-scanning direction of the continuous area is less than the length L1 (S35: NO), the controller 40 sets the setting processing time as the first setting time (S33). When the length in the sub-scanning direction of the continuous area is equal to or more than the length L1 (S35: YES), the controller 40 proceeds to a step S37.

In the step S37, the controller 40 sets the setting processing time as the second setting time (=the first setting time+waiting time), which is longer than the first setting time.

When the controller 40 has determined in the step S34 that the end or both ends of the continuous area correspond(s) to the end or both ends of the nozzle row 16 (S34: YES), the controller 40 proceeds to a step S36. In the step S36, the controller 40 determines whether the continuous area has a length equal to or more than a length L2 in the sub-scanning direction. The length L2 is shorter than the length L1. For example, the length L2 may be, for example, 0.8 mm (<the length L1 having a length of 1.0 mm).

When the controller 40 has determined in the step S36 that the length of the continuous area is less than the length L2 (S36: NO), the controller 40 sets the setting processing time as the first setting time (S33). When the controller 40 has determined in the step S36 that the length of the continuous area is equal to or more than the length L2 (S36: YES), the controller 40 proceeds to the step S37 and sets the setting processing time as the second setting time (=the first setting time+waiting time).

As described above, when the end or both ends of the continuous area correspond(s) to the end or both ends of the nozzle row 16, the controller 40 sets the setting processing time by using the length L2 (<L1) shorter than the length L1 as a threshold value. This inhibits the landing failure of liquid droplets that may otherwise be caused multiple times in the seamed or connected portion of the belt-like recording areas, thus maintaining a high image quality.

The liquid discharge apparatus 1 may execute the recording processing when the liquid discharge head 13 moves in both one direction and the other direction of the main scanning direction. Namely, the liquid discharge apparatus 1 may be configured to execute bidirectional printing.

In the bidirectional printing, the setting processing is an operation of the liquid discharge head 13 that is executed after the recording processing for the preceding pass is completed until the recording processing for the succeeding pass is started. The time during which the setting processing is executed is the set processing time. In the bidirectional printing, the setting processing includes one standstill position where the liquid discharge head 13 reverses the moving direction.

In the bidirectional printing, the liquid discharge apparatus 1 may set the setting processing time based on the procedure indicated in FIG. 6 or FIGS. 8A, 8B. This inhibits the landing failure of liquid droplets due to the airflow similarly to the above embodiment. Namely, when the next pass is the second state pass, the liquid discharge head 13 takes the second setting time in the setting processing by executing the waiting processing or moving the liquid discharge head 13 at low velocity. This weakens the residual airflow, which inhibits the landing failure of liquid droplets in the next recording processing.

In the bidirectional printing, the liquid discharge head 13 may begin to decelerate in the middle of the recording processing for one pass. This weakens the residual airflow, which inhibits the landing failure of liquid droplets and shortens the setting processing time.

Third Embodiment

In the first embodiment, when the controller 40 has determined in the step S23 that the continuous area is smaller than the length L1 (S23: NO), the controller 40 sets the setting processing time as the first setting time in the step S24. When the controller 40 has determined in the step S23 that the continuous area is equal to or more than the length L1 (S23: YES), the controller 40 sets the setting processing time as the second setting time in the step S25. The present teaching, however, is not limited thereto.

Figure 9:
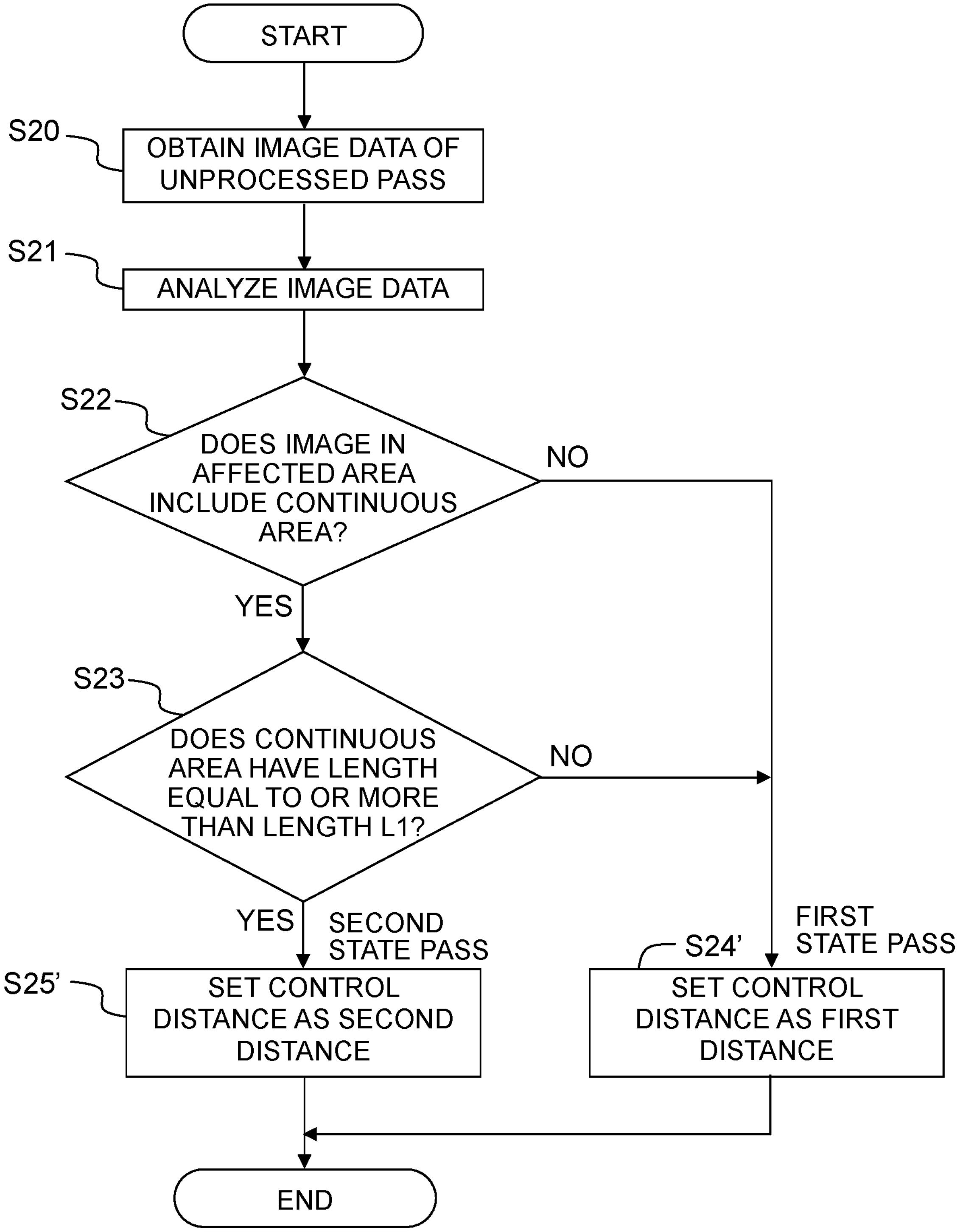
FIG. 9 is a flowchart indicating a procedure for adjusting a control distance.

For example, as indicated in FIG. 9, when the controller 40 has determined in the step S23 that the continuous area is smaller than the length L1 (S23: NO), the pass obtained is the first state pass. The controller 40 sets the control distance as a first distance (step S24'). When the controller 40 has determined in the step S23 that the continuous area is equal to or more than the length L1 (S23: YES), the pass obtained is the second state pass. The controller 40 sets the control distance as a second distance that is longer than the first distance (step S25'). The standstill position of the second state pass is farther in the second direction from the starting position than the standstill position of the first state pass. The second distance is thus longer than the first distance.

When the affected area of a certain pass includes the continuous area having a length of equal to or more than the length L1 in the sub-scanning direction (when the certain pass is the second state pass), the control distance is set to the second distance (S25') in the setting processing executed before the recording processing. The second distance is longer than the first distance. When the control distance is set to the second distance, the next recording processing is executed after the liquid discharge head 13 moves a long distance. This lengthens a time required for reciprocating movement between the starting position and the standstill position. The recording processing thus starts in a state where the airflow generated in the last setting processing is weakened. This inhibits the landing failure which may otherwise be caused by the setting processing executed immediately before the recording processing.

When the affected area of the certain pass includes the continuous area having a length of less than the length L1 (when the certain pass is the first state pass), the landing failure is inconspicuous without making the control distance long. The control distance is thus set to the first distance (S24'), speeding-up the print processing.

The control distance is set to be long when the affected area includes the continuous area. The affected area may include pixel(s). In that case, if multiple pixels may not continue in the sub-scanning direction, the landing failure is inconspicuous. The control distance is thus set to the first distance. This inhibits the time required for the setting processing (S13) from lengthening, thereby speeding-up the print processing. Further, in this embodiment, the length L1 as a threshold value for determining the continuity of pixels is set, for example, to 1.0 mm. The affected area may include the continuous area. In that case, if the continuous area has a length in the sub-scanning direction of less than the length L1, the landing failure is inconspicuous. The control distance is thus set to the first distance, speeding-up the print processing.

Figure 10A:
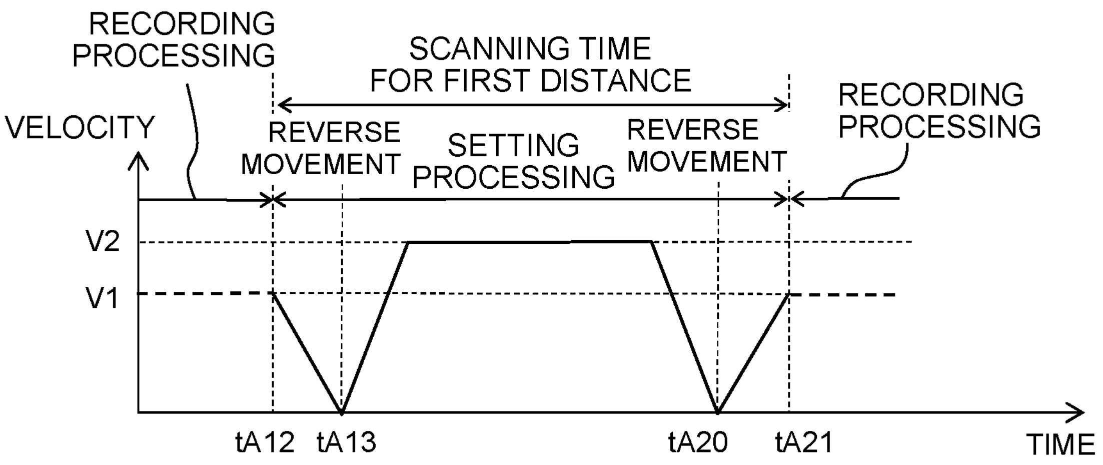
FIGS. 10A and 10B depict exemplary operations of the liquid discharge head during the setting processing.
Figure 10B:
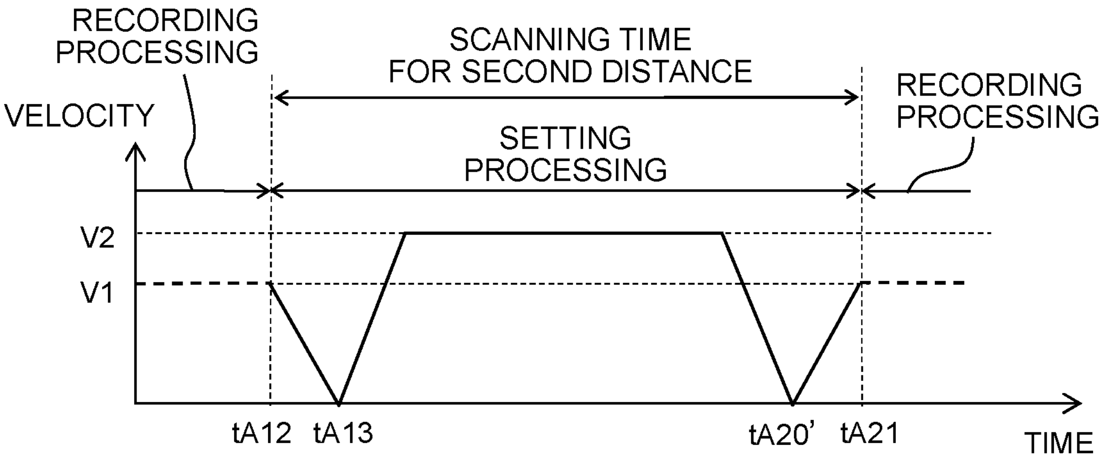

Referring to FIGS. 10A and 10B, exemplary operations of the liquid discharge head 13 in the setting processing (S13) are explained. FIGS. 10A and 10B each depict a relationship between a moving velocity and a time of the liquid discharge head 13 in the setting processing (S13). The time, which is indicated by the horizontal axis, also indicates the position of the liquid discharge head 13 at the time. For example, the number included in a time tA12 (12 in the time tA12) corresponds to the position PA12 in FIG. 5 having the identical number.

FIG. 10A is an exemplary operation when the control distance is set to the first distance. Namely, the pass executed after this setting processing is the first state pass. Even when the control distance is set to the first distance, the recording processing executed after this setting processing does not have a conspicuous landing failure owing to the airflow. The exemplary operation is explained while referring also to FIG. 5.

In the recording processing, the liquid discharge head 13 moves in the first direction at the velocity V1, reaches the position PA12 at the time tA12, and the recording is completed. In the setting processing subsequent to the recording processing, the liquid discharge head 13 decelerates, reaches the position PA13 at the time tA13, and stops. The position PA13 is the first direction change position.

The liquid discharge head 13 reverses the moving direction immediately after the liquid discharge head 13 stops at the position PA13, and moves in the second direction while accelerating to the velocity V2 (V2>V1). Then. the liquid discharge head 13 decelerates during the movement at the velocity V2, reaches the position PA20 at the time tA20, and stops. The position PA20 is the second direction change position.

The liquid discharge head 13 reverses the moving direction immediately after the liquid discharge head 13 stops at the position PA20, and moves in the first direction while accelerating to the velocity V1. The liquid discharge head 13 has the velocity V1 at the time tA21 and at the same time, the liquid discharge head 13 arrives at the position PA 21 where the setting processing is completed.

FIG. 10B is an exemplary operation in which the control distance is set to the second distance. Namely, the pass subsequent to this setting processing is the second state pass. If the control distance is set to the first distance, the recording processing subsequent to this setting processing has a conspicuous landing failure owing to the airflow.

In the operation depicted in FIG. 10B, the liquid discharge head 13 has a long scanning time and a long scanning distance when moving in the second direction at the velocity V2. Corresponding to this, the second direction change position (the standstill position PA20) is made to be farther from the starting position PA 21, making the control distance longer than the first distance.

As described above, in the operation depicted in FIG. 10B, the second direction change position (the standstill position PA20) is made to be farther from a printing area in the unidirectional printing, thus making the control distance long. This makes it possible to intentionally delay the start of the recording processing, which consequently weaken the residual airflow in the setting processing before the next recording processing starts. Accordingly, the landing failure of liquid droplets is inhibited in the next recording processing. In order to weaken the airflow sufficiently and in order not to reduce the speed of print processing, the second distance is determined so that the scanning time is extended in a range of 0.1 second to 1.0 seconds.

<Measure to Solve Thickening of Liquid>

When the control distance is set to the second distance, a time during which the liquid in the vicinity of each nozzle 15 is exposed to air is long. The viscosity of liquid thus increases, which may deteriorate the discharge performance. In order to solve that problem, in the third embodiment, when the control distance is set to the second distance (when the next pass is the second state pass), non-discharge flushing is executed in the setting processing. The non-discharge flushing is executed during the movement from the standstill position PA20 to the starting position PA21 to obtain a good recovery effect of the discharge performance. Accordingly, even when the setting processing time is long, the liquid in each nozzle 15 is stirred or agitated effectively and fresh liquid is discharged.

<S canning Velocity of Setting Processing>

When the control distance is set to the second distance, the deceleration in the setting processing may start from one side in the main scanning direction and a low-velocity area may be longer than that when the control distance is set to the first distance. This weakens the airflow, thus making the airflow effect small. Thus, even when the second distance is not considerably longer than the first distance, it is possible to inhibit the landing failure which may otherwise be caused in the next recording processing.

<Acceleration in Next Recording Processing>

When the controller 40 has determined that the next pass is the second state pass, the acceleration when the liquid discharge head 13 moves in the first direction from the standstill position (the initial acceleration of the recording processing in the next pass) may be greater than that when the controller 40 has determined that the next pass is the first state pass. This easily generates airflow that is against the residual airflow, thus inhibiting the landing failure which may otherwise be caused by the residual airflow. Accordingly, it is possible to make the affected area small and to reduce the number of times the control distance is adjusted.

<Size of Affected Area>

In the third embodiment, the size of the affected area may vary based on various viewpoints described below. When the affected area has a small size, a probability that the continuous area is included in the affected area decreases, and a probability that the controller 40 determines that the next pass is the first state pass increases. Making the number of times the control distance is adjusted as small as possible speeds up the print processing and inhibits the landing failure.

<Viscosity>

When the viscosity of liquid discharged from the liquid discharge head 13 is high, discharge velocity decreases. This easily causes the landing failure due to the airflow. In order to solve that problem, in the liquid discharge apparatus 1, the size of the affected area is made to be smaller as the viscosity of liquid is higher. This reduces the number of times the control distance is adjusted, thus speeding up the printing without deteriorating the image quality. The controller may determine the viscosity by referring to a table that defines a relationship between a period of use of the liquid and viscosity.

<Sheet Surface Gap>

When a gap between the nozzle surface and the recording sheet P (hereinafter referred to as a sheet surface gap) is large, the airflow easily passes under the nozzles and a flying distance of the liquid droplets is long. This easily causes the landing failure due to the airflow. In order to solve that problem, in the liquid discharge apparatus 1, the size of the affected area is made to be smaller as the sheet surface gap is larger. This reduces the number of times the control distance is adjusted, thus speeding up the printing without deteriorating the image quality. The sheet surface gap may be changed depending on the recording mode or the recording sheet to be used.

Fourth Embodiment

In the second embodiment, the setting processing time is set to the first processing time in the step S33, and the setting processing time is set to the second processing time in the step S37. The present teaching, however, is not limited thereto.

Figure 11A:
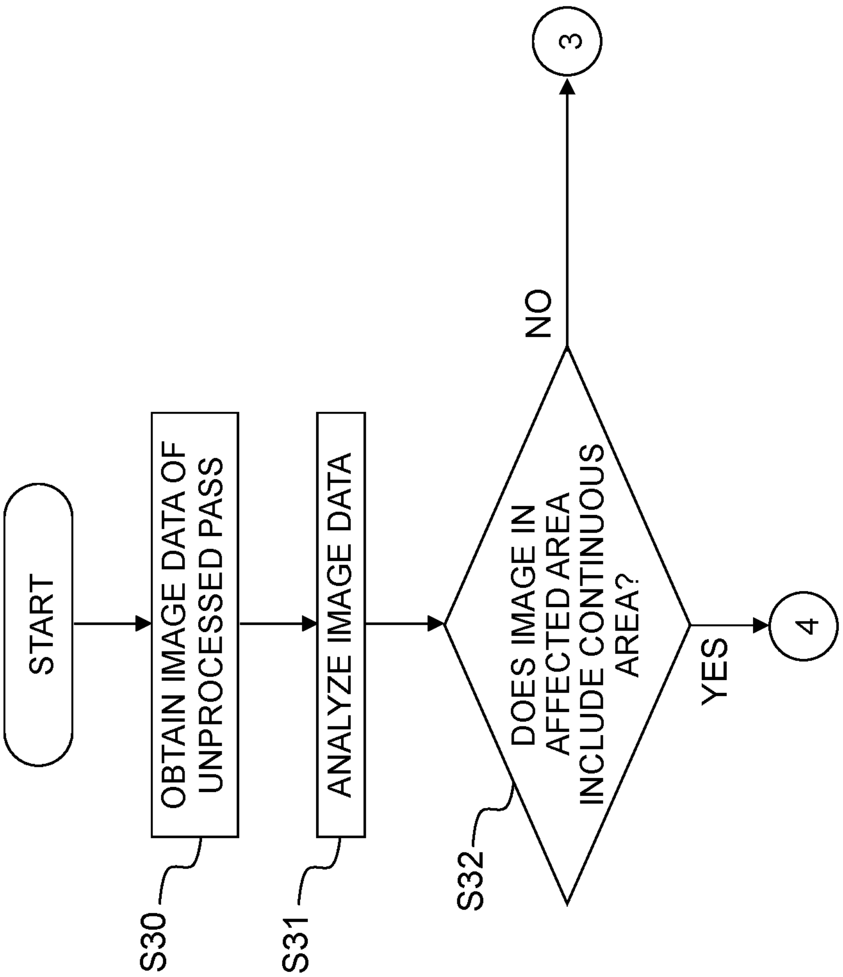
FIGS. 11A and 11B are a flowchart indicating a procedure for adjusting the control distance according to a fourth embodiment.
Figure 11B:
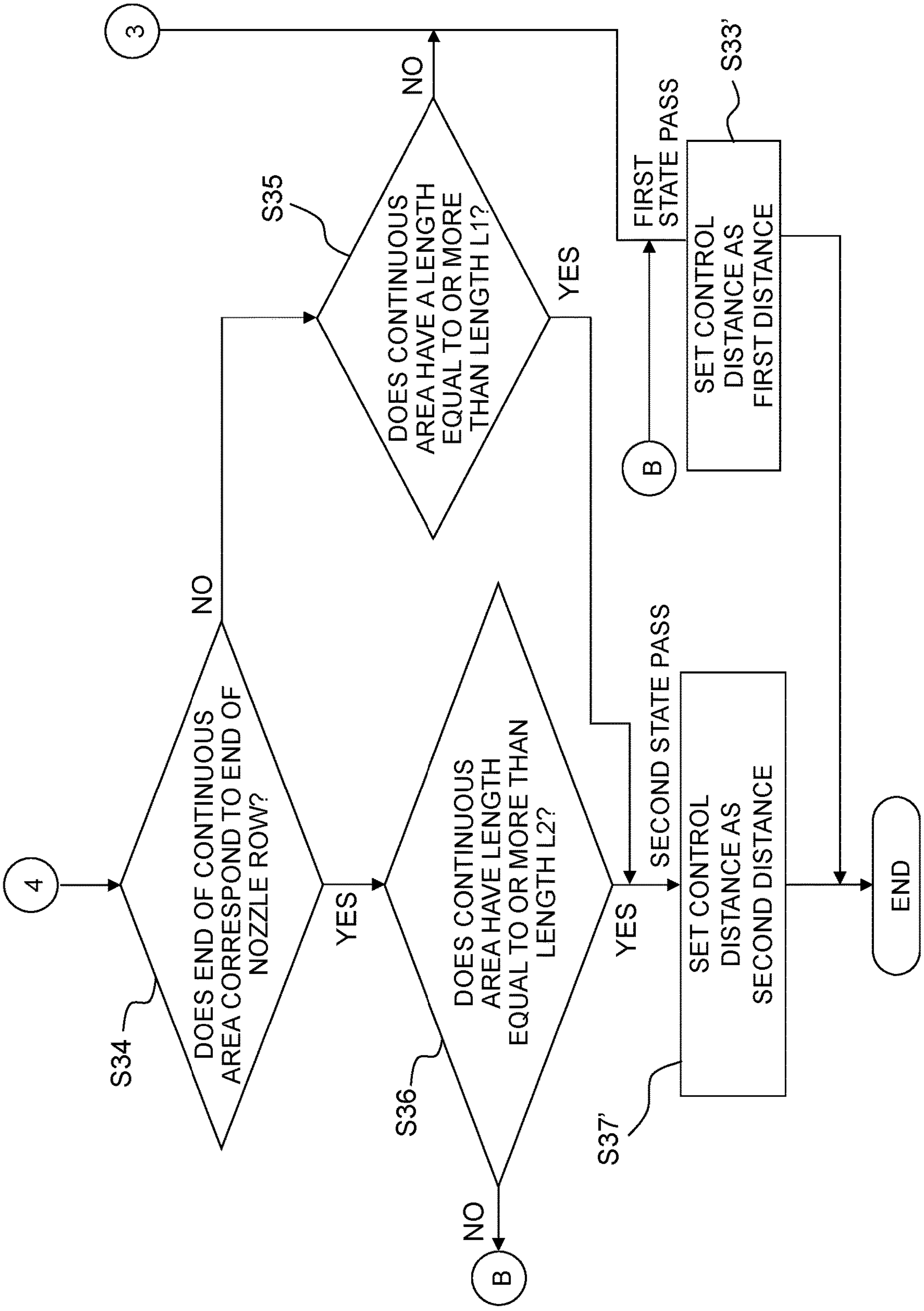

For example, as indicated in FIG. 11, when the length in the sub-scanning direction of the continuous area is less than the length L2 (S36: NO), the controller 40 sets the control distance as the first distance (S33'). When the length in the sub-scanning direction of the continuous area is equal to or more than the length L2 (S36: YES), the controller 40 sets the control distance as the second distance (S37').

When an end of the continuous area corresponds to an end of nozzle row 16, the control distance is set using the length L2 as a threshold value. The length L2 is shorter than the length L1. This inhibits landing failure portions from overlapping with each other in a seam or joint between belt-like recording areas, thus maintaining the image quality.

Fifth Embodiment

The liquid discharge apparatus 1 is required to have a small size, and the platen 3 is made as small as possible while corresponding to a width of the recording sheet P that can be used in the liquid discharge apparatus 1. In the liquid discharge head 13, a scanning range is set so that outside portions in the main scanning direction of the platen 3 are subjected to scanning Here, the scanning range is set as narrow as possible to make a casing, which defines the entire size of the liquid discharge apparatus 1, small. The second distance can thus not have a long length limitlessly in view of the scanning range and the size of the casing, which determines a maximum value of the second distance. The second distance may exceed the maximum value in order to inhibit the landing failure. In this embodiment, when the second distance exceeds the maximum value, alternative processing for inhibiting the landing failure is executed after the second distance is set to have the maximum value.

Figure 12A:
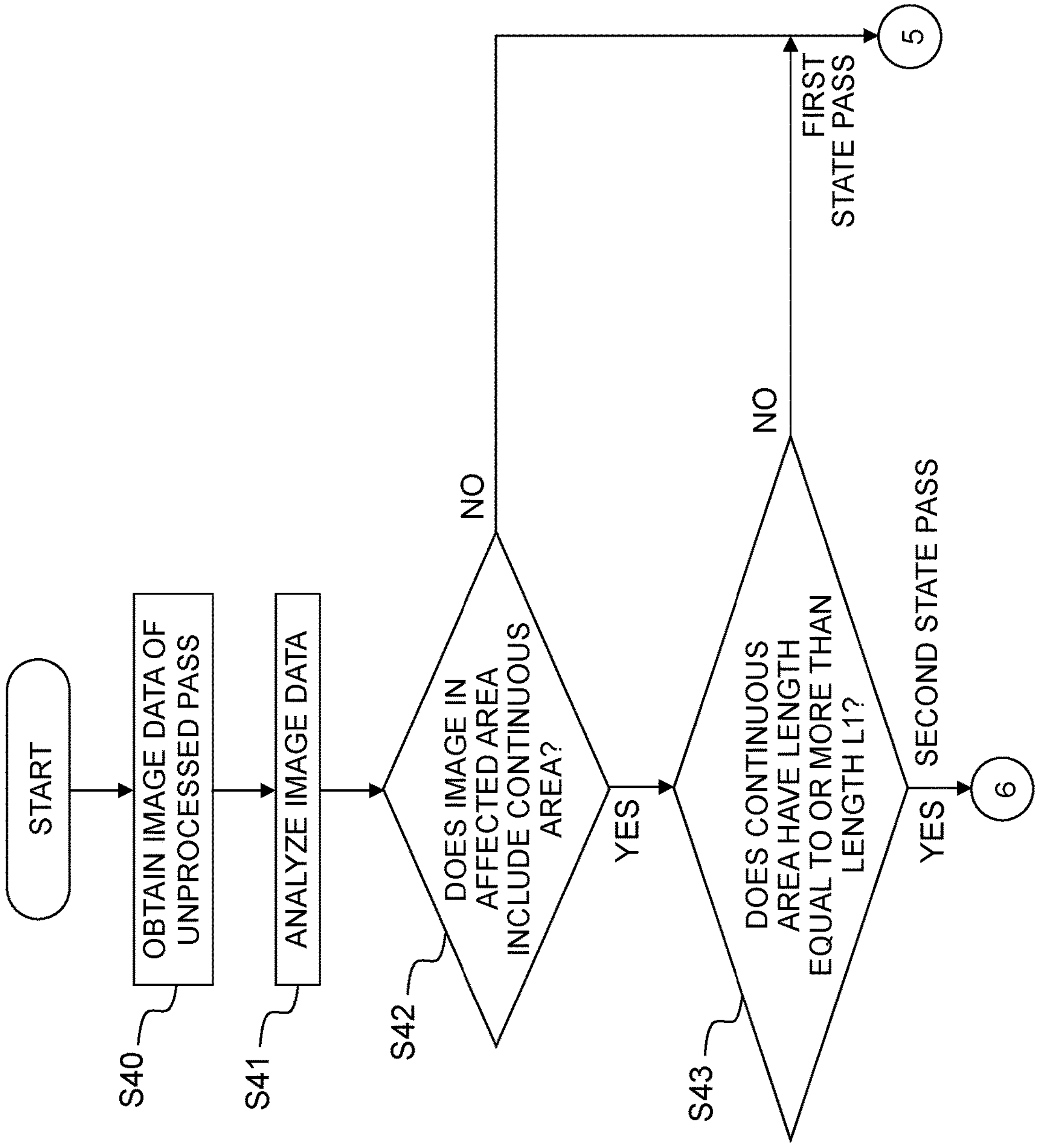
FIGS. 12A and 12B are a flowchart indicating a procedure for adjusting the control distance according to a fifth embodiment.
Figure 12B:
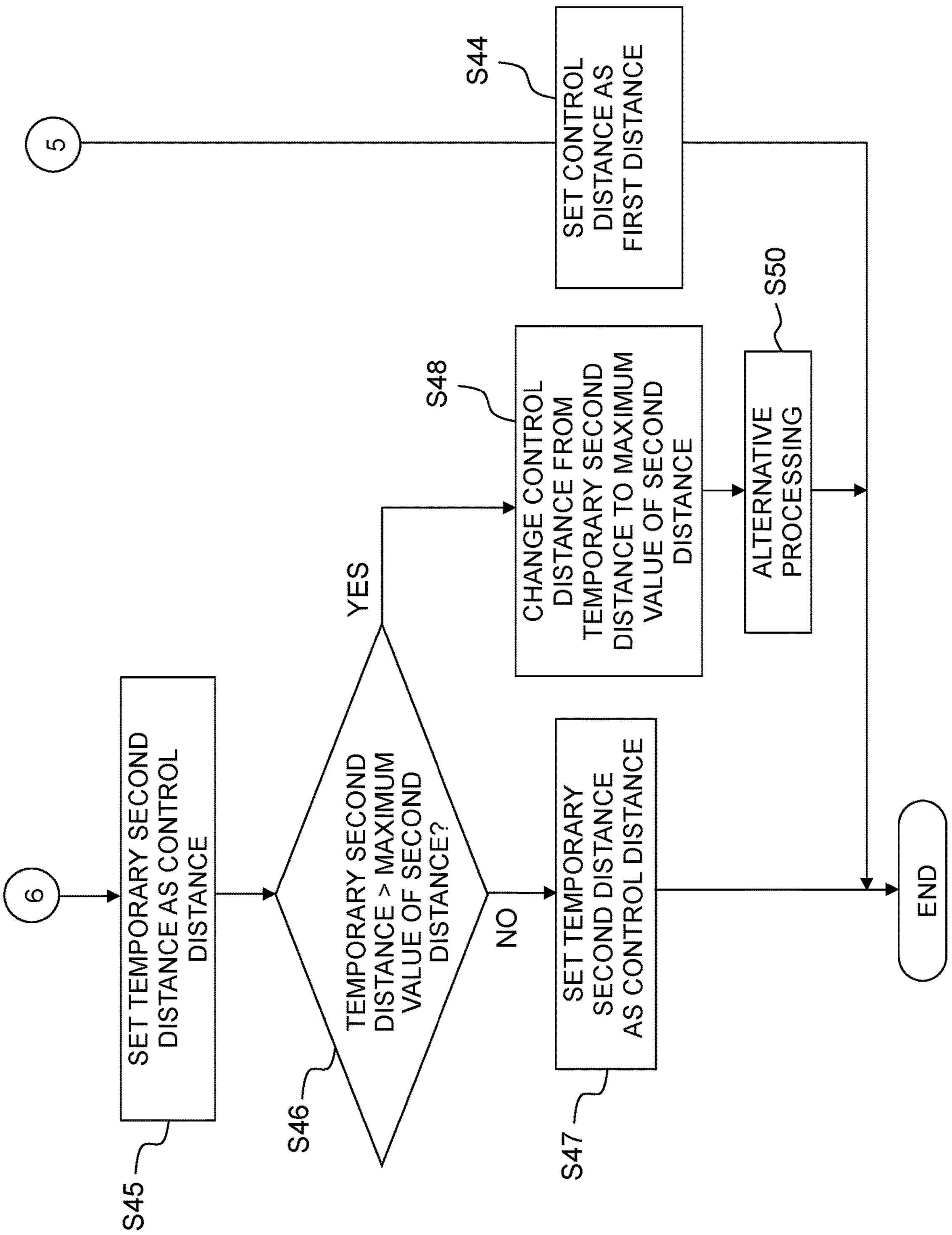

FIG. 12 is a flowchart indicating a procedure for setting the control distance according to a fifth embodiment. The controller 40 obtains image data of an unprocessed pass (step S40). The image data of the unprocessed pass typically corresponds to image data for the next recording processing. The controller 40 analyzes this image data and extracts the continuous area (S41). The controller 40 determines whether the continuous area is included in the affected area (S42). The controller 40 determines whether the continuous area has a length equal to or more than the length L1 (S43). When the continuous area is not included in the affected area (S42: NO) or when the continuous area has a length less than the length L1 (S43: NO), the controller 40 sets the control distance as the first distance (S44). When the continuous area having a length of equal to or more than the length L1 is included in the affected area (S42: YES, S43: YES), the controller 40 sets the control distance as a temporary second distance (S45). Next, the controller 40 determines whether the temporary second distance exceeds the maximum value of the liquid discharge apparatus 1 (S46). In other words, the controller 40 determines whether the standstill position PA20 that is temporarily set to extend the control distance exceeds a limit of the scanning range. When the temporary second distance does not exceed the maximum value (when the standstill position PA20 temporarily set is within the scanning range, S46: NO), the temporary second distance is set as the control distance (S47). When the temporary second distance exceeds the maximum value (S46: YES), the control distance is changed from the temporary second distance to the maximum value of the second distance (S48), and the alternative processing (S50) is executed. As the alternative processing (S50), at least one of the following processing is executed.

<Alternative Processing>

The alternative processing (S50) may be waiting processing. The waiting processing is processing in which movement of the liquid discharge head 13 is stopped for a predefined time at a position between the standstill position PA20 and the starting position PA21. This waiting processing allows the liquid discharge apparatus 1 to start the recording processing in a state where the airflow is weakened due to the elapse of the predefined time, even when the scanning distance and the scanning time are short. This inhibits the landing failure.

The alternative processing (S50) may be deceleration processing. The deceleration processing is processing for making the moving velocity of the liquid discharge head 13 in the setting processing slow. The deceleration processing lengthens the scanning time. This allows the liquid discharge apparatus 1 to start the recording processing in a state where the airflow is weakened even when the scanning distance is short. The landing failure is thus inhibited.

The alternative processing (S50) may be processing for enlarging a diameter. The processing for enlarging the diameter is processing in which the size of liquid droplets to be discharged from the nozzles 15 in the affected area is larger than a normal size. When the size of the liquid droplets is small, the liquid droplets are susceptible to the airflow and the landing failure is easily caused. The landing failure is inhibited by making the size of liquid droplets larger without shortening the control distance.

Sixth Embodiment

Figure 13:
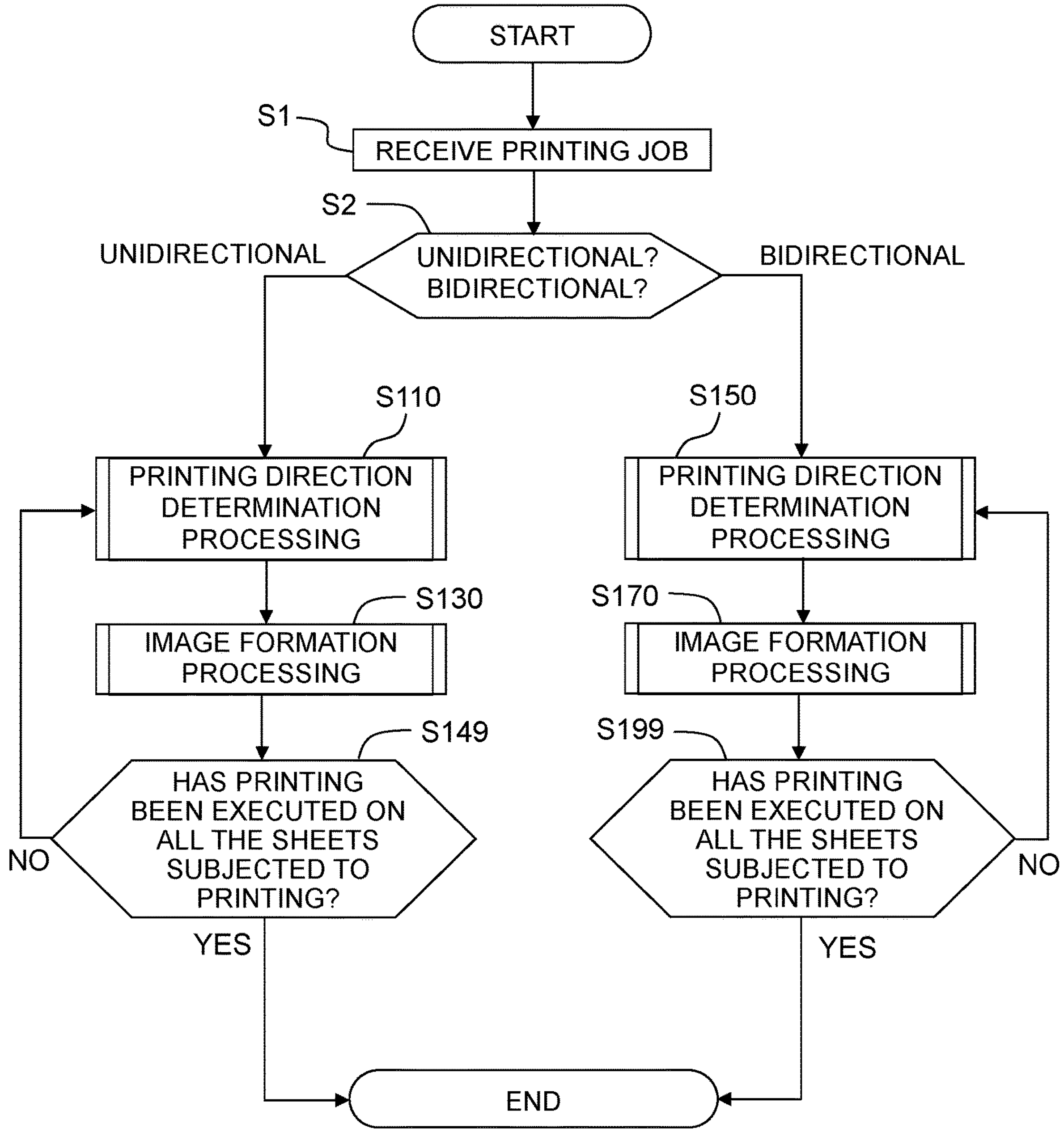
FIG. 13 is a flowchart indicating print processing according to a sixth embodiment.

Next, a sixth embodiment of the present teaching is explained. As indicated in FIG. 13, when receiving a printing job (step S1), the controller 40 determines that the printing job received is the unidirectional printing or the bidirectional printing (step S2).

When the unidirectional printing is executed (S2: unidirectional printing), the controller 40 executes printing direction determination processing (step S110) on one recording sheet P to be printed next. In the printing direction determination processing, the controller 40 determines whether an image is formed by discharging the liquid during the scanning in the first direction or an image is formed by discharging the liquid during the scanning in the second direction. Subsequently, the controller 40 executes image formation processing (step S130) in which an image is formed on the recording sheet P in accordance with the printing direction determined. When printing is needed to be continuously executed on another recording sheet P (S149: NO), the controller 40 executes the printing direction determination processing (S110) on the recording sheet P to be printed next, and then executes the image formation processing (S130) in accordance with the determination result. When printing is not needed to be continuously executed on another recording sheet P (S149: YES), the print processing is completed. When the print processing is completed, the liquid discharge head 13 returns to the storing position and the nozzle surface is covered with the cap.

Figure 14:
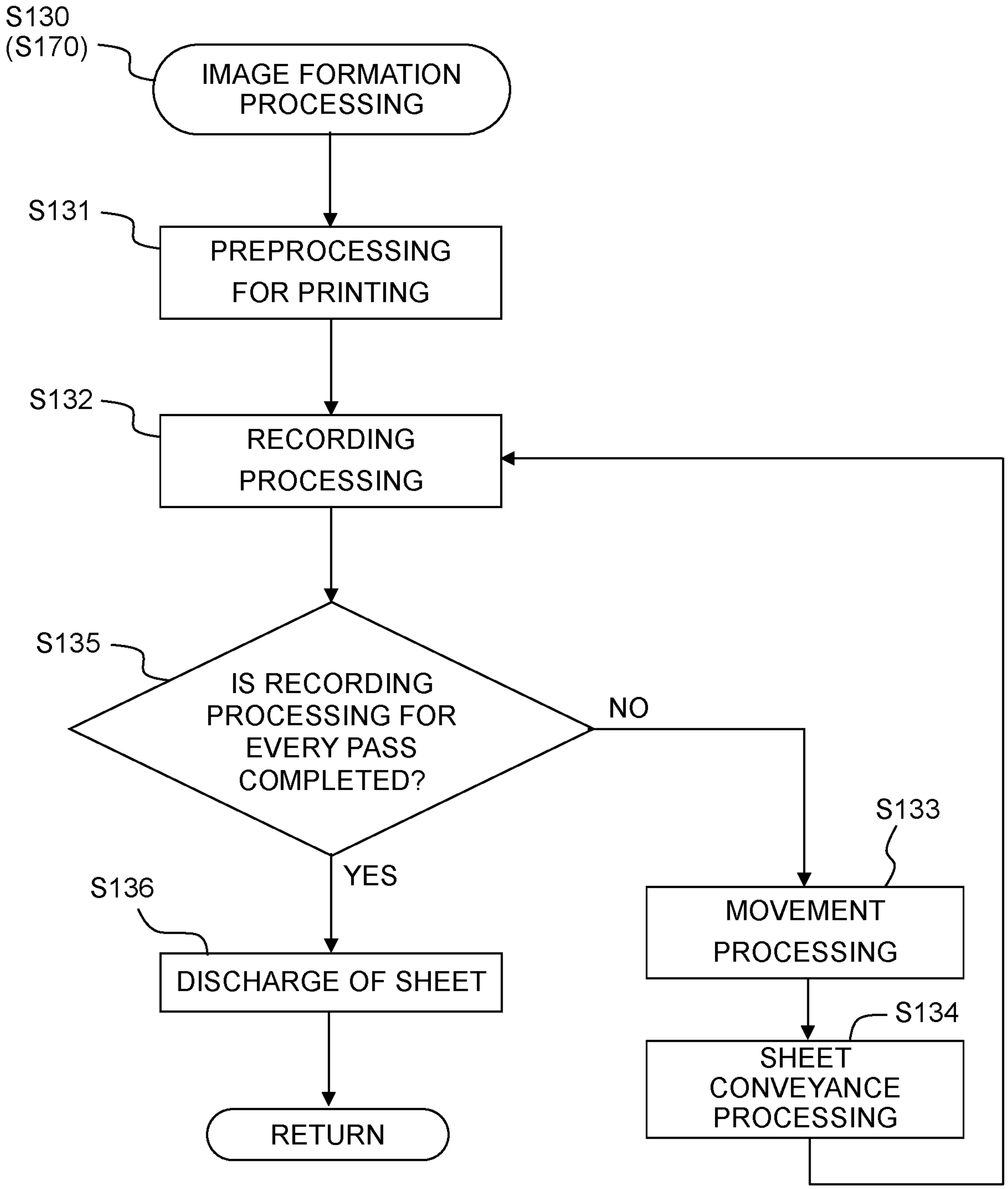
FIG. 14 is a flowchart indicating image formation processing.

Referring to FIG. 14, the image formation processing (S130) is explained first. In the image formation processing (S130), the controller 40 executes the preprocessing for printing (S131). In the preprocessing for printing, the controller 40 feeds the first recording sheet P from the feed tray 10 and supplies it on the platen 11. The controller 40 removes the cap from the nozzle surface and adjusts the meniscus as needed. When the meniscus is adjusted, the liquid discharge head 13 moves from the storing position to the maintenance position. The liquid discharge head 13 is driven in the maintenance position to execute the flushing predetermined number of times. Then, the controller 40 drives the carriage motor 29 to move the liquid discharge head 13 in the first direction.

When the liquid discharge head 13 has arrived at the starting position of the first recording processing, the controller 40 starts processing related to this pass. Here, "one pass" in the image formation processing (S130) includes a series of processing including one recording processing (S132), one movement processing (S133), and one sheet conveyance processing (S134).

In the recording processing (S132), the controller 40 moves the liquid discharge head 13 in the main scanning direction. The controller 40 discharges the liquid from the nozzles 15 in synchronization with this movement. This forms a belt-like image on the recording sheet P. One recording processing (S132) is processing in which an image is recorded on the recording sheet P during movement of the liquid discharge head 13 in the main scanning direction from a recording start position to a recording stop position. At the recording start position, the liquid discharge head 13 starts the discharge of liquid on the recording sheet P. At the recording stop position, the discharge of liquid from the liquid discharge head 13 to the recording sheet P is stopped.

When completing the recording processing (S132), the controller 40 determines whether the recording processing for every pass required to form an image on one recording sheet P is completed (S135). When the recording processing is not completed (S135: NO), the controller 40 executes the movement processing (S133) and the sheet conveyance processing (S134) so that the operation is continuously executed for the next pass.

In the recording processing (S132) for the next pass, similar to the last recording processing (S132), an image is recorded on the recording sheet P during the movement of the liquid discharge head 13 in the main scanning direction from the recording start position to the recording stop position. In the following, of recording processing executed multiple times to form an image on one recording sheet P, any recording processing except for the last recording processing is referred to as "first recording processing", and recording processing executed next to the first recording processing is referred to as "second recording processing". The recording start position of the second recording processing is simply referred to as "next recording start position", and the recording stop position of the second recording processing is simply referred to as "next recording stop position".

The movement processing (S133) is processing in which the liquid discharge head 13 moves in the main scanning direction from the recording stop position of the first recording processing (S132) to the next recording start position, after the first recording processing (S132) is completed before the second recording processing (S132) is started. This movement includes "basic movement" in which the liquid discharge head 13 moves in the main scanning direction from the recording stop position of the first recording processing (S132) to the next recording start position and "additional movement" in which the liquid discharge head 13 moves in the main scanning direction along a route different from that ranging from the recording stop position of the first recording processing (S132) to the next recording start position. Specific examples of the basic movement and the additional movement are described below referring to FIG. 5.

In the sheet conveyance processing (S134), the recording sheet P is conveyed in the sub-scanning direction. Although the movement processing (S133) and the sheet conveyance processing (S134) are described sequentially in FIG. 14 for convenience, the movement processing (S133) may be executed in parallel with the sheet conveyance processing (S134). After the movement processing (S133) and the sheet conveyance processing (S134), the controller 40 starts the second recording processing (S132) at the next recording start position.

The controller 40 repeatedly executes the series of processing corresponding to "one pass" and indicated in the steps S132 to S134. When the recording processing for every pass is completed (S135: YES), the controller 40 controls the sheet conveyer to discharge the recording sheet P on the discharge tray 14 (step S136). Accordingly, the image formation processing (S130) for one recording sheet P is completed.

The operations depicted in the steps A2 and A3 of FIG. 5 correspond to the recording processing (S132, first recording processing). The operations depicted in the steps A4 to A6 of FIG. 5 correspond to the movement processing (S133). In this case, the basic movement is defined as movement of the liquid discharge head 13 from the recording stop position PA12 of the first recording processing to the next recording start position PA21. The additional movement is defined as reciprocating movement of the liquid discharge head 13 between the next recording start position PA21 and the direction change position PA20. The basic movement can be said as movement of the liquid discharge head 13 executed above the recording sheet P before the second recording processing (S132). The additional movement can be said as movement of the liquid discharge head 13 executed after the basic movement in which the liquid discharge head 13 makes a detour and returns to the next recording start position PA21.

The basic movement causes airflow (a current of air) in the vicinity of the carriage 12. In the following, the current of air generated by the basic movement may be referred to as "return air current". In general, the distance between the direction change position PA20 and the next recording start position PA21 is set as short as possible depending on the acceleration that can be achieved by the carriage motor 51 so that the distance allows the scanning velocity to increase from zero to the scanning velocity in the recording processing (S132). The time required for the movement from the direction change position PA20 to the next recording start position PA21 is very short, and thus the second recording processing (S132) starts in a state where the return air current remains. In that case, a pixel at an end of the partial image (a pixel to be formed at the next recording start position PA21) and the vicinity thereof may suffer from the landing failure. The "landing failure" in this embodiment means a phenomenon in which the liquid droplets discharged from the nozzles 15 deviate or are drifted by the return air current and the landing position of the liquid droplets on the recording sheet P is shifted from an intended position. The landing failure would deteriorate the image quality of an edge or end of the image to be formed on the recording sheet P.

In order to inhibit the landing failure, the moving distance, especially, the distance of the additional movement of the liquid discharge head 13 is adjusted in the movement processing (S133) in this embodiment. The landing failure caused by the return air current does not deteriorate the image quality in the vicinity of the direction change position PA13. Thus, the distance from the recording stop position PA12 to the direction change position PA13 is set as a constant distance for every pass. The constant distance is required to decelerate the liquid discharge head 13 so that the liquid discharge head 13 can start movement in the second direction as soon as possible. The distance of the additional movement is adjusted by shifting, in the main scanning direction, the direction change position PA20 at one side of the next recoding start position PA21. When the unidirectional printing is executed and when the moving distance of the movement processing (S133) is adjusted, the distance of the basic movement is constant by determining a pixel to be recorded in the first recording processing (S132) and a pixel to be recorded in the second recording processing (S132). Thus, when the sum total of the moving distances in the movement processing (S133) is calculated, only the distances of the additional movement may be extracted and added up.

The controller 40 executes the setting processing in which the distance of the additional movement in the movement processing (S133) executed between the first recording processing (S132) and the second recording processing (S132) is set as the first distance or the second distance longer than the first distance, depending on an image of a first area that is included in an image of image data and that may suffer from the landing failure in the second recording processing (S132) due to the return air current. When the image of the first area is not likely to suffer from the landing failure in the second recording processing (S132), or when the landing failure is not likely to deteriorate the image quality, the distance of the additional movement is set as the first distance shorter than the second distance, thus inhibiting the decrease in printing velocity. When the image quality may deteriorate due to the landing failure that is likely to occur in the image of the first area in the second recording processing (S132), the distance of the additional movement is set as the second distance longer than the first distance to inhibit the deterioration in image quality.

The same is true of the unidirectional printing in which liquid is discharged during the scanning in the second direction, except that the first and second directions are reversed to those in the unidirectional printing in which liquid is discharged during the scanning in the first direction.

The first area is set in a predefined range from the recording start position. The predefined range is a range closer to the recording start position than to the recording stop position. In the unidirectional printing in which liquid is discharged during the scanning in the first direction, for every pass, the recording start position and the first area are set at a first side in the scanning direction. In the unidirectional printing in which liquid is discharged during the scanning in the second direction, for every pass, the recording start position and the first area are set at a second side in the scanning direction. For example, the number of images that are likely to suffer from the landing failure may be large at the first side in the scanning direction and the number of images that are likely to suffer from the landing failure may be small in the second side. In that case, when the unidirectional printing in which liquid is discharged during the scanning in the first direction is executed, the distance of the additional movement is long and it takes a long time for printing. Thus, when the unidirectional printing is executed (S2: unidirectional printing), the controller 40 of this embodiment executes the printing direction determination processing (S110) before the image formation processing (S130). In the printing direction determination processing (S110), the controller 40 determines which of printing in the first direction and printing in the second direction completes the operation in a short time.

Figure 15:
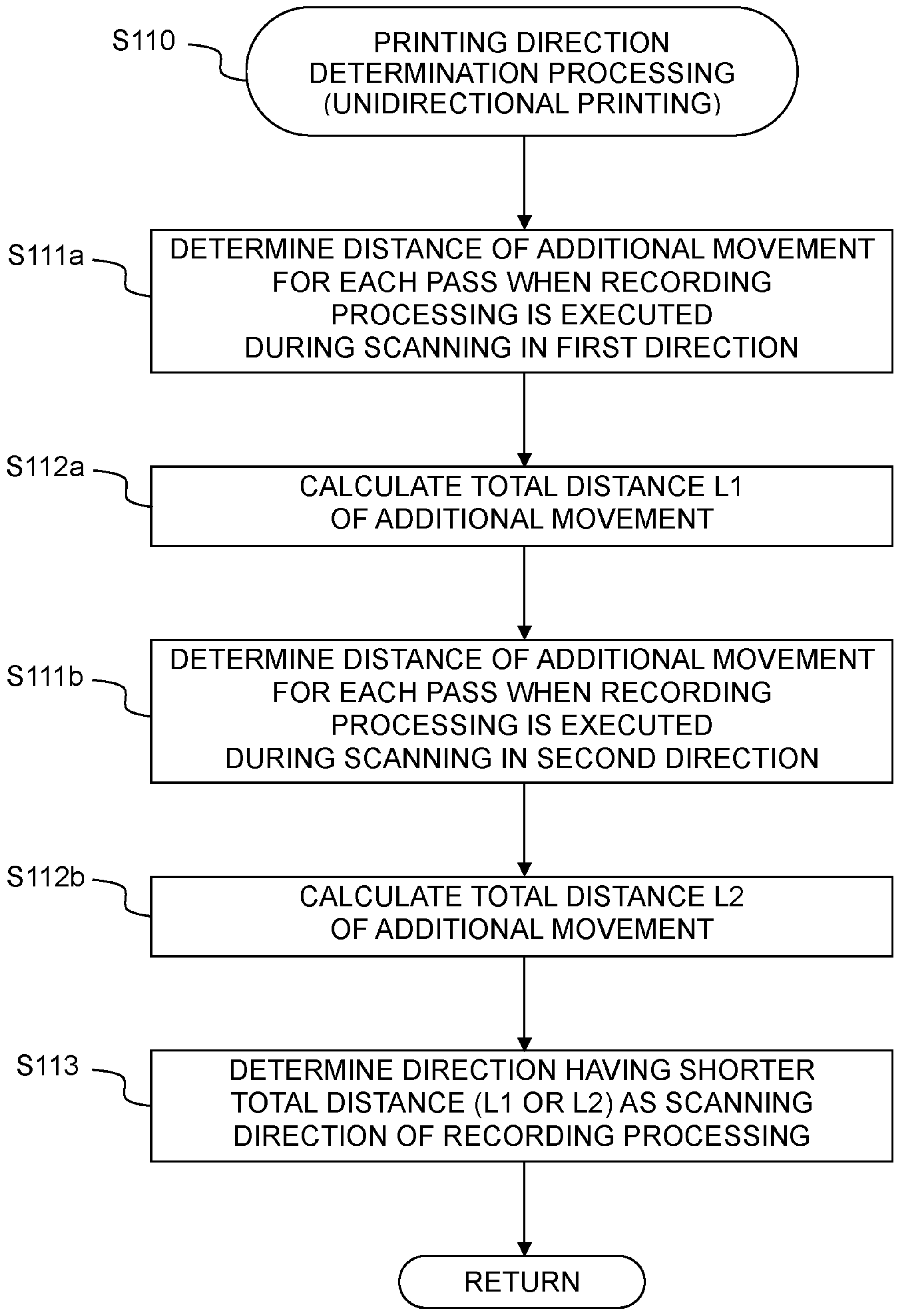
FIG. 15 is a flowchart indicating printing direction determination processing when unidirectional printing is executed.

FIG. 15 indicates a procedure of the printing direction determination processing (S110). As indicated in FIG. 15, the controller 40 determines the distance of the additional movement for each pass when the recording processing is executed during the scanning in the first direction, based on a printing job received and image data to be formed on the recording sheet P (S111*a*). Then, the controller 40 calculates a total distance L1 of the distances of the additional movements determined (S112*a*). The controller determines the distance of the additional movement for each pass when the recording processing is executed during the scanning in the second direction based on the same image data (S111*b*). Then, the controller 40 calculates a total distance L2 of the distances of the additional movements determined (S112*b*). The total distance L1 is compared to the total distance L2, and the direction having a shorter total distance is determined as the scanning direction when the recording processing is executed to form an image on the recording sheet P (S113). When the total distance L1 is shorter than the total distance L2, the controller 40 executes the recording processing in the image formation processing (S130) during the scanning in the first direction. When the total distance L2 is shorter than the total distance L1, the controller 40 executes the recording processing in the image formation processing (S130) during the scanning in the second direction.

In this embodiment, the distance of the additional movement for each pass is determined based on a basic moving amount in the first recording processing, a moving velocity of the basic movement in the first recording processing, a liquid droplet amount to be used in the first area in the second recording processing, a liquid droplet size to be used in the first area in the second recording processing, a hue or color of the liquid to be used in the first area in the second recording processing, and a position in the main scanning direction of each nozzle row 16.

The size in the main scanning direction of the first area is determined based on the basic moving amount and the basic moving velocity in the first recording processing (S132). A first limit in the main scanning direction of the first area is the next recording start position. A second limit is set as a position separated from the next recording start position (the first limit) and close to the recording stop position by an amount corresponding to the size in the main scanning direction of the first area.

The basic moving amount in the first recording processing (S132) depends on the size in the main scanning direction of the belt-like image to be formed in the first recording processing (S132). When the size in the main scanning direction of the belt-like image is small, the basic moving amount is small. The moving velocity of the basic movement in the first recording processing (S132) depends on the recording mode. The moving velocity of the liquid discharge head 13 using a recording mode required to provide high image quality is lower than that of the liquid discharge head 13 using a recording mode required to provide high-speed printing. The moving velocity of the liquid discharge head 13 using the recording mode required to provide high-speed printing is higher than that of the liquid discharge head 13 using the recording mode required to provide high image quality.

In this embodiment, the controller 40 stores a first control rule in which the size in the main scanning direction of the first area is mapped to the basic moving amount and the basic moving velocity. The first control rule may be a look-up table or an arithmetic expression. FIG. 16A is an exemplary look-up table. The moving amount is divided into three categories (D1, D2, and D3), and the velocity is divided into three categories (V1, V2, and V3). The size in the main scanning direction of the first area can be determined using any of 9 (3×3) combinations. In the first control rule, the first area is lager as the basic moving amount is greater. The first area is larger as the basic moving velocity is faster. This is because, if the basic moving amount is great and the basic moving velocity is fast, the return air current caused thereby would be strong and an area suffering from the landing failure would be large. The controller 40 determines the size in the main scanning direction of the first area in accordance with the first control rule.

After setting the first area, the controller 40 counts the number of dots (the number of liquid droplets) to be included in the first area in the second recording processing (S132). The distance of the additional movement is typically determined based on the number of dots. In this embodiment, however, a weighing calculation described below is executed and the distance of the additional movement is determined based on the position of the nozzle row 16. The number of dots is thus calculated for each category depending on the hue (color) and the liquid droplet size. For example, when four kinds of colors (black (K), yellow (Y), cyan (C), and magenta (M)) are used and three kinds of liquid droplet sizes (large droplet (L), medium droplet (M), and small droplet(S)) are used, the number of dots is counted using any of 12 (4×4) combinations. In FIG. 16B, dKL means a dot count (d) of the large droplet (L) of the black ink(K) included in the first area, and dMS means a dot count (d) of the small droplet (S) of the magenta ink (M) included in the first area.

Subsequently, the dot count for each category is corrected through the weighing calculation. As depicted in FIG. 16C, the controller 40 stores weighing coefficients corresponding to the respective categories. For example, wKL is a weighing coefficient (w) corresponding to a black large droplet (KL), and wMS is a weighing coefficient (w) corresponding to a magenta small droplet (MS). Since the large droplet is not likely to be drifted or moved by the return air current compared to the small droplet, the landing failure is not likely to occur. Thus, the weighing coefficient is set to be smaller as the liquid droplet size is lager. The landing failure of yellow ink on a white recording medium is more inconspicuous than that of other inks, which would not lead to the deterioration in image quality. Thus, the weighing coefficient for the yellow ink is set to be smaller than those for other inks having the same liquid droplet size.

Subsequently, an “effect index” is determined for each color based on the dot count of each category and the weighing coefficient corresponding thereto. The effect index is a numerical value determined by correcting a total dot count in the first area by use of the weighing coefficient. The effect index quantitatively indicates the degree of the decrease in image quality that may be caused by the landing failure. For example, the effect index of the black ink is determined by dKL×wKL+dKM×wKM+dKS+wKS. The same is true of the effect indexes of other colors of inks. This lengthens/shortens the distance of the additional movement based on the relationship between the landing failure and the liquid droplet size, the color, instead of determining the distance of the additional movement only based on the dot count. Accordingly, the landing failure is inhibited and the printing velocity is increased.

Subsequently, the distance of the additional movement for each color is determined based on the effect index. A basic value of the distance of the additional movement is determined first, and the basic value is corrected depending on the position of the nozzle row 16. The basic value of the distance of the additional movement is determined in accordance with a second control rule that is common to multiple colors of inks. The second control rule may be a look-up table or an arithmetic expression. The basic value is higher, as the numerical value of the effect index is higher.

In this embodiment, the nozzle rows 16 include a black row, a cyan row, a yellow row, and a magenta row that are arranged in this order from the first side to the second side in the main scanning direction. When the recording processing is executed during the scanning in the first direction, the magenta row arranged at an end at the second side in the main scanning direction faces the return air current first, and the black row arranged at an end at the first side in the main scanning direction faces the return air current last. The magenta row positioned on the windward side is more susceptible to the return air current than the black row positioned on the leeward side. Thus, when the recording processing is executed during the scanning in the first direction, the basic value for the distance corresponding to the black row is corrected to be smaller than that for the distance corresponding to the magenta row. When the recording processing is executed during the scanning direction in the second direction, the relationship between the position of the nozzle row 16 and the degree of effect of the return air current is reversed to that when the recording processing is executed during the scanning direction in the first direction. Thus, the basic value for the distance corresponding to the magenta row is corrected to be smaller than the basic value for the distance corresponding to the black row.

The distance of the additional movement for each nozzle row included in one liquid discharge head 13 is determined by the above determination method. The controller 40 thus determines a maximum value of multiple distances determined for the respective nozzle rows as the distance of the additional movement in the movement processing (S133).

As described above, the distance of the additional movement in one movement processing (S133) is determined. The total distances L1 and L2 are calculated by adding up the moving distances of all the passes. The direction having a shorter total distance (the total distance L1 or the total distance L2) is determined as the scanning direction of the unidirectional printing to be executed on one recording sheet P (i.e., the moving direction of the liquid discharge head 13 in the first recording processing). It is thus possible to inhibit the landing failure and to increase the printing velocity.

Figure 17:
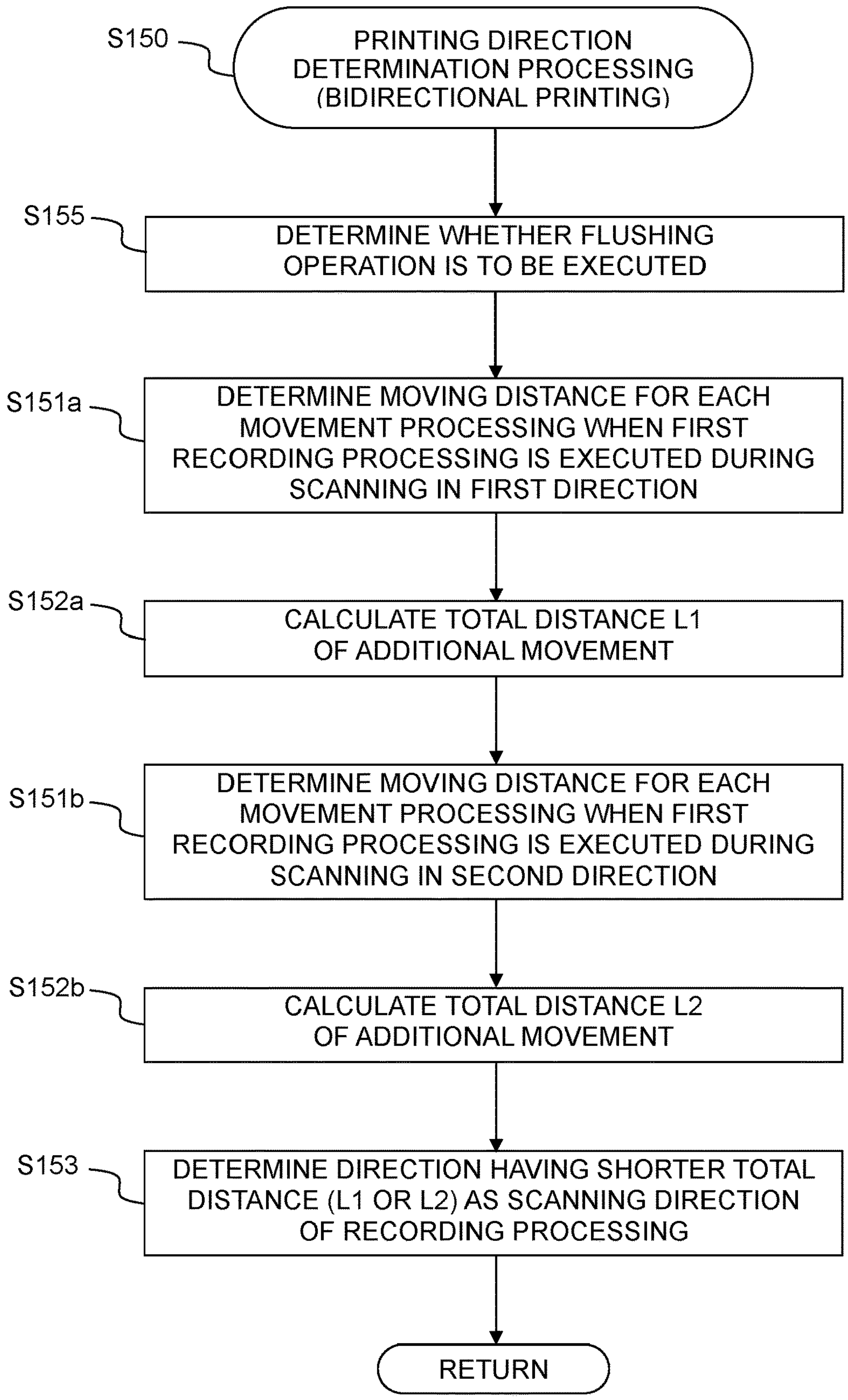
FIG. 17 is a flowchart indicating printing direction determination processing when bidirectional printing is executed.

Next, a case in which the bidirectional printing is executed is explained. As indicated in FIG. 17, in the bidirectional printing, the printing direction determination processing (S150) and the image formation processing (S170) are executed similarly to the unidirectional printing. The image formation processing (S170) in the bidirectional printing is basically the same as the image formation processing (S130) in the unidirectional printing (see FIG. 14). However, in the recoding processing (S132), liquid is discharged during the movement in the first direction and the movement in the second direction, thereby forming an image on the recording sheet P. Thus, in the movement processing (S133), the liquid discharge head 13 makes a U-turn from the recording stop position of the first recording processing to the next recording start position. Namely, the moving distance in the moving processing (S133) in the bidirectional printing is relatively short. The landing failure, however, may occur in the second recording processing (S132) like the unidirectional printing. This is because the movement of the liquid discharge head 13 in the first recording processing generates the return air current, and the return air current remains when the second recording processing (S132) starts.

It is assumed that, in the bidirectional printing, a flushing operation is executed before the first recording processing (S132) (i.e., in the preprocessing for printing). When the first recording processing (S132) is executed during the movement of the liquid discharge head 13 in the first direction, the liquid discharge head 13 moves from a home position to a flushing position and executes the flushing operation. The liquid discharge head 13 starts the recoding processing (S132) immediately after the flushing operation. When the first recording processing (S132) is executed during the movement of the liquid discharge head 13 in the second direction, the liquid discharge head 13 moves from the home position to the flushing position and executes the flushing operation. Then, the liquid discharge head 13 moves across the recording sheet P in the first direction without discharging liquid, and starts the recording processing (S132) after switching the moving direction from the first direction to the second direction. As described above, after the flushing operation, the liquid discharge head 13 may execute the first recording processing (S132) during the movement in the second direction. In that case, the moving distance is lengthened by an amount corresponding to the moving distance (hereinafter, referred to as an initial moving distance) from the flushing position to the first recording start position.

The flushing operation may not be executed. In that case, when the first recording processing (S132) is executed during the movement of the liquid discharge head 13 in the first direction, the liquid discharge head 13 is required to move in the second direction from the home position without discharging liquid. This movement, however, can be executed parallelly to the conveyance operation of the recording sheet P, thus not lengthening the moving distance and moving time.

In the printing direction determination processing in the bidirectional printing, the controller 40 determines whether the flushing operation is to be executed in the preprocessing for printing (S155). After that, similar to the unidirectional printing, the controller 40 calculates the moving distance for each movement processing when the first recording processing is executed during the scanning in the first direction (S151*a*) and calculates the total distance L1 of the moving distances (S152*a*). Further, the controller 40 calculates the moving distance for each movement processing when the first recording processing is executed during the scanning in the second direction (S151*b*) and calculates the total distance L2 of the moving distances (S152*b*). The flushing operation may be executed when the total distance L2 is used. In that case, the initial moving distance is added. The direction having a shorter total distance (the total distance L1 or the total distance L2) is determined as the moving direction of the first recording processing (S153).

Accordingly, in the bidirectional printing, the landing failure is inhibited and the printing velocity is increased while the flushing operation in the preprocessing for printing is reflected thereon.

The embodiments of the present teaching are explained above. Changes and modifications, additions and/or deletions may be made to the configurations described above without departing from the scope or spirit of the present teaching.

For example, when image data of the printing job includes first image data for an image to be formed on a first recording sheet and second image data for an image to be formed on a second recording sheet, the respective images can be formed based on the first image data and the second image data in the first recording processing. In calculation processing, the controller 40 may calculate a total distance for the case in which the image is recorded based on the first image data in the first recording processing and a total distance for the case in which the image is recorded based on the second image data in the first recording processing, based on the distances determined in the setting processing. In determination processing, the controller 40 may determine whether the image is recorded based on the first image data in the first recording processing or the image is recorded based on the second image data in the second recording processing so that the total distance is short in the recording processing. The first recording processing in this example is processing including the printing direction determination processing and the image formation processing to be executed on one recording sheet P. The same is true of the second recording processing.

In the above embodiment, the moving distance in the movement processing is determined depending on the liquid droplet size and the hue (color) to be discharged from the nozzle. The moving distance, however, may be determined depending on any one of the liquid droplet size and the hue (color).

The moving distance in the movement processing may be determined depending on a distance between the recording sheet and the liquid discharge head 13 or a range in which the liquid discharge head 13 can execute the scanning and a shape of the liquid discharge head 13. If the distance between the recording sheet and the liquid discharge head 13 is long, the return air current would easily pass through the space and the effect of the landing failure due to the return air current would be high. Thus, the moving distance is set to be longer as the distance between the recording sheet and the liquid discharge head 13 is longer. If the range in which the liquid discharge head 13 can execute the scanning is large, namely, if the size of the casing of the liquid discharge apparatus is large, the return air current would easily pass through the casing and the effect of the landing failure due to the return air current would be high. Thus, the moving distance is set to be longer as the range in which the liquid discharge head 13 can execute the scanning is larger. If the shape of the liquid discharge head 13 is large, the return air current generated when the liquid discharge head 13 moves at the same velocity over the same distance would be strong and the effect of the landing failure due to the return air current would be high. Thus, the moving distance is set to be longer as the shape of the liquid discharge head 13 is larger. The shape of the liquid discharge head 13 may be changed depending on the type of the liquid discharge head 13. For example, in a liquid discharge head 13 of an on-carriage type in which multiple sizes of ink cartridges can be installed, the size of the liquid discharge head 13 can change depending on the size of the ink cartridge installed. The controller 40 thus may determine the moving distance depending on the size of the ink cartridge installed.

In calculation of the additional distance, when the controller 40 determines the size of the first area, the controller 40 may determine whether a high density area, in which a predefined number of liquid droplets are in a predefined range included in the first area and extending in the sub-scanning direction, is present. If no high density area is present, the landing failure would be inconspicuous. The additional distance may thus be determined as zero and only the minimum movement required for acceleration executed before the second recording processing may be executed. The predefined range may be set as 1 mm. This is because the landing failure having a range shorter than 1 mm is not likely to be noticed visually, which does not result in the decrease in image quality.

Seventh Embodiment

Figure 19:
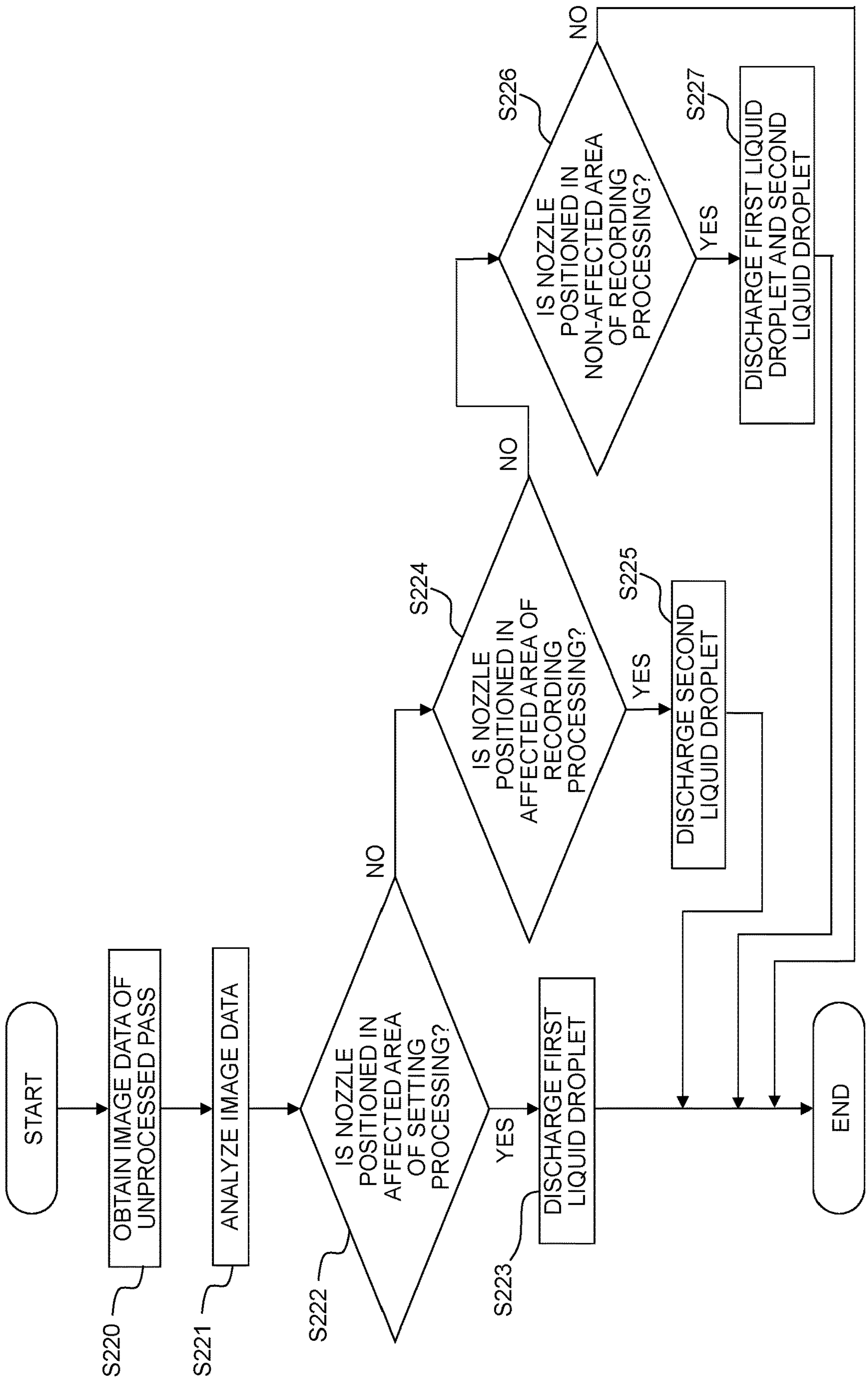
FIG. 19 is a flowchart indicating a procedure for forming an image.

Subsequently, a seventh embodiment of the present teaching is explained. In the setting processing or the movement processing in each of the first to sixth embodiments, the airflow is caused by movement of the carriage 12. Thus, in the recording processing executed after the setting processing or the movement processing, flying of liquid droplets discharged is affected by the airflow. This effect is stronger as the size of liquid droplets is smaller or the distance to the landing of liquid droplets is longer. In the seventh embodiment, such affected area is determined as an affected area A. FIG. 19 indicates print processing on which the effect of air flow is reflected.

Namely, the affected area A is an area in which the airflow causing recognizable landing failure remains when the recording processing is executed immediately after the setting processing. The affected area A extends over a predefined distance a in the first direction from the position of the nozzle 15 at the starting position of the recording processing.

An image on the recording sheet P is formed by discharging a first liquid droplet of which one liquid droplet amount is a first amount, and a second liquid droplet of which one liquid droplet amount is a second amount larger than the first amount. In the following, the first liquid droplet may be referred to as a small liquid droplet, and the second liquid droplet may be referred to as a medium liquid droplet and a large liquid droplet. The liquid amount of the large liquid droplet is larger than that of the medium liquid droplet.

According to the flowchart of FIG. 19, the controller 40 first obtains recording data of an unprocessed pass (step S220). The recording data at least includes recording data of the next pass. The recording data is obtained during the pass executed currently. The recording data may be read from the RAM 43 or created from new image data. The setting processing and the conveyance processing start simultaneously with the obtaining of the recording data.

In order to improve the throughput of the printing, the setting processing time is preferably short. Thus, in the setting processing, the acceleration/deceleration of the liquid discharge head 13 before and after the position where the liquid discharge head 13 stops may be executed in a short time and the movement of the liquid discharge head 13 may be executed at high velocity. However, if such setting processing is executed before the next recording processing, liquid droplets are susceptible to the residual airflow. The airflow may cause the landing failure of liquid droplets.

In order to solve that problem, in a step S221, the controller 40 analyzes the recording data and extracts the affected area affected by the airflow. Along with the above processing, the setting processing for the carriage 12 and the conveyance processing for the recording sheet P are executed. The conveyance processing is completed before the nozzle 15 reaches the affected area A. The obtaining of the next recoding data, the analysis, and the extraction of the affected area A are also completed before the nozzle 15 reaches the affected area A.

In the setting processing executed currently, the carriage 12 reaches the affected area A of the recording processing for the next pass (the affected area A extracted most recently). Namely, when the nozzle 15 is positioned in the affected area A of the recording processing for the next pass (step S222: YES), the controller 40 drives the liquid discharge head 13 and forms a first partial image in the affected area A (step S223). The first partial image is formed during movement of the liquid discharge head 13 in the second direction. Here, only the first liquid droplet is used from among the first liquid droplet and the second liquid droplet forming an image corresponding to the affected area A.

The carriage 12 moves and arrives at the starting position of the recording processing for the next pass. The processing related to the pass executed currently is completed, and then the processing related to the next pass starts. The position (the starting position for the next pass) is an end of the affected area A extracted.

When the nozzle 15 is positioned in the affected area A of the recording processing for the next pass (step S222: NO, step S224: YES), the controller 40 drives the liquid discharge head 13 and forms a second partial image in the affected area A (step S223). The second partial image is formed during movement of the liquid discharge head 13 in the first direction. The second partial image is an image complementing the first partial image, and the second liquid droplet is used to form the second partial image. Accordingly, the image corresponding to the affected area A is completed by overlapping the second partial image with the first partial image. Then, the carriage 12 moves in the first direction to enter a non-affected area.

When the nozzle 15 is positioned in the non-affected area of the recording processing for the next pass (step S224: NO, step S226: YES), the controller 40 drives the liquid discharge head 13 and forms an image based on the recording data for the next pass (step S223). This image is formed during movement of the liquid discharge head 13 in the first direction. The first liquid droplet and the second liquid droplet are used to form the image.

As described above, after the preparation of the recording data for the next pass is completed and before the carriage 12 reaches the affected area A of the next pass in the setting processing executed after the recording processing, the conveyance processing and the extract of the affected area A from the prepared recording data for the pass currently executed are completed. Further, the image corresponding to the affected area A is formed by dividing the image into two data. One of the images (first partial image) is formed during the setting processing for one pass. The other of the images (second partial image) is formed during the recording processing for the next pass. The first partial image is formed by the first liquid droplet having a small size, and the second partial image is formed by the second liquid droplet having a large size. The image finally obtained is thus not substantially affected by the landing failure due to the airflow.

Figure 18A:
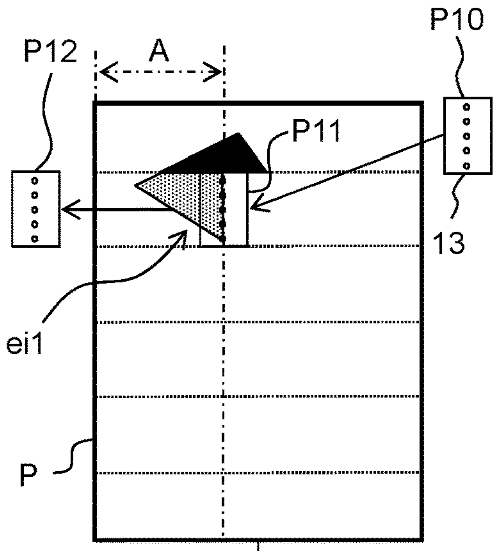
FIGS. 18A to 18C schematically depict operations of the liquid discharge head in the print processing according to a seventh embodiment.
Figure 18B:
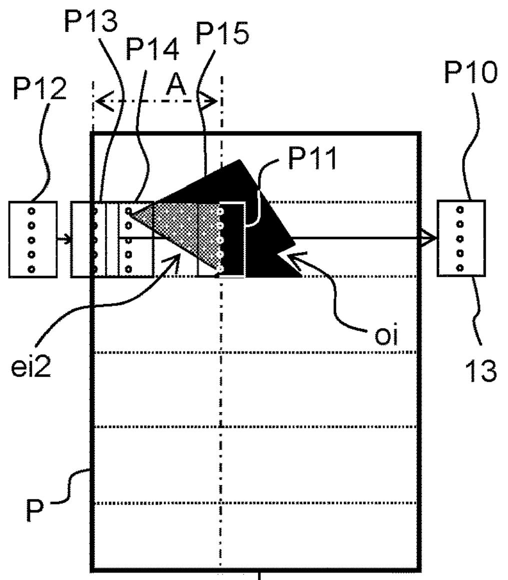
Figure 18C:
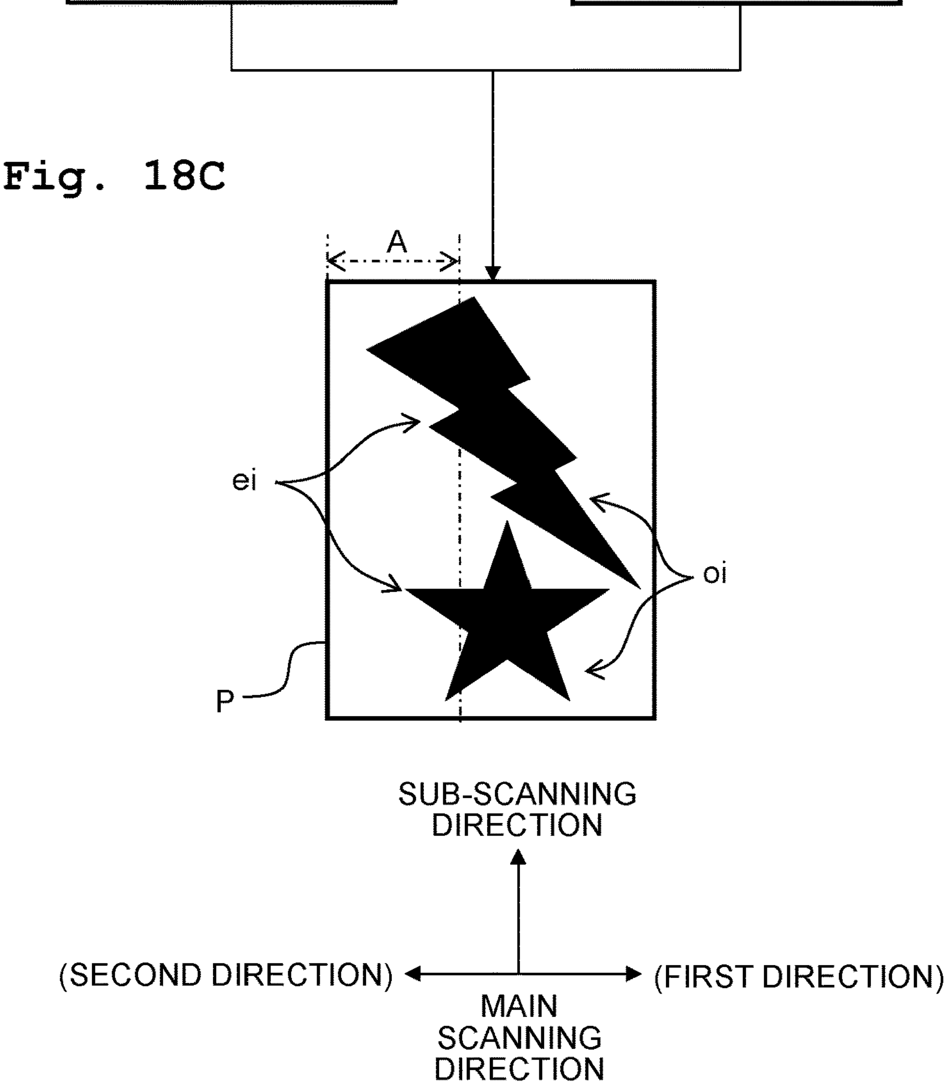

FIGS. 18A to 18C are schematic views specifically illustrating operations of the liquid discharge head 13 during image formation. The setting processing is not executed before the first pass. The first pass is thus not substantially affected by the residual airflow. An image is formed in an entire area subjected to the recording processing, based on recording data. The explanation of the operations of the liquid discharge head 13 starts with the setting processing for the pass executed currently. The liquid discharge head 13 constantly moves across the recording sheet P during the image formation, and the printing using the borderless mode is executed.

FIG. 18A depicts the standstill positions P10 and P12 of the liquid discharge head 13. Each of the positions P10 and P12 is the direction change position in the moving direction of the liquid discharge head 13. In each of the positions P10 and P12, the moving velocity of the liquid discharge head 13 is zero. The moving direction changes from the first direction to the second direction at the position P10. The moving direction changes from the second direction to the first direction at the position P12. An end on a side of the position P10 of the recording sheet P is the starting position of the conveyance processing and the setting processing (the ending position of the recording processing). An end on a side of the position P12 of the recording sheet P is the ending position of the setting processing (the starting position of the recording processing).

As described above, the liquid discharge head 13 reciprocates in the main scanning direction in the setting processing Immediately after the recording processing, the liquid discharge head 13 moves in the first direction and reaches the position P10. Then, the liquid discharge head 13 reverses the moving direction and moves in the second direction. The liquid discharge head 13 reaches the position P12, moves back at the position P12, and reaches the end on the side of the position P12 of the recording sheet P. During the above operations, the recording sheet P is conveyed in the sub-scanning direction through the conveyance processing by an amount corresponding to a width of an image formation area to be defined as a belt-like shape. The liquid discharge head 13 moves at a constant velocity in the second direction.

A position P11 is set between the position P12 and the position P10 in the main scanning direction. The position P11 is an end in the first direction of the affected area A. When reaching the position P11, the liquid discharge head 13 discharges only the small liquid droplet (corresponding to the first liquid droplet) while continuing the constant movement in the second direction. The small liquid droplet is discharged based on divided recording data (divided data 1) for the next recording processing. A first partial image ei1 (a partial image of an image ei corresponding to the affected area A) is printed in the second direction by use of the small liquid droplet. After formation of the first partial image ei1, the liquid discharge head 13 decelerates and moves back at the position P12. The deceleration rate of the liquid discharge head 13 is fixed. Then, the liquid discharge head 13 accelerates and reaches an end in the second direction of the affected area A (position P13). The acceleration rate of the liquid discharge head 13 is fixed.

In this embodiment, the conveyance processing starts when the recording processing is completed. The conveyance processing ends before the liquid discharge head 13 reaches the position P11. In the conveyance processing, the liquid discharge head 13 obliquely moves above the recording sheet P. The conveyance processing may be completed before the liquid discharge head 13 reaches the end of the affected area A. The starting position may be any position after completion of the recording processing. For convenience, FIGS. 18A and 18B each depict a state in which the conveyance processing starts at the position P10.

As depicted in FIG. 18B, the liquid discharge head 13 starts the recording processing for the next pass at the position P13. The liquid discharge head 13 constantly moves in the first direction. When the recording processing for the next pass is executed, the first partial image ei1 is in the affected area A and an image is formed to overlap with the first partial image ei1. When reaching an end in the second direction of the image ei1 (position P14), the liquid discharge head 13 starts to form a second partial image ei2. The image ei2 is formed using the medium liquid droplet and the large liquid droplet (corresponding to the second liquid droplet). The medium liquid droplet and the large liquid droplet are discharged based on divided data 2 that is paired with the divided data 1. The second partial image ei2 complements the first partial image ei1. This completes the image ei corresponding to the affected area A. The image ei is an image based on the recording data.

As depicted in FIG. 18B, when the liquid discharge head 13 has reached the end in the first direction of the affected area A (position P15) after formation of the second partial image ei2, formation of an image oi corresponding to the non-affected area starts. The liquid discharge head 13 discharges the small liquid droplet, the medium liquid droplet, and the large liquid droplet while continuing the constant movement in the first direction. Each liquid droplet is discharged based on the recording data for the recording processing executed currently. Accordingly, the image oi is formed.

After formation of the image oi, the liquid discharge head 13 starts to decelerate at an end in the first direction of the recording sheet P. The deceleration rate is fixed. The end in the first direction of the recording sheet P is the ending position of the recording processing for the pass executed currently and the starting position of the setting processing.

When the liquid discharge head 13 has reached the end in the first direction of the recording sheet P, the setting processing and the conveyance processing for the next pass are executed. Accordingly, the liquid discharge apparatus 1 executes, for example, the recording processing (the constant movement of the liquid discharge head 13 and the discharge of liquid droplets) and the setting processing (the deceleration, two reverse movements including the constant movement, and the acceleration) during one pass. One image is recorded on the recording sheet P by repeating the one pass, as depicted in FIG. 18C.

In FIGS. 18A to 18C, the liquid discharge head 13 moves so that the area where the image(s) is/are formed (the area where liquid droplets may be discharged) extends over an entire width in the main scanning direction of the recording sheet P, and the operation of the liquid discharge head 13 during its movement corresponds to the recording processing (S11) in FIG. 4. The movement of the liquid discharge head 13, however is not limited thereto. The liquid discharge head 13 may reciprocate only in the image(s) and the vicinity of the image(s) to reduce the printing time. The recording processing is an operation executed after the first liquid droplet is discharged before the last liquid droplet is discharged. The liquid discharge head 13 moves constantly and discharges liquid in synchronization with the constant movement to form the partial image(s).

In the setting processing for the pass executed currently, only the first liquid droplet is discharged in the affected area A with the residual airflow to form the first partial image ei1. In the recording processing for the next pass, the second liquid droplet larger than the first liquid droplet is discharged to form the second partial image ei2. This complements the first partial image ei1. The deterioration in image due to the airflow can thus be inhibited without lengthening the printing time.

In the above recording processing, the image oi is formed in the non-affected area by use of the first liquid droplet and the second liquid droplet. The boundary between the image ei in the affected area A and the image oi in the non-affected area is inconspicuous, inhibiting the deterioration in image quality.

First Modified Example

In the conveyance processing, the time required for conveyance of the recording sheet P is set as the first setting time. In the setting processing, the time after the recording processing is completed before the discharge of the first liquid droplet is started is set as the second setting time.

In the liquid discharge apparatus 1 according to the first modified example, the controller 40 starts the conveyance processing after completion of the recording processing. The controller 40 starts the discharge of liquid in the affected area A in the setting processing after the time elapsed from the completion of the recording processing is equal to or more than the first setting time.

Specifically, in the example depicted in FIGS. 18A to 18C, the setting processing starts when the recording processing is completed. The liquid discharge head 13 reverses the moving direction (changes the moving direction from the first direction to the second direction) at the position P10. When the liquid discharge head 13 has reached the affected area A, the discharge of the first liquid droplet starts. The conveyance processing is already completed when the discharge of the first liquid droplet is started. The controller 40, for example, adjusts the moving direction in the setting processing and makes the second setting time equal to or more than the first setting time.

Figure 20:
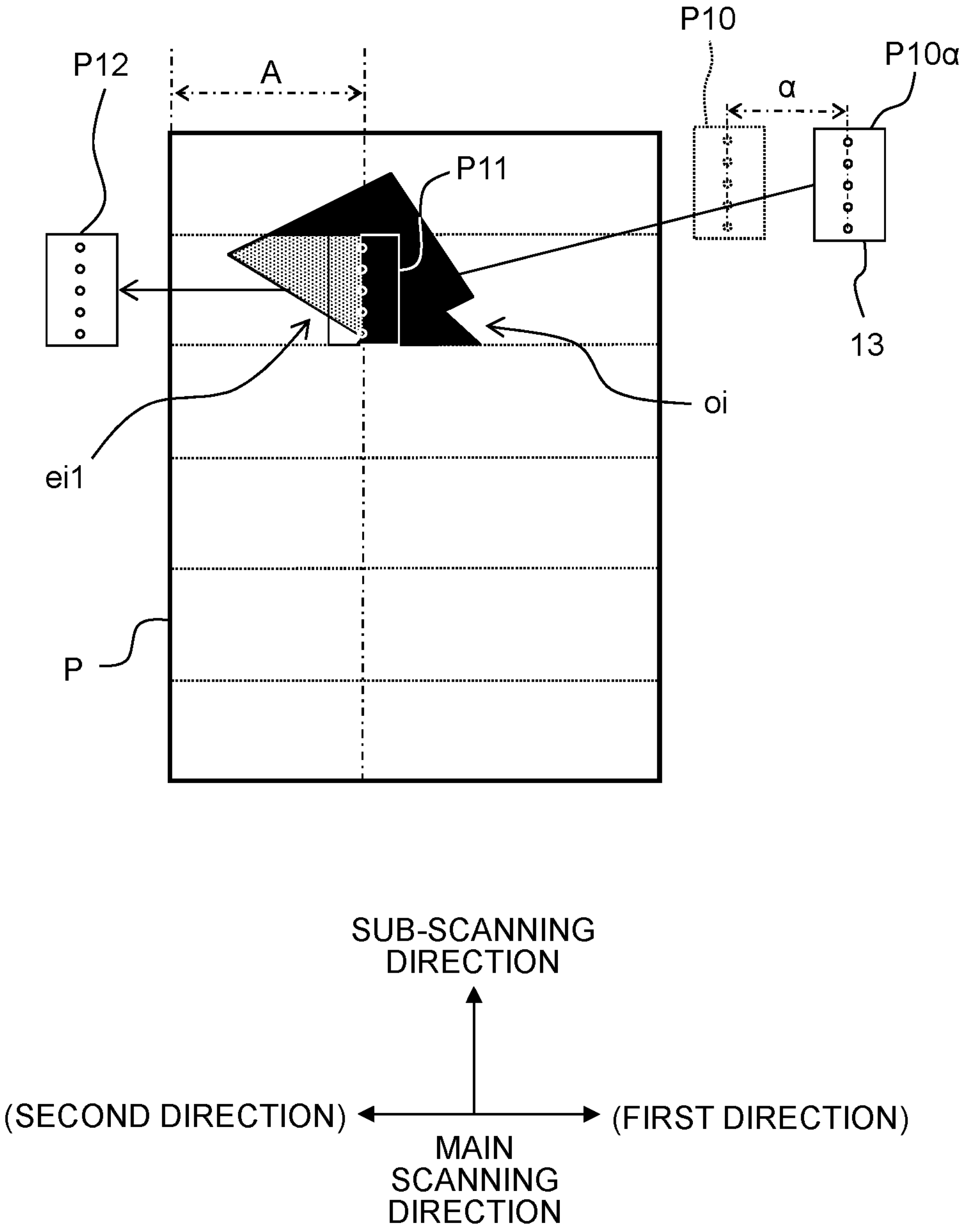
FIG. 20 schematically illustrates an operation of the liquid discharge head in the print processing according to a first modified example of the seventh embodiment.

When the second setting time is shorter than the first setting time, as indicated in FIG. 20, the controller 40 determines a position P10*a* as the direction change position in the moving direction of the liquid discharge head 13. The position P10*a* has a distance a in the first direction from the position P10. The second setting time in the setting processing is thus lengthened by an amount corresponding to the time required for the reciprocating movement over the distance a. The liquid discharge head 13 reaches the affected area A after the conveyance of the recording sheet P is completed. The liquid discharge head 13 discharges the first liquid droplet in the affected area A of the recording sheet P that is completely stationary.

As another method, the controller 40 temporarily stops the liquid discharge head 13 and makes the second setting time equal to or more than the first setting time. The liquid discharge head 13 is stopped temporarily after the recording processing is completed and before the discharge of liquid is started in the setting processing. For example, the liquid discharge head 13 waits for a predefined time at the position P10. When the second setting time is shorter than the first setting time, the controller 40 determines the predefined time to make the second setting time longer than the first setting time. The liquid discharge head 13 thus reaches the affected area A after the conveyance of the recording sheet P is completed. The liquid discharge head 13 discharges the first liquid droplet in the affected area A of the recording sheet P that is completely stationary.

In order to make the second setting time equal to or more than the first setting time, the controller 40 may adjust the moving distance of the liquid discharge head 13 and the time in which the liquid discharge head 13 is stopped. When the size of the recording sheet P is small, the magnitude relationship between the first setting time and the second setting time may be reversed. In this example, since the controller 40 adjusts the moving distance of the liquid discharge head 13 and the time in which the liquid discharge head 13 is stopped, the liquid discharge head 13 reaches the affected area A after the completion of conveyance of the recording sheet P irrespective of the size of the recording sheet P.

Second Modified Example

The moving velocity of the liquid discharge head 13 in the recording processing is determined as first moving velocity. The moving velocity of the liquid discharge head 13 in the setting processing is determined as second moving velocity.

In the liquid discharge apparatus 1 of the second modified example, the first moving velocity may be different from the second moving velocity. In that case, the controller 40 forms the first partial image ei1 in the affected area A during the setting processing, and forms the second partial image ei2 in the affected area A during the recording processing subsequent to the setting processing. The resolution of the first partial image ei1 is the same as that of the second partial image ei2.

For example, in order to reduce the printing time, the second moving velocity may be faster than the first moving velocity. In that case, the landing positions of liquid droplets in the setting processing may be shifted from those in the recording processing by driving the actuator by use of the same drive signal in the setting processing and the recording processing.

The drive signal for the setting processing is thus adjusted depending on the difference between the first moving velocity and the second moving velocity. For example, the drive signal for the setting processing is set to have a high drive frequency. This forms the two partial images ei1 and ei2 at the same resolution. Further, the discharge timing of the liquid droplet is advanced slightly in the setting processing depending on the difference between the first moving velocity and the second moving velocity. Or, the drive voltage may be increased in the setting processing. This allows the liquid droplets discharged in the setting processing and the recording processing to overlap with each other and land on the same position without the positional shift. Namely, the first partial image ei1 is complemented by the second partial image ei2 accurately.

Third Modified Example

In the liquid discharge apparatus 1 of the third modified example, the second moving velocity may be different from the first moving velocity. In that case, the controller 40 controls the second moving velocity and the first moving velocity to have the same velocity at least in the affected area A.

Specifically, the liquid discharge head 13 moves at the second moving velocity in the non-affected area. This reduces the setting processing time. The liquid discharge head 13 moves at the first moving velocity in the affected area A. This allows the liquid discharge head 13 to discharge the liquid droplets at the same discharge timing as the recording processing. The liquid discharge head 13 is thus driven by the same drive signal in the setting processing and the recording processing, and the landing positions of the liquid droplets in the setting processing are the same as those in the recording processing. Accordingly, the two partial images ei1 and ei2 have the same resolution in the affected area A.

The moving velocity of the liquid discharge head 13 positioned in the first direction with respect to the affected area A may be changed from the first moving velocity to the second moving velocity.

Eighth Embodiment

In the liquid discharge apparatus 1 of the eighth embodiment, a transition area B adjacent to the affected area A is set as depicted in FIGS. 21A to 21C. The transition area B is positioned in a range having a predefined distance in the first direction from the affected area A. The controller 40 forms a first gradation image ti1 in the transition area B in the setting processing for the pass executed currently, and forms a second gradation image ti2 in the transition area B in the recording processing subsequent to the setting processing. The first gradation image ti1 is formed by the first liquid droplet in a first discharge amount. The second gradation image ti2 is formed by the first liquid droplet in a second discharge amount. When the first discharge amount and the second discharge amount for the images in the transition area B are added, a designated discharge amount designated by image data about the first liquid droplet is obtained.

The first gradation image ti1 is formed only by the first liquid droplet. The ratio of the first discharge amount to the designated discharge amount is adjusted so that a portion of the image ti1 closer to the affected area A has a higher ratio. The second gradation image ti2 is formed by the first liquid droplet and the second liquid droplet. A portion of the image ti2 closer to the affected area A has a lower ratio of the first discharge amount of the first liquid droplet to the designated discharge amount. The second gradation image ti2 complements the first gradation image ti1 to form an image ti in the transition area B.

FIGS. 21A to 21C are schematic views specifically illustrating operations of the liquid discharge head 13 during image formation. The setting processing is not executed before the first pass. The first pass is thus not substantially affected by the residual airflow. The explanation of the operations of the liquid discharge head 13 starts with the setting processing for the pass executed currently. The liquid discharge head 13 constantly moves across the recording sheet P during the image formation, and the printing using the borderless mode is executed.

FIG. 21A depicts standstill positions P20 and P23 of the liquid discharge head 13. The positions P20 and P23 correspond to the positions P10 and P12 of FIG. 18A. The positions P20 and P23 are direction change positions (the positions where the moving velocity is zero) in the moving direction of the liquid discharge head 13. An end on a side of the position P20 of the recording sheet P is the starting position of the conveyance processing and the setting processing (the ending position of the recording processing). An end on a side of the position P23 of the recording sheet P is the ending position of the setting processing (the starting position of the recording processing).

In the recording processing and the setting processing of the eighth embodiment, the movement of the liquid discharge head 13 (the acceleration, the deceleration, the constant movement, and the like) is similar to the above embodiments. The conveyance processing is also similar to the above embodiments.

Two positions P21 and P22 are set between the position P20 and the position P23 in the main scanning direction. The position P21 is an end in the first direction of the transition area B. The position P22 is an end in the first direction of the affected area A. When reaching the position P21, the liquid discharge head 13 discharges only the small liquid droplet (corresponding to the first liquid droplet) while continuing the constant movement in the second direction. The small liquid droplet is discharged based on divided recording data (divided data 21) for the next recording processing. The first gradation image ti1 (a partial image of the image ti in the transition area B) and the first partial image ei1 (a partial image of the image ei in the affected area A) are printed in the second direction sequentially.

After formation of the first partial image ei1, the liquid discharge head 13 decelerates and moves back at the position P23. The deceleration rate of the liquid discharge head 13 is fixed. Then, the liquid discharge head 13 accelerates and reaches an end in the second direction of the affected area A (position P24). The acceleration rate of the liquid discharge head 13 is fixed.

As depicted in FIG. 21B, the liquid discharge head 13 starts the recording processing for the next pass at the position P24. The liquid discharge head 13 constantly moves in the first direction. When the recording processing for the next pass is executed, the first partial image ei1 is in the affected area A and the first gradation image ti1 is in the transition area B. The liquid discharge head 13 forms a partial image paired with the image ei1 so that they overlap with each other, and forms a partial image paired with the image ti1 so that they overlap with each other.

When the liquid discharge head 13 has reached an end in the second direction of the image ei1 (position P25), formation of the second partial image ei2 starts. The image ei2 is formed by the medium liquid droplet and the large liquid droplet. The image ei2 is formed based on divided data 22 (data paired with the divided data 21). The second partial image ei2 thus complements the first partial image ei1.

When the liquid discharge head 13 has reached an end in the second direction of the first gradation image ti1 (position P26), formation of the second gradation image ti2 starts. The image ti2 is formed by the small liquid droplet, the medium liquid droplet, and the large liquid droplet. The small liquid droplet has a distribution complementing the first gradation image ti1 with respect to the liquid discharge amount designated by the recording data. Each liquid droplet is discharged based on the divided data 22. The second gradation image ti2 complements the first gradation image ti1. Accordingly, the image ei is completed in the affected area A and the image ti is completed in the transition area B, as depicted in FIG. 21C. The two images ei and ti are images based on the recording data.

The liquid discharge head 13 continues the constant movement in the first direction and reaches an end in the second direction (position P21) of the non-affected area (an area other than the affected area A and the transition area B). The liquid discharge head 13 starts formation of the image oi based on the recording data by using the small liquid droplet, the medium liquid droplet, and the large liquid droplet. The image oi is formed in the non-affected area. Then, the liquid discharge head 13 decelerates from an end in the first direction of the recording sheet P. The deceleration rate is fixed. The end in the first direction of the recording sheet P is the ending position of the recording processing for the pass executed currently and the starting position for the setting processing and the conveyance processing.

As described above, the liquid discharge apparatus 1 repeats the setting processing subsequent to the recording processing and the conveyance processing in one pass. The images ei, ti, and of are thus printed on the recording sheet P, forming one image on the recording sheet P, as depicted in FIG. 21C.

In that configuration, a portion of the transition area B closer to the affected area A has a higher ratio of the first discharge amount of the first liquid droplet to the designated discharge amount. The concentration or density of the small liquid droplet in the vicinity of the affected area A is thus equal to or close to that of the first partial image ei1. The boundary between the affected area A and the transition area B is thus inconspicuous. This improves the image quality.

A portion of the second gradation image ti2 in the transition area B closer to the non-affected area has a higher ratio of the first discharge amount of the first liquid droplet to the designated discharge amount. The boundary between the transition area B and the non-affected area is thus inconspicuous. This improves the image quality.

The image ei in the affected area A may not continue to the image ti in the transition area B in the main scanning direction. In that case, the image ti may be formed in the recording processing subsequent to the setting processing without forming the first gradation image ti1 in the setting processing executed before the recording processing.

Fourth Modified Example

In the liquid discharge apparatus 1 according to the fourth modified example, the area of the transition area B is determined to be larger as the discharge amount (first discharge amount) of the first liquid droplet per unit area in the affected area A is larger. For example, the transition area B is made to be long in the main scanning direction.

In the configuration of the fourth modified example, the change in the ratio of the first discharge amount to the designated discharge amount is small. The color or hue in the transition area B is close to that designated by the recording data, thus reducing the deterioration in the image quality due to color change.

Ninth Embodiment

In the seventh and eighth embodiments, the range of the recording processing is the entire width of the recording sheet P. In this embodiment, however, the range of the recording processing is a range from one end in the main scanning direction of an image to the other end. In the setting processing of this embodiment, the position where the liquid discharge head 13 moves back changes per pass. In this case, the liquid discharge head 13 moves back also at a position above the recording sheet P.

In the liquid discharge apparatus 1 of the ninth embodiment, the controller 40 adjusts the ending position of the conveyance processing so that the ending position is the same as or before the starting position of liquid discharge in the setting processing subsequent to the conveyance processing (the starting position of formation of the partial image).

Figure 22:
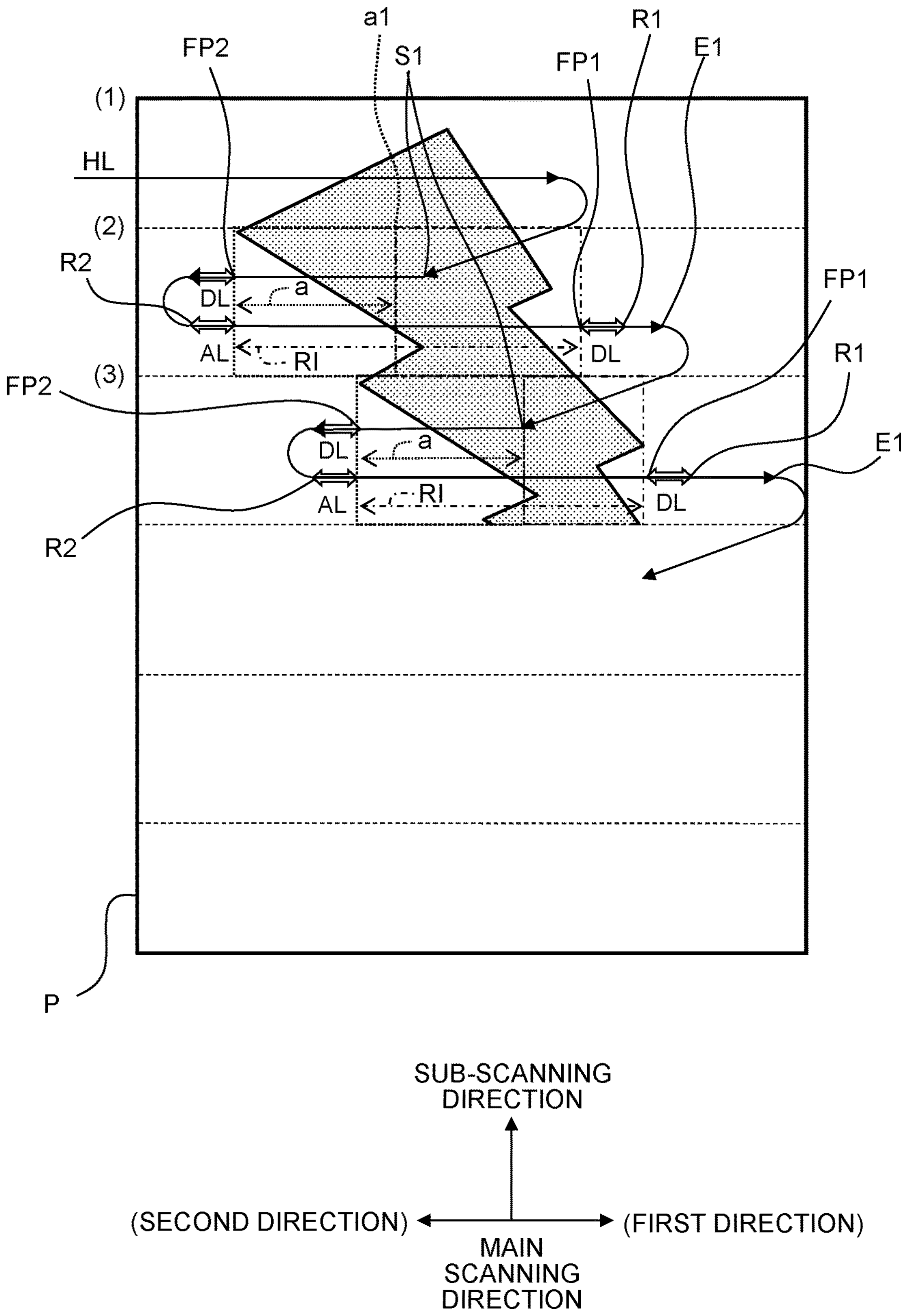
FIG. 22 schematically illustrates an operation of the liquid discharge head in the print processing according to a ninth embodiment.

Referring to FIG. 22, exemplary operations of the liquid discharge apparatus 1 when the range of the recording processing changes per pass are explained. Further, exemplary operations of the liquid discharge apparatus 1 when the affected area A is adjacent to the transition area B are also explained.

As depicted in FIG. 22, the liquid discharge head 13 moves along a solid line HL. Arcs indicated by the solid line HL depict reverse movements of the liquid discharge head 13. In the first pass (pass (1)), the liquid discharge head 13 enters an area above the recording sheet P from the side of the maintenance position (the left side of the recording sheet P in FIG. 22), as indicated by the solid line HL. The area above the recording sheet P has no residual airflow when the liquid discharge head 13 enters the area. In the recording processing, an image designated by the recording data is formed during movement of the liquid discharge head 13.

The explanation of main operations is thus started with the setting processing executed currently.

The controller 40 prepares recording data for the second pass (pass (2)) before the recording processing for the first pass (pass (1)) is completed. The controller 40 extracts a range RI of an image to be formed by the pass (2) based on the recording data. The controller 40 sets an ending position FP1 and a starting position FP2 of the recording processing depending on the range RI. The affected rea A is set in the image range RI.

The ending position FP1 of the recording processing is the nozzle position when the recording processing for the pass (2) is completed as well as the starting position of the setting processing and the conveyance processing. The starting position FP2 of the recording processing is the nozzle position when the recording processing for the pass (2) starts as well as the ending position of the setting processing for the pass (1).

In FIG. 22, a reference numeral DL indicates a distance required for deceleration of the liquid discharge head 13, and a reference numeral AL indicates a distance required for acceleration of the liquid discharge head 13. The distance DL is equal to the distance AL in this example. A reference numeral S1 indicates a nozzle position when the conveyance processing is completed. A reference numeral R1 indicates a nozzle position when the liquid discharge head 13 moves back after completion of the recording processing. A reference numeral R2 is a nozzle position when the liquid discharge head 13 moves back before the recording processing starts. A reference numeral E1 indicates a corrected nozzle position when the liquid discharge head 13 moves back after completion of the recording processing. A reference numeral A1 indicates an end in the first direction of the affected area A.

The controller 40 temporarily determines a moving-back position R1 where the liquid discharge head 13 moves back after completion of the recording processing for the pass (1) (a position having the distance DL (AL) in the first direction from the ending position FP1 of the recording processing) and a nozzle position S1 when the conveyance processing is completed. Subsequently, the controller 40 redetermines the moving-back position R1 (or E1) based on a positional relationship between the end A1 in the first direction of the affected area A and the temporary nozzle position S1.

The conveyance processing may not be completed before the nozzle position reaches the affected area A. In that case, the moving-back position R1 is changed to a position E1 in the first direction with respect to the position R1 (a position having a distance DL (AL)+a in the first direction from the ending position FP1 of the recording processing). This lengthens the moving distance of the liquid discharge head 13. The nozzle position (the position S1 in this case) is thus at the end A1 in the first direction of the affected area A or in the first direction with respect to the end A1, at the time of completion of the conveyance processing.

Subsequently, the controller 40 determines a moving-back position R2 for the pass (2) before the recording processing starts. The moving-back position R2 is determined based on the starting position FP2 of the recording processing for the pass (2). The moving-back position R2 is a position having the distance DL (AL) in the second direction from the starting position FP2 for the pass (2).

Specifically, as depicted in FIG. 22, when the pass (1) is compared to the pass (2) with the ending position FP1 of the recording processing for the pass (1) used as the reference, the nozzle position S1 for the pass (1) is in the first direction with respect to the end A1 of the affected area A for the pass (2).

When the recording processing for the pass (1) is completed, the liquid discharge head 13 decelerates at the position FP1, and moves back at the moving-back position RE The conveyance processing starts at the ending position of the recording processing. When reaching the end A1 for the pass (2), the liquid discharge head 13 starts formation of the first partial image ei1 while moving in the second direction. When completing the formation of the image ei1, the liquid discharge head 13 moves back at the moving-back position R2. The moving-back position R2 is a position having the distance DL (AL) in the second direction from the starting position FP2 for the pass (2).

When the pass (2) is compared to a pass (3) with the ending position FP1 of the recording processing for the pass (2) used as the reference, the nozzle position S1 for the pass (2) is in the second direction with respect to the end A1 of the affected area A for the pass (3).

When the recording processing for the pass (2) is completed, the liquid discharge head 13 decelerates at the position FP1, and moves back at the corrected moving-back position E1. The corrected nozzle position S1 matches the end A1. The conveyance processing starts at the ending position of the recording processing. When reaching the end A1 for the pass (2), the liquid discharge head 13 starts formation the first partial image ei1 while moving in the second direction. When completing the formation of the image ei1, the liquid discharge head 13 moves back at the moving-back position R2. The moving-back position R2 is a position having the distance DL (AL) in the second direction from the starting position FP2 for the pass (3).

When the moving-back position R1 is changed to the moving-back position E1, a distance between the moving-back positions R1 and E1 is the same as a distance between the nozzle position S1 before the change and the end A1. The present teaching, however, is not limited thereto. For example, the amount of displacement of the moving-back position E1 with respect to the moving-back position R1 may be determined so that the corrected nozzle position S1 is in the first direction with respect to the end A1. The amount of displacement may be determined by a multiple of a constant width.

In the above embodiment(s), the scanning distance of the liquid discharge head 13 is extended so that the nozzle position S1 at the time of completion of the conveyance processing is positioned at the end A1 of the affected area A or in the first direction with respect to the end A1. The present teaching, however, is not limited thereto. For example, the controller 40 temporarily stops the movement of the liquid discharge head 13 during a time after the recording processing is completed before the discharge of the first liquid droplet is started in the setting processing to make the second setting time equal to or more than the first setting time. In this case, the nozzle position S1 may be a position having the distance AL (DL) in the first direction from the end A1 of the affected area A.

Similar to FIG. 20, the affected area A may be adjacent to the transition area B. Also in that case, the image range RI is extracted from recording data for each pass as descried above. Not only the affected area A but also the transition area B are positioned in the image range RI. Then, the moving-back position R1 after completion of the recording processing may be determined based on a positional relationship between the nozzle position S1 at the time of completion of the conveyance processing and the end A1 in the first direction of the transition area B. Accordingly, the effects similar to above can be obtained.

In the above description, the first embodiment to the ninth embodiment and the modified examples thereof are explained separately. However, these embodiments and the modified examples can be used in combination as well as separately.

Figure 23:
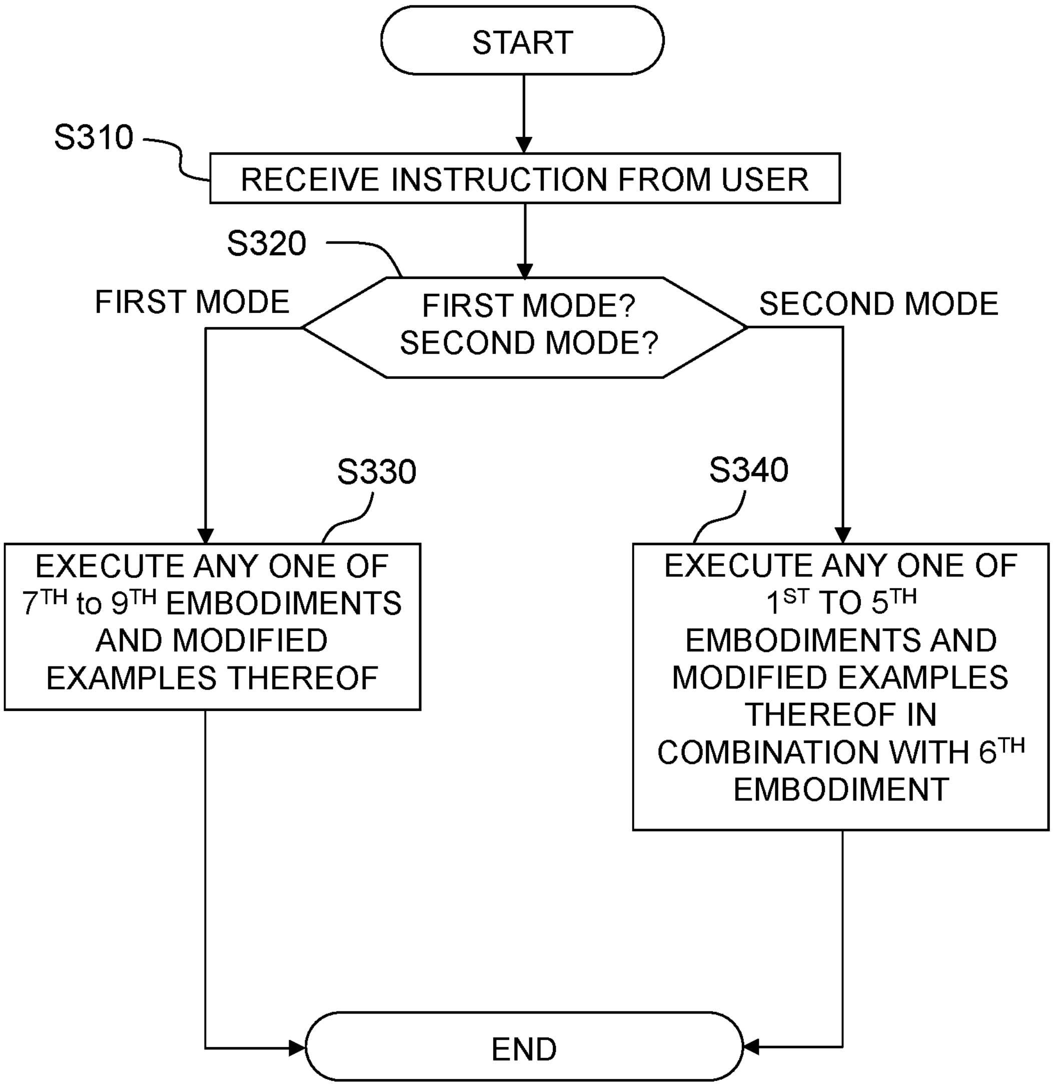
FIG. 23 is a flowchart indicating a procedure when printing mode is instructed from a user.

For example, the liquid discharge apparatus 1 may execute printing in a first printing mode in which shorter printing time is required or in a second printing mode in which higher image quality is required, depending on an instruction from a user. As illustrated in FIG. 23, when a printing mode instruction is received from the user (step S310), the controller 40 determines whether the printing mode instruction instructs printing in the first printing mode or the second printing mode (step S320). When the controller 40 determines that the printing mode instruction instructs printing in the first printing mode (S320: FIRST MODE), the controller executes any one of the seventh to ninth embodiments and modified examples thereof (step S330). When the controller 40 determines that the printing mode instruction instructs printing in the second printing mode (S320: SECOND MODE), the controller executes any one of the first to fifth embodiments and modified examples thereof in combination with the sixth embodiment (step S340).

What is claimed is:

1. A liquid discharge apparatus, comprising:

a discharge head including a plurality of nozzles;

a head scanning mechanism configured to reciprocatingly move the discharge head in a main scanning direction;

a conveyer configured to convey a recording medium in a sub-scanning direction orthogonal to the main scanning direction; and a controller, wherein the controller is configured to execute, in one pass, recording processing in which an image is formed on the recording medium by moving the discharge head in the main scanning direction and discharging liquid from the discharge head, setting processing, executed after completion of the recording processing, in which the discharge head is moved from an ending position of the recording processing for the one pass to a starting position of the recording processing for a subsequent pass following the one pass by changing a moving direction of the discharge head at a standstill position, and conveyance processing in which the recording medium is conveyed in the sub-scanning direction, wherein the controller is further configured to:

determine whether the subsequent pass is a first state pass or a second state pass based on image data of the image, the second state pass being different from the first state pass;

set setting processing time required for the setting processing for the one pass as a first setting time in a case that the subsequent pass is the first state pass, and set the setting processing time required for the setting processing for the one pass as a second setting time longer than the first setting time in a case that the subsequent pass is the second state pass.

2. The liquid discharge apparatus according to claim 1, wherein the liquid discharge apparatus is configured to execute printing in one of a first printing mode and a second printing mode, the first printing mode is a mode in which time to execute printing is shorter than time to execute printing in the second printing mode, the controller is further configured to obtain a printing mode information indicating one of the first printing mode and the second printing mode, and in a case that the controller obtains the printing mode information indicating the second printing mode, the controller is configured to:

set the setting processing time required for the setting processing for the one pass as the first setting time in the case that the subsequent pass is the first state pass, and set the setting processing time required for the setting processing for the one pass as the second setting time in the case that the subsequent pass is the second state pass.

3. The liquid discharge apparatus according to claim 2, wherein, in the first state pass, a continuous area having a length of equal to or more than a first length in the sub-scanning direction is not formed in an affected area, and wherein, in the second state pass, the continuous area having the length of equal to or more than the first length in the sub-scanning direction is formed in the affected area.

4. The liquid discharge apparatus according to claim 3, wherein the plurality nozzles form a nozzle row extending in the sub-scanning direction, wherein the affected area is an area ranging from a nozzle position to a boundary position, wherein the nozzle position is a position where the nozzle row is positioned in a case that the discharge head is in the standstill position, and wherein the boundary position is a position separated from the nozzle position in a moving direction of the discharge head after the change in the moving direction by a predefined distance.

5. The liquid discharge apparatus according to claim 4, further comprising a memory configured to store the image data of the image to be formed on the recording medium, wherein the continuous area is a partial image, of the image, formed by a plurality of pixels arranged in the sub-scanning direction at unit intervals corresponding to resolution in the sub-scanning direction.

6. The liquid discharge apparatus according to claim 5, wherein the controller is configured to adjust a control distance of the discharge head by shifting the standstill position in the main scanning direction.

7. The liquid discharge apparatus according to claim 6, wherein the controller is configured to move the discharge head toward one side in the main scanning direction in the recording processing for the one pass, wherein the nozzles form a plurality of nozzle rows arranged in the main scanning direction with intervals therebetween, each of the nozzle rows extending along the sub scanning direction, the nozzle rows including a first nozzle row and a second nozzle row located on the other side in the main scanning direction with respect to the first nozzle row, wherein the controller is configured to set the affected area for each of the nozzle rows, such that the affected area for the second nozzle row has a length in the main scanning direction shorter than that of the affected area for the first nozzle row.

8. The liquid discharge apparatus according to claim 4, wherein the first length is 1.0 mm.

9. The liquid discharge apparatus according to claim 4, wherein in the case that subsequent pass is the second state pass, the controller is configured to execute non-discharge flushing, and wherein in the non-discharge flushing, the controller is configured to control the discharge head to vibrate the liquid in the nozzles without discharging the liquid from the nozzles.

10. The liquid discharge apparatus according to claim 4, wherein the controller is configured to make a length in the main scanning direction of the affected area shorter as a moving velocity in the main scanning direction of the discharge head in the recording processing for the one pass is slower.

11. The liquid discharge apparatus according to claim 4, wherein the controller is configured to make a length in the main scanning direction of the affected area shorter as a width in the main scanning direction of the recording medium is smaller.

12. The liquid discharge apparatus according to claim 4, wherein the controller is configured to make a length in the main scanning direction of the affected area for the subsequent pass shorter as a width in the main scanning direction of the image to be formed in the recording processing for the one pass is smaller.

13. The liquid discharge apparatus according to claim 4, wherein the liquid discharge apparatus is configured to execute a borderless mode in which an image having a width that is the same as or larger than a width in the main scanning direction of the recording medium is formed or a normal mode in which an image having a width that is smaller than the width in the main scanning direction of the recording medium is formed, and wherein a length in the main scanning direction of the affected area when the borderless mode is executed is set to be shorter than that when the normal mode is executed.

14. The liquid discharge apparatus according to claim 4, wherein in a case that an end in the sub-scanning direction of the continuous area included in the affected area corresponds to an end of the nozzle row or both ends in the sub-scanning direction of the continuous area included in the affected area correspond to both ends of the nozzle row, the controller is configured to determine whether a length in the sub-scanning direction of the continuous area is equal to or more than a second length that is shorter than the first length, wherein in a case that the controller has determined that the length in the sub-scanning direction of the continuous area is equal to or more than the second length, the controller is configured to determine that the subsequent pass is the second state pass, and wherein in a case that the controller has determined that the length in the sub-scanning direction of the continuous area is less than the second length, the controller is configured to determine that the subsequent pass is the first state pass.

15. The liquid discharge apparatus according to claim 4, wherein the controller is configured to execute a plurality of passes including the one pass and the subsequent pass to form the image on the recording medium, wherein the controller is further configured to:

calculate a first total control distance, which is a sum of a control distance for each of the passes when executing the recording processing for each of the passes while moving the discharge head toward one side in the main scanning direction, calculate a second total control distance, which is a sum of the control distance for each of the passes when executing the recording processing for each of the passes while moving the discharge head toward the other side in the main scanning direction, in a case that the first total control distance is shorter than the second total control distance, execute the recording processing for each of the passes while moving the discharge head toward the one side in the main scanning direction, and in a case that the second total control distance is shorter than the first total control distance, execute the recording processing for each of the passes while moving the discharge head toward the other side in the main scanning direction.

16. A controlling method for controlling a liquid discharge apparatus including: a discharge head including a plurality of nozzles; a head scanning mechanism configured to reciprocatingly move the discharge head in a main scanning direction; a conveyer configured to convey a recording medium in a sub-scanning direction orthogonal to the main scanning direction; and a controller, the method comprising causing the controller to execute, in one pass:

recording processing in which an image is formed on the recording medium by moving the discharge head in the main scanning direction and discharging liquid from the discharge head;

setting processing, executed after completion of the recording processing, in which the discharge head is moved from an ending position of the recording processing for the one pass to a starting position of the recording processing for a subsequent pass following the one pass by changing a moving direction of the discharge head at a standstill position; and conveyance processing in which the recording medium is conveyed in the sub-scanning direction, wherein the method further causes the controller to:

determine whether the subsequent pass is a first state pass or a second state pass based on image data of the image, the second state pass being different from the first state pass;

set setting processing time required for the setting processing for the one pass as a first setting time in a case that the subsequent pass is the first state pass; and set the setting processing time required for the setting processing for the one pass as a second setting time longer than the first setting time in a case that the subsequent pass is the second state pass.

17. A non-transitory medium storing a program executable by a liquid discharge apparatus including: a discharge head including a plurality of nozzles; a head scanning mechanism configured to reciprocatingly move the discharge head in a main scanning direction; a conveyer configured to convey a recording medium in a sub-scanning direction orthogonal to the main scanning direction; and a controller, the program, when executed by a processor of the liquid discharge apparatus, causing the controller to execute, in one pass:

recording processing in which an image is formed on the recording medium by moving the discharge head in the main scanning direction and discharging liquid from the discharge head;

setting processing, executed after completion of the recording processing, in which the discharge head is moved from an ending position of the recording processing for the one pass to a starting position of the recording processing for a subsequent pass following the one pass by changing a moving direction of the discharge head at a standstill position; and conveyance processing in which the recording medium is conveyed in the sub-scanning direction, wherein the program further causes the controller to:

determine whether the subsequent pass is a first state pass or a second state pass based on image data of the image, the second state pass being different from the first state pass;

set setting processing time required for the setting processing for the one pass as a first setting time in a case that the subsequent pass is the first state pass; and set the setting processing time required for the setting processing for the one pass as a second setting time longer than the first setting time in a case that the subsequent pass is the second state pass.

* * * * *